US008264226B1

(12) United States Patent
Olsson et al.

(10) Patent No.: US 8,264,226 B1
(45) Date of Patent: Sep. 11, 2012

(54) SYSTEM AND METHOD FOR LOCATING BURIED PIPES AND CABLES WITH A MAN PORTABLE LOCATOR AND A TRANSMITTER IN A MESH NETWORK

(75) Inventors: Mark S. Olsson, La Jolla, CA (US); David A. Cox, San Diego, CA (US); Michael J. Martin, San Diego, CA (US); Ray Merewether, La Jolla, CA (US); Amos H. Jessup, San Diego, CA (US)

(73) Assignee: SeekTech, Inc., San Diego, CA (US)

( * ) Notice: Subject to any disclaimer, the term of this patent is extended or adjusted under 35 U.S.C. 154(b) by 1373 days.

(21) Appl. No.: 11/774,462

(22) Filed: Jul. 6, 2007

Related U.S. Application Data

(60) Provisional application No. 60/806,708, filed on Jul. 6, 2006, provisional application No. 60/806,837, filed on Jul. 10, 2006.

(51) Int. Cl.
*G01V 3/08* (2006.01)
(52) U.S. Cl. ............... 324/329; 324/67; 324/326
(58) Field of Classification Search ............... 324/326, 324/329, 67
See application file for complete search history.

(56) References Cited

U.S. PATENT DOCUMENTS

| | | | | |
|---|---|---|---|---|
| 3,617,865 A * | 11/1971 | Hakata | | 324/326 |
| 4,370,610 A | 1/1983 | Allen et al. | | 324/52 |
| 4,672,321 A | 6/1987 | Howell | | 324/326 |
| 4,710,708 A | 12/1987 | Rorden et al. | | 324/207 |
| 4,818,944 A * | 4/1989 | Rippingale | | 324/326 |
| 5,001,430 A | 3/1991 | Peterman et al. | | 324/326 |
| 5,194,812 A | 3/1993 | Yokoi | | 324/326 |
| 5,210,498 A | 5/1993 | Paananen | | 324/529 |
| 5,337,002 A * | 8/1994 | Mercer | | 324/326 |
| 5,361,029 A | 11/1994 | Rider et al. | | 324/326 |
| 5,469,155 A | 11/1995 | Archambeault et al. | ... | 340/853.4 |
| 5,698,981 A | 12/1997 | Mercer | | 324/329 |
| 5,798,644 A | 8/1998 | Eslambolchi et al. | | 324/326 |
| 5,963,042 A | 10/1999 | Suyama et al. | | 324/637 |
| 6,035,951 A | 3/2000 | Mercer et al. | | 175/45 |
| 6,079,506 A | 6/2000 | Mercer | | 175/45 |
| 6,102,136 A * | 8/2000 | Archambeault et al. | | 175/45 |
| 6,194,706 B1 * | 2/2001 | Ressl | | 250/225 |
| 6,208,247 B1 | 3/2001 | Agre et al. | | 340/539 |
| 6,246,376 B1 | 6/2001 | Bork et al. | | 343/760 |
| 6,356,082 B1 | 3/2002 | Alkire et al. | | 324/326 |
| 6,407,550 B1 | 6/2002 | Parakulam et al. | | 324/326 |
| 6,411,073 B1 | 6/2002 | Fischer et al. | | 324/66 |
| 6,411,094 B1 | 6/2002 | Gard et al. | | 324/326 |
| 6,435,286 B1 * | 8/2002 | Stump et al. | | 175/26 |
| 6,636,042 B1 * | 10/2003 | Dorren | | 324/326 |
| 6,776,246 B1 | 8/2004 | Nickel et al. | | 175/45 |
| 6,954,073 B2 * | 10/2005 | Mercer | | 324/329 |
| 6,999,021 B2 | 2/2006 | Taylor, Jr. et al. | | 342/22 |
| 7,310,060 B2 * | 12/2007 | Stilwell et al. | | 342/22 |
| 7,336,078 B1 * | 2/2008 | Merewether et al. | | 324/326 |
| 2007/0210929 A1 * | 9/2007 | Sabata et al. | | 340/686.5 |
| 2009/0009173 A1 * | 1/2009 | Loubet | | 324/327 |
| 2010/0001712 A1 | 1/2010 | Royle et al. | | 324/67 |
| 2010/0001713 A1 | 1/2010 | Royle | | 324/67 |
| 2010/0001731 A1 | 1/2010 | Royle et al. | | 324/326 |

* cited by examiner

*Primary Examiner* — Jay Patidar
(74) *Attorney, Agent, or Firm* — Steven C. Tietsworth

(57) ABSTRACT

A system and method for locating buried cables, pipes and other utilities includes a man portable receiver/locator which is linked by a wireless mesh connection to a transmitter which either directly applies, or induces, a signal onto a buried utility.

18 Claims, 51 Drawing Sheets

SYSTEM AND METHOD FOR LOCATING BURIED PIPES AND CABLES WITH A MAN PORTABLE LOCATOR AND A TRANSMITTER IN A MESH NETWORK

CROSS-REFERENCE TO RELATED APPLICATIONS

This application claims the benefit, under 35 USC Sections 119(e)(1) and 120, of the filing dates of U.S. Provisional Application Ser. No. 60/806,708 filed Jul. 6, 2006 and U.S. Provisional Application Ser. No. 60/806,837 filed Jul. 10, 2006, both of Mark S. Olsson et al. and both entitled "Mesh Networked Wireless Buried Pipe and Cable Locating System."

BACKGROUND OF THE INVENTION

There are many situations where is it desirable to locate buried utilities such as pipes and cables. For example, prior to starting any new construction that involves excavation, it is important to locate existing underground utilities such as underground power lines, gas lines, phone lines, fiber optic cable conduits, CATV cables, sprinkler control wiring, water pipes, sewer pipes, etc., collectively and individually referred to hereinafter as "utilities" or "objects." As used herein the term "buried" refers not only to objects below the surface of the ground, but in addition, to objects located inside walls, between floors in multi-story buildings or cast into concrete slabs, etc. If a back hoe or other excavation equipment hits a high voltage line or a gas line, serious injury and property damage can result. Severing water mains and sewer lines leads to messy cleanups. The destruction of power and data cables can seriously disrupt the comfort and convenience of residents and cost businesses huge financial losses.

Buried objects can be located by sensing an electromagnetic signal emitted by the same. Some cables such as power lines are already energized and emit their own long cylindrical electromagnetic field. Location of other conductive lines necessitates their energizing with an outside electrical source having a frequency typically in a range of approximately 50 Hz to 500 kHz. Location of buried long conductors is often referred to as "line tracing."

A sonde (also called a transmitter, beacon or duct probe) typically includes a coil of wire wrapped around a ferromagnetic core. The coil is energized with a standard electrical source at a desired frequency, typically in a range of approximately 50 Hz to 500 kHz. The sonde can be attached to a push cable or line or it may be self-contained so that it can be flushed. A sonde generates a more complex electromagnetic field than that produced by an energized line. However, a sonde can be localized to a single point. A typical low frequency sonde does not strongly couple to other objects and thereby produce complex interfering fields that can occur during the tracing. The term "buried objects" as used herein also includes sondes and buried locatable markers such as marker balls.

Besides locating buried objects before excavation, it is further desirable to determine the depth of the objects. This is generally done by measuring the difference in field strength at two locations. Although various methods of determining depth of buried conductors are well-established, it is also well known that prior methods can produce variable results and potentially dangerous errors in depth estimation when in the presence of complex or distorted fields. The present invention ameliorates this situation by taking advantage of improvements in network communication techniques and in fully utilizing multiple-frequency capabilities as a diagnostic element rather than merely as an alternative locating approach.

Portable locators that heretofore have been developed offer limited functionality insufficient for quickly and accurately locating buried utilities

SUMMARY OF THE INVENTION

An embodiment of the present invention advances the art of locating hidden conductors, such as cables, pipes, or other lines, or dipole transmitters such as sondes, through the integration of multiple devices and sensors in a communication and control system known as a mesh network. However, the present invention may also be implemented on a system that does not include a mesh network.

Another embodiment advantageously uses local time of flight (LTOF) positioning.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION OF THE EMBODIMENTS

Figure 1:
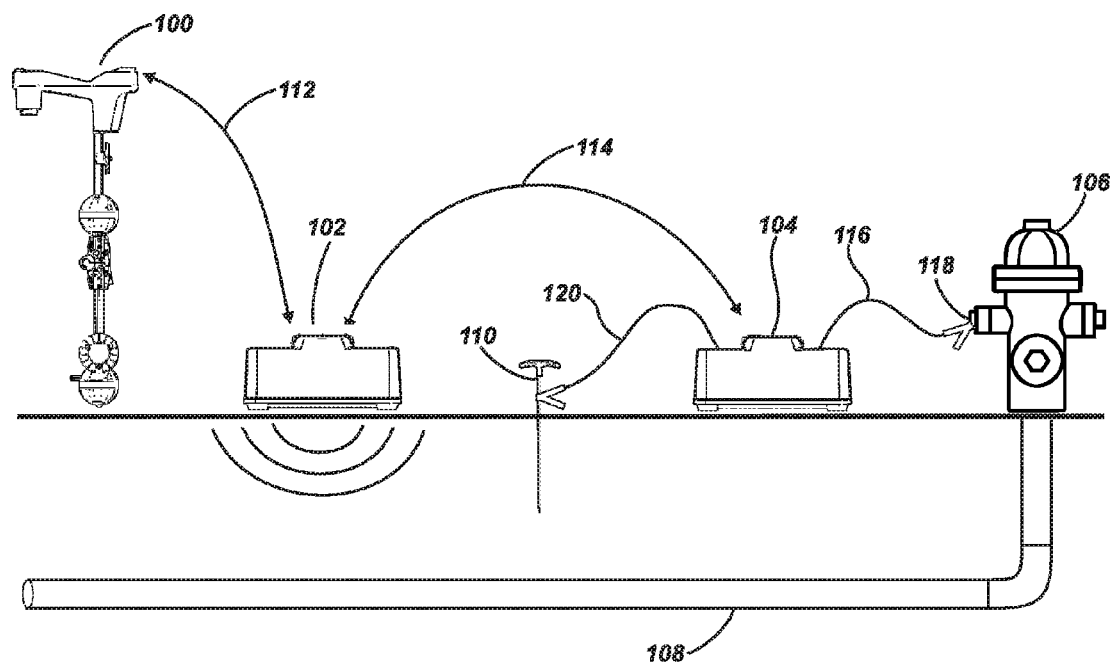
FIG. 1 illustrates a portable locating system comprising a receiver/locator (100) linked by wireless mesh connection (112) to a transmitter (102) which is inductively transmitting a signal into a buried conductor (in this case a water pipe (108).

The entire disclosures published U.S. Patent Application No. 2004/0070535 A1 entitled "Single and Multi-Trace Omnidirectional Sonde and Line Locators and Transmitter Used Therewith," filed Dec. 3, 2002, of Mark Olsson et al. and pending Ser. No. 10/956,328, filed Oct. 1, 2004, entitled "Multi-Sensor Mapping Omnidirectional Sonde and Line Locators," of Mark Olsson et al. are incorporated herein by reference.

This invention provides an improved cable, pipe and sonde (dipole transmitter) locator method and technology that may consist of a local mesh network of devices exchanging information and control streams as required, or a sophisticated stand-alone system with integral data gathering and processing subsystems.

In these embodiments, the basic guiding concept is to enable all functional units of a utility locating system with wireless communication capability. The top level concept is that these elements are each part of a system that must function together. Generally, this requires an operator to supervise the coordination of the various parts of this system which adds complexity and severely limits the degree of system coordination possible. Typical elements of such a locating system are various types of receivers and transmitters and related accessories such as Sondes, clamps, A-frames, stethoscopes etc. In addition to the core intelligence necessary to participate in a mesh network, each device is equipped with device-specific intelligence enabling it to send and receive appropriate data items through a meshed "publish and subscribe" approach. Devices "publish" their data items wirelessly making them accessible to any other device on the network; individual devices "subscribe" only to those data items which are "of interest" to them in the execution of their functions, an attribute which is defined by the software programming of the device.

The basic idea of the present invention is to enable all functional units of a utility locating system with wireless communication capability. The top level concept is that these elements are each part of a system that must function together. Generally, this requires an operator to supervise the coordination of the various parts of this system which adds complexity and severely limits the degree of system coordination possible.

Typical elements of such a system are various types of receivers and utility transmitters and related accessories such as Sondes, clamps, A-frames, stethoscopes etc. In general, each of these devices, designed to be used alone or in conjunction to a single utility transmitter only, will introduce problems in the accuracy and repeatability of its results, especially in complex situations where multiple conductors (as, parallel pipes or wires in a conduit, for example) are involved. The present invention offers a remedy to this generic shortcoming by enabling the correlation of key information from multiple devices; by enabling multiple-frequency comparisons in the refinement of depth determination and location of target conductors (pipes, wires, cables, etc.); and by enabling the internetworking of locating devices to remote systems for observation, training, cross-correlation with geographical informational systems, and supervision of the locating process.

In a mesh network, multiple devices act as nodes, each of which is capable of connecting with any other node. A node is defined for this purpose as a device which can send data to or receive data from another component or node in the network. A mesh network is a set of nodes each of which can communicate to any other, either directly or via other nodes in the mesh. Because each node in a mesh network is capable of receiving and sending data, it can act as a repeater or as a router. A repeater is a node which re-broadcasts received data and command signals but takes no other action on them, serving only to extend or reinforce the communication channels of the network. Mesh networking provides for continuous connections and reconfiguration by hopping from node to node until a desired connection is established. Mesh networks thereby accomplish a high degree of flexibility and self-healing compared to either wired networks or rigidly configured wireless networks. Devices which may act as nodes, according to the present invention, may include multiple utility transmitters, locator/receivers, sondes, fault-detection devices, geophones, ground-penetrating radar devices, or other devices related to the activity of locating underground utilities or hidden objects. Mesh networks can be established by various wireless communication means, of which the Zig-Bee protocol is a paradigmatic example. In addition, local meshes may be joined through the use of a long-range radio-frequency link thus extending the informational network over long distances.

In the present invention, the broadcasting (from a node) of information which it has is known as "publishing." The listening (by a node) for particular information needed is known as "subscribing" to that information.

According to one aspect of this invention a portable locating system that includes at least one receiver and one utility transmitter that can each communicate by wireless means whereby information can be relayed by mesh networking means from one member of the portable locating system to another thus increasing possible communication distance. (Ref. FIG. 1)

According to one aspect of this invention, the requirements for wireless connection are achieved using low-power wireless personal area network devices (LoWPAN) using IEEE 802.15.4 standard links carrying IPv6 communications, a method known as 6LoWPAN.

Figure 2:
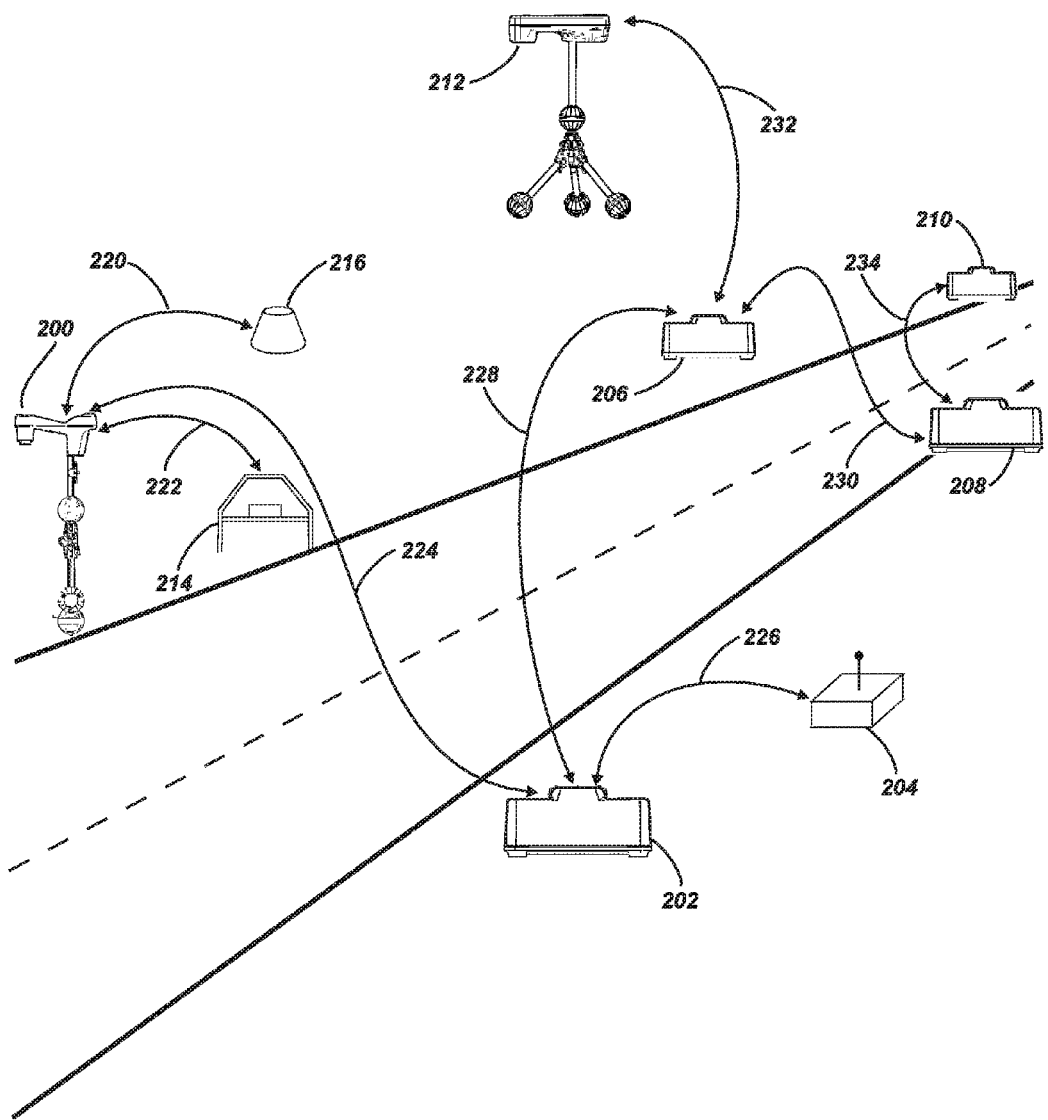
FIG. 2 illustrates an extended mesh network in which information is shared through wireless links (220, 224, 228, 230, 232, 234) among a receiver/locator (200), an A-frame fault detection device (214), a remote geophone (216), a transmitter (202), a DGPS Base Station (204), a second transmitter (206), a second, tripedal, locator/receiver (212), a third transmitter (208) and a more distant fourth transmitter (210). Note that any node in the network may be equipped with an Inertial Navigation module to provide data about location or movement of that unit.

According to one aspect of this invention a portable locating system that includes at least one receiver and one utility transmitter that can each communicate by wireless means whereby each communicating member of the locating system acts as a node in a mesh network allowing information to be sent from node to node to extend the physical transmission range beyond the maximum direct point to point transmission distance. According to this aspect, any element of the system can act as a network mesh (router) element and relay information on to other network node elements. This is particularly useful in situations where a networks range needs to be extended. To this end, additional transceiver(s) could be placed in a network with the sole intent of using them to extend the range of the network, without using them as "utility transmitters" for location. Typical elements of such a system are various types of receivers and utility transmitters and related accessories such as Sondes, clamps, fault finding A-frames, conductor identifying stethoscopes, geophones for leak detection and underground imaging purposes etc. Each device would "Publish" its status by broadcasting periodically for other devices to "Subscribe" to, or ignore. This method obviates any need for one device to interrogate another device for information (Ref. FIG. 2).

Figure 3:
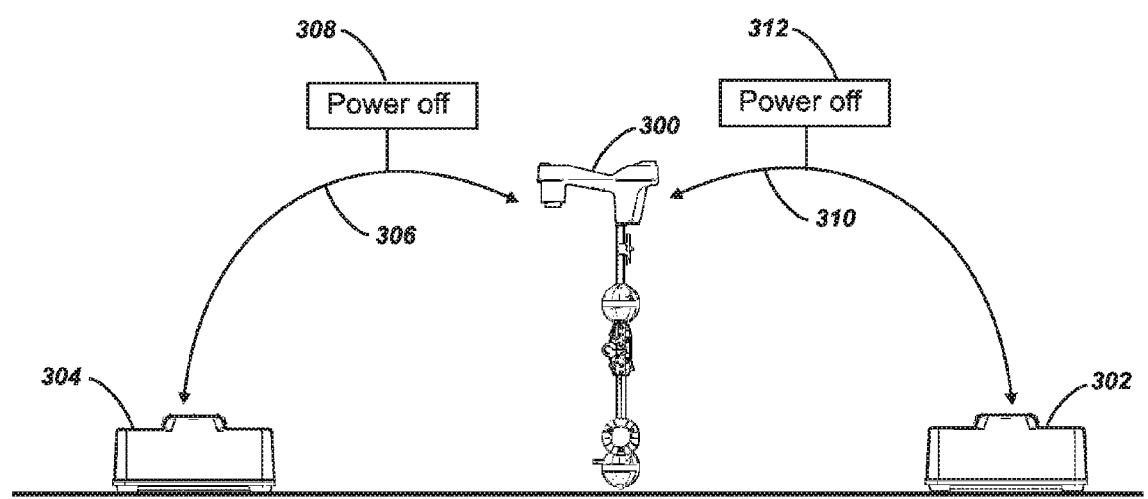
FIG. 3 illustrates a single locator/receiver (300) linked via a wireless connection (306) to a distant transmitter (304) to which it is sending a data stream (308) which includes a "Power Off" control signal.

According to one aspect of this invention, a portable locating system that includes at least one receiver and one utility transmitter that can each communicate by wireless means whereby utility transmitters can be turned off and on remotely from a receiver. (Ref. FIG. 3)

Figure 4:
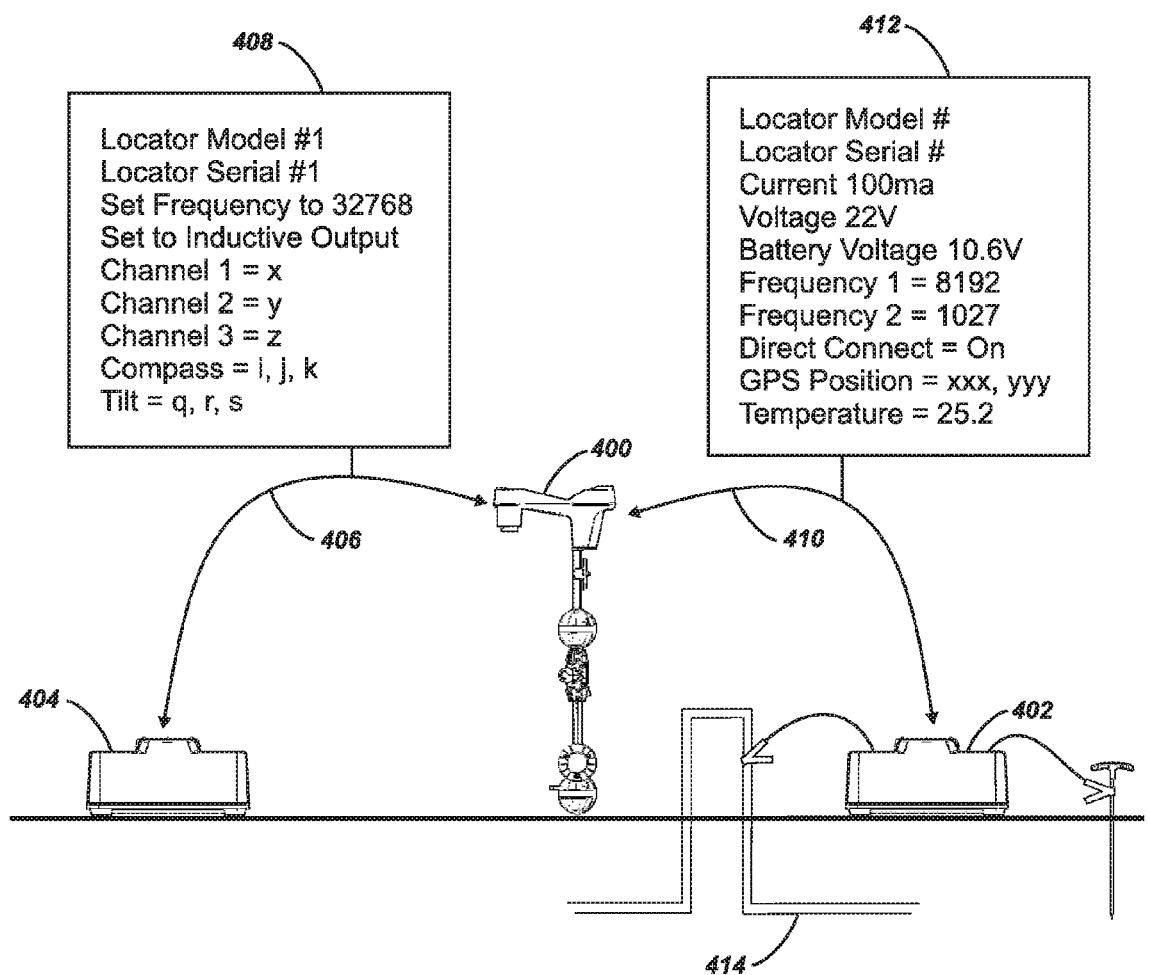
FIG. 4 illustrates a portable locating system comprising one receiver/locator (400) connected via a wireless link (410) to a directly-connected transmitter (402), and via a second wireless link (406) to a second transmitter (404).

According to one aspect of this invention a portable locating system that includes at least one receiver and one utility transmitter that can each communicate by wireless means whereby any device in the system can send operational status and/or control signals to any or all other members of the system group. One or more members of the portable locating system can be turned off and on and otherwise controlled from any communicating device that is part of this group. (Ref. FIG. 4)

Figure 5:
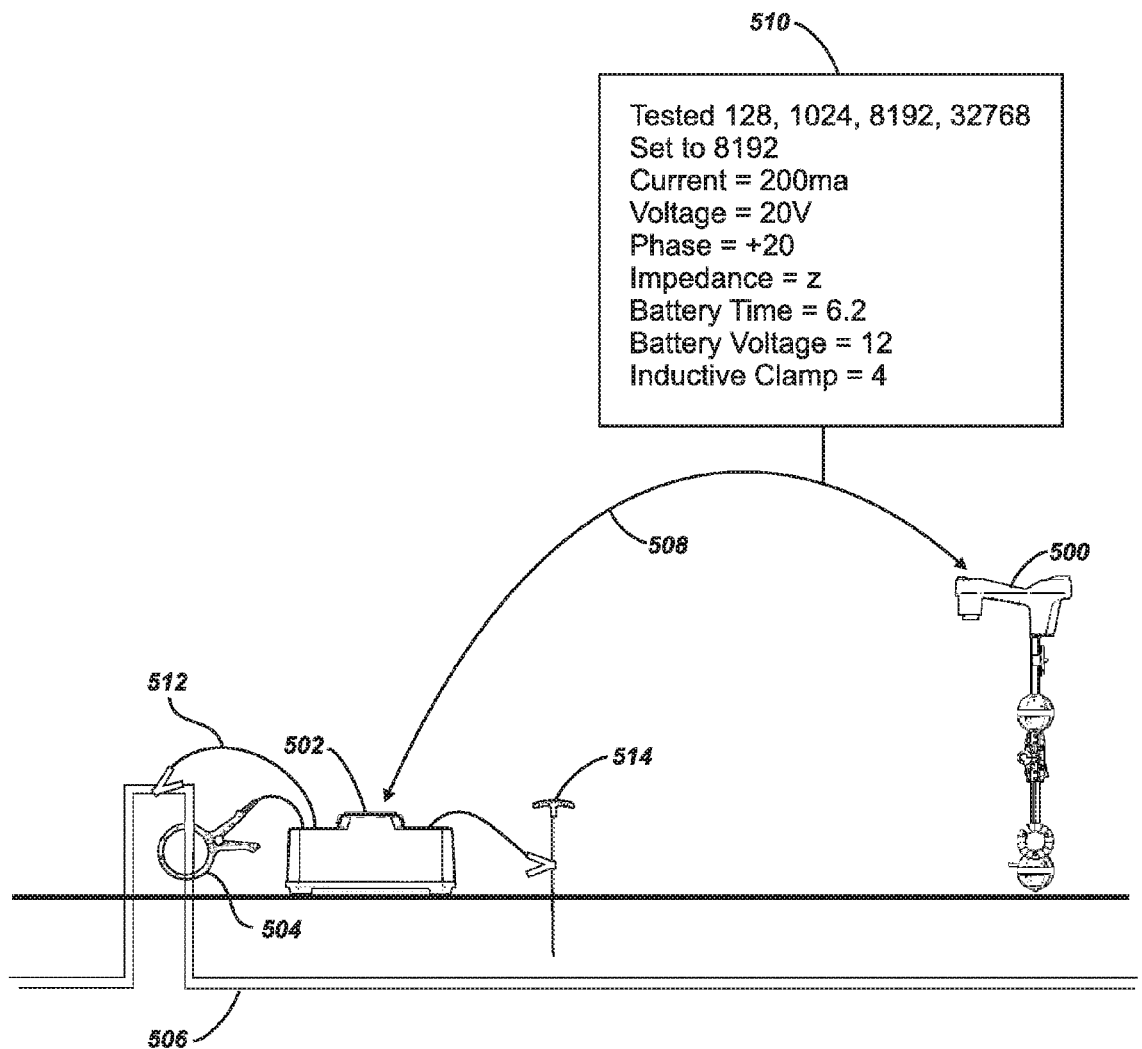
FIG. 5 illustrates a portable locating system comprising one receiver/locator (500) and one transmitter (502); the transmitter is connected by direct connection (512) to the accessible section of an underground cable (506), and alternative connection via an inductive clamp (504) is also shown.

According to one aspect of this invention a portable locating system that includes at least one receiver and one utility transmitter that can each communicate by wireless means whereby a utility transmitter connected to a utility measures the impedance of the connection and uses this information to determine a desired transmit frequency and then wirelessly communicates that frequency to other members of the portable locating system. The utility transmitter might also optionally communicate utility impedance information. The utility transmitter might also optionally become active at the frequency and begin to transmit that frequency. The utility transmitter might be connected directly or inductively to the utility. (Ref. FIG. 5)

Figure 6:
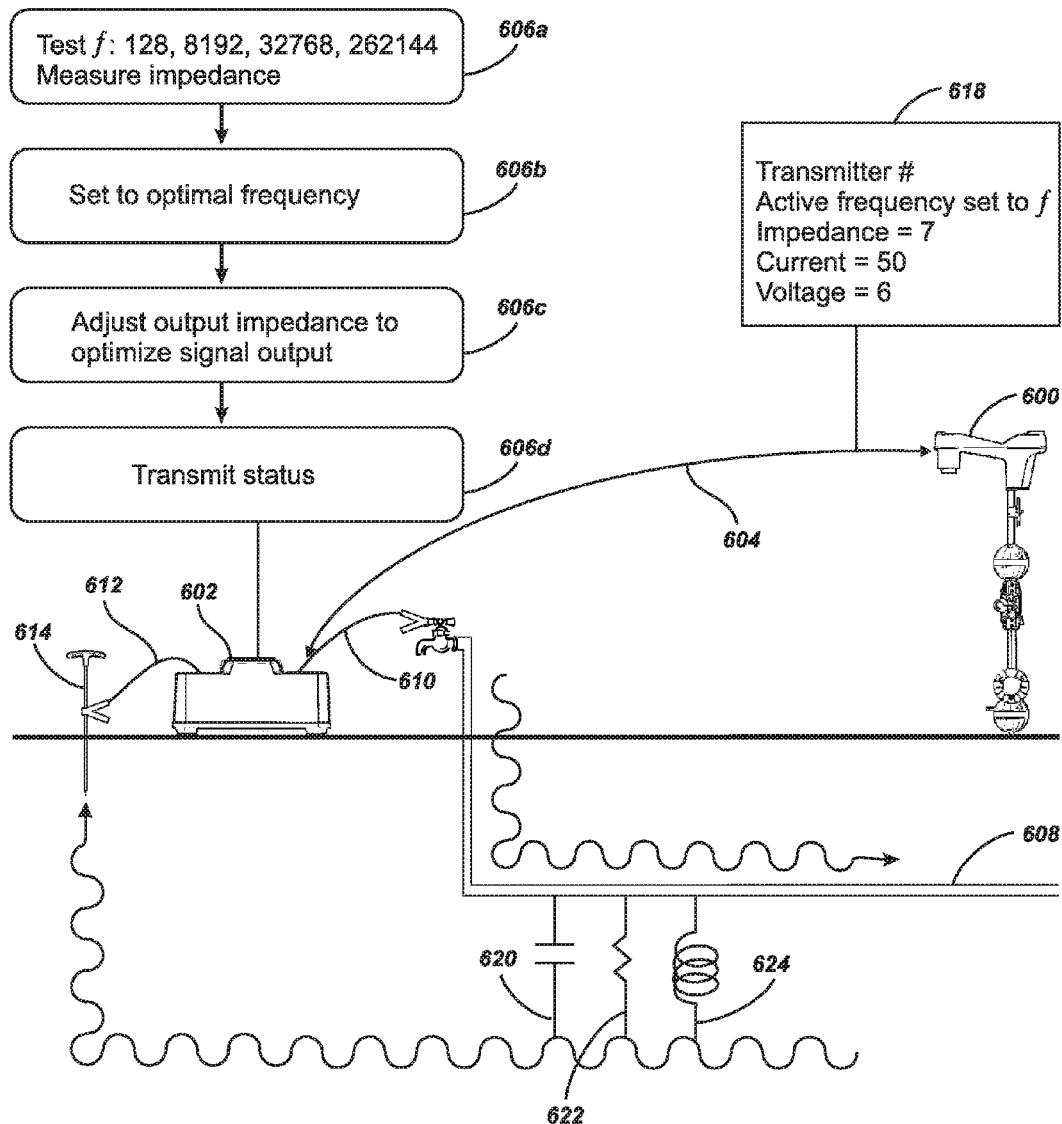
FIG. 6 illustrates a portable locating system comprising one receiver/locator (600) and one transmitter (602); the transmitter (602) is connected to a water line (608) at an above-ground point by means of a direct-connect cable (610), and is grounded by means of a grounding stake (614) to which it is connected by a similar direct-connect cable (612)

According to one aspect of this invention a portable locating system that includes at least one receiver and one utility transmitter that can each communicate by wireless means whereby a utility transmitter that determines the impedance characteristics of the circuit it is connected to, measures how the impedance of this circuit responds to changes in frequency, and uses this information to automatically determine which frequency to use and then broadcasts this information onto the network, where the receiver would detect this status information. The receiver then automatically configures itself to this frequency. The feature is improved by providing switchable tuning elements, so that the impedance (and admittance) of the line are nearly pure real. Series and shunt, capacitors and inductors can be used. The difference in phase between the current and the voltage delivered to the utility can be measured to determine the capacitive or inductive nature of the utility in response to the applied signal. (Ref. FIG. 6)

Figure 7:
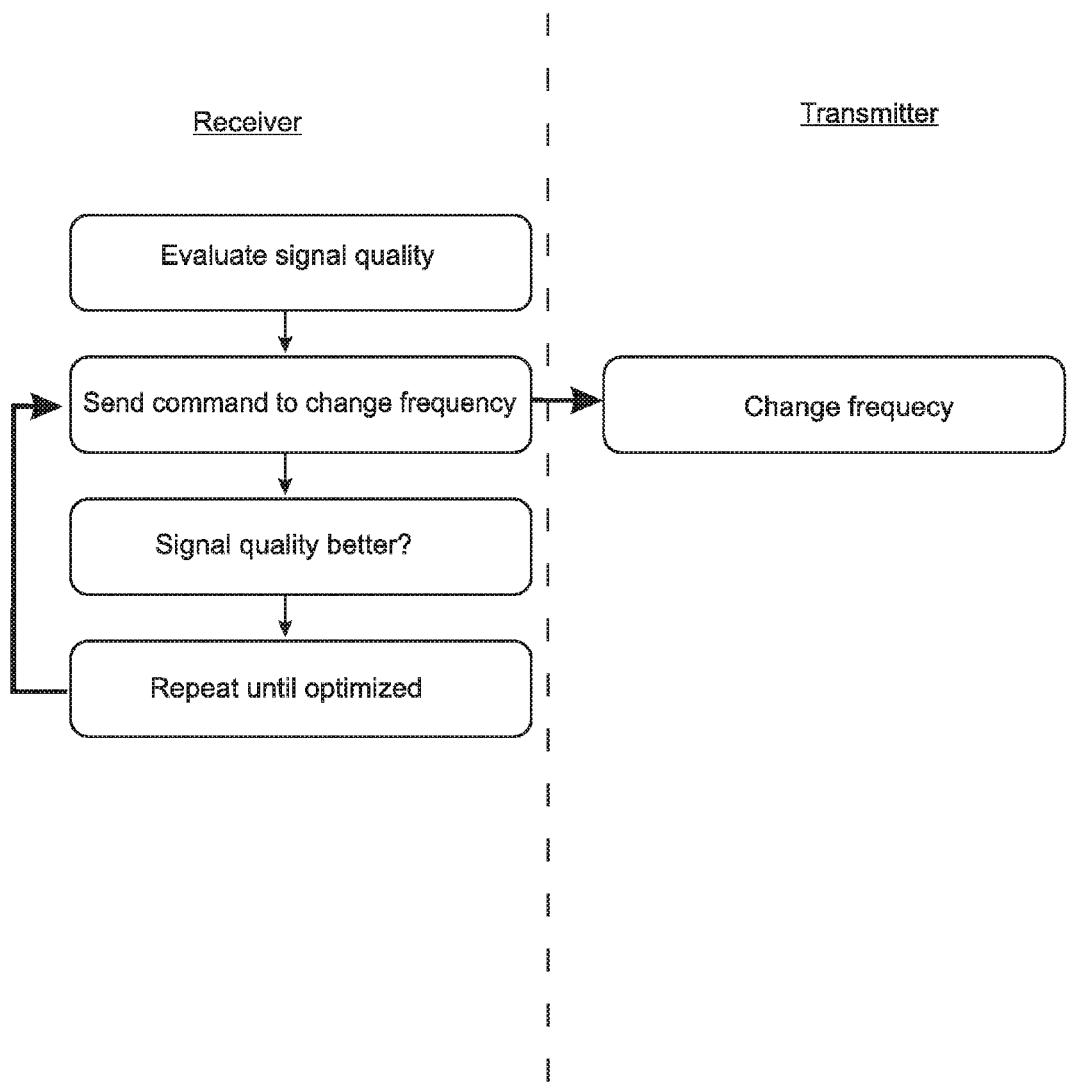
FIG. 7 illustrates the logic of a portable locating system comprising one transmitter and one receiver in dynamically determining optimum frequency. Signal Quality is evaluated by the receiver/locator; a control data stream is sent to the transmitter, instructing the transmitter to change frequency.

According to one aspect of this invention, a portable locating system that includes at least one receiver and one utility transmitter that can each communicate by wireless means, whereby a locating system where the optimal frequency is determined dynamically, and wherein higher or lower frequencies are enabled during the locating process to determine if signal quality can be improved. An example of this process is where Signal A is being broadcast by the transmitting device and received by the receiving device. Signal B is then broadcast simultaneously or separately for a short period of time and the signal characteristics are compared to those for Signal A. If one of the locating device elements determines that Signal B offers better locating characteristics, then the locating system can either switch automatically, or post a message to the user interface and offer to switch to a new operating frequency. This automatic behavior can be made completely transparent to the operator if desired, in the simplest mode of operation. (Ref. FIG. 7)

According to one aspect of this invention a portable locating system that includes at least one receiver and one utility transmitter that can each communicate by wireless means whereby a receiver detecting a transmitted frequency commands the utility transmitter to change transmitted frequency to reduce interference from other signals and thereby improve the detected signal stability or the signal to noise ratio of the detected signal. This is one form of jammer avoidance. (Ref. FIG. 8)

Figure 9:
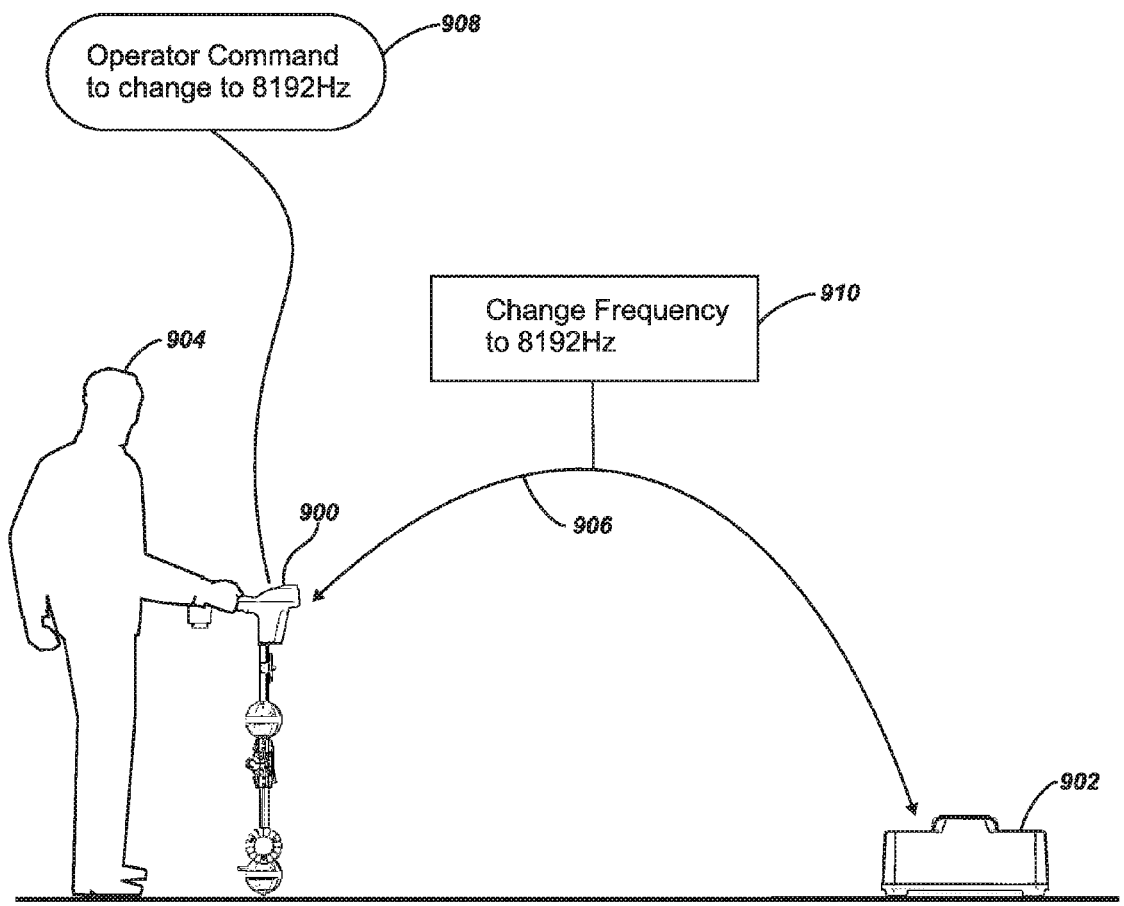
FIG. 9 illustrates a portable locating system comprising a locator/receiver (900) in use by an operator (904), with a wireless connection (906) to a distant transmitter (902).

According to one aspect of this invention a portable locating system that includes at least one receiver and one utility transmitter that can each communicate by wireless means whereby when the active receiver frequency and associated processed data that is being displayed to the operator is changed under operator control to a different operating frequency that the utility transmitter will also switch frequency to follow this active receiver frequency. (Ref. FIG. 9)

According to one aspect of this invention a portable locating system that includes at least one receiver and one utility transmitter that can each communicate by wireless means whereby when the active transmit frequency being broadcast and coupled onto a utility is changed under operator control or automatically under processor control from either the utility transmitter or the receiver to a different transmitted frequency that one or more receivers will also switch frequency to follow this active transmitter frequency. (Ref FIG. 10)

Figure 11:
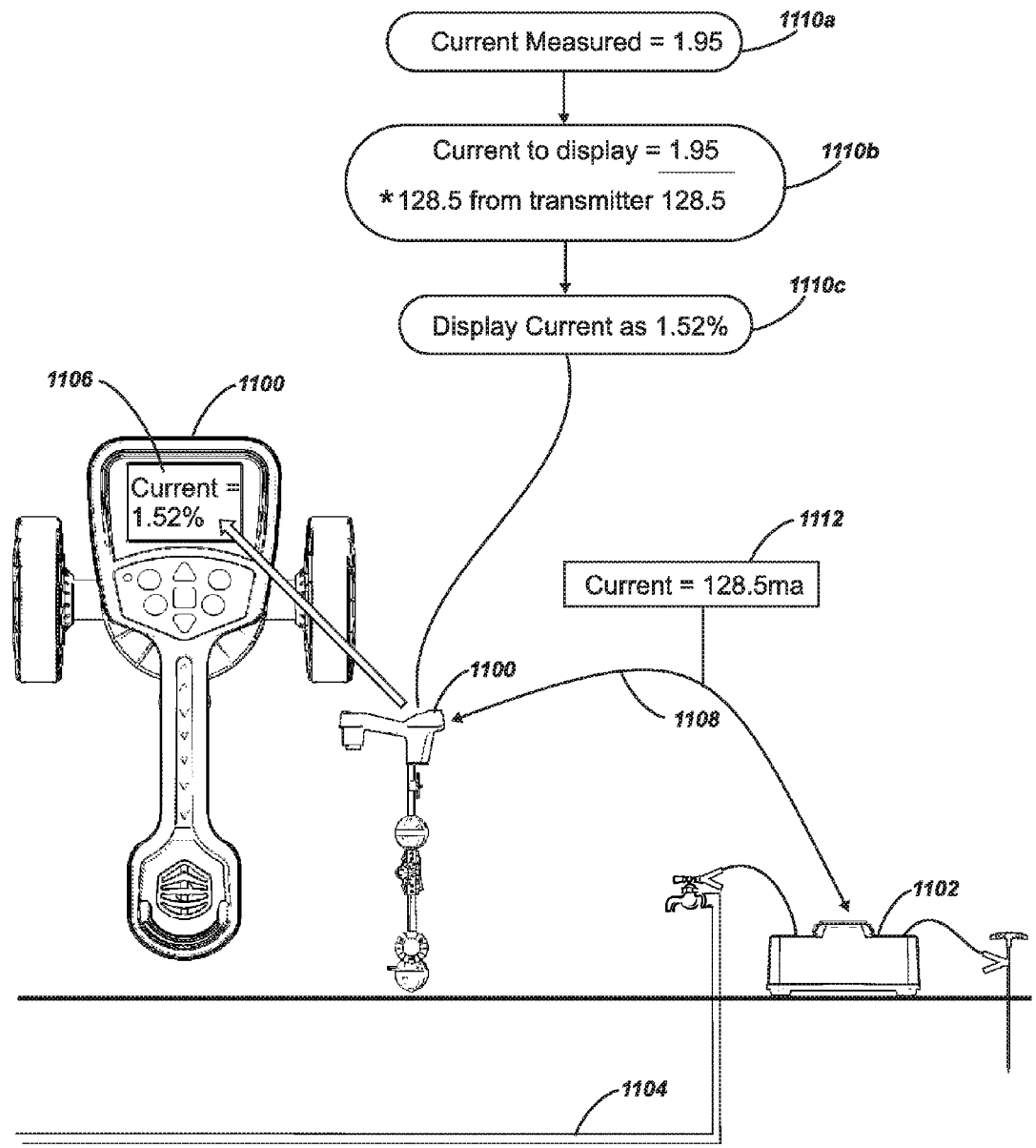
FIG. 11 illustrates a portable locating system including a receiver/locator (1100) whose display (1106) is shown in a separate blowup image, and connected by wireless link (1108) to a transmitter (1102) which is connected to an accessible portion of a water line (1104) by direct connection.

According to one aspect of this invention a portable locating system that includes at least one receiver and one utility transmitter that can each communicate by wireless means whereby the utility transmitter broadcasts the current it is sourcing into the utility that it is connected to and the receiver uses this information to display the sensed, measured current as some fraction or percentage of the total current sourced by the utility transmitter. (Ref. FIG. 11)

Figure 12:
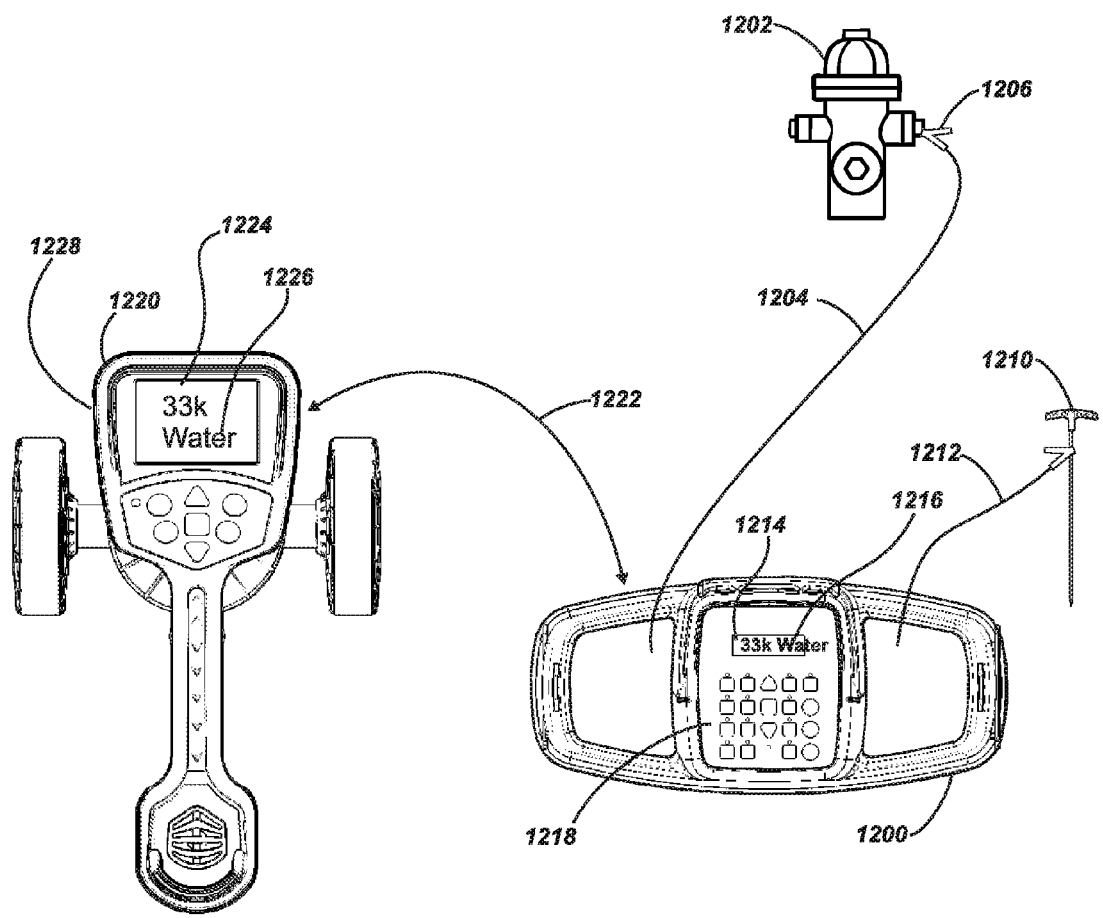
FIG. 12 illustrates a portable locating system including a receiver/locator and a transmitter in which the operator can key in for storage data defining the type of utility to which the group is connected (directly or inductively) and in which the receiver can display and/or store the utility-type with the detected signal from the particular transmitter.

According to one aspect of this invention a portable locating system that includes at least one receiver and one utility transmitter that can each communicate by wireless means whereby when the operator connects a utility transmitter to a utility the operator can communicate the type of the utility (e.g. gas, water, power etc.) to which the connection is made to the user interface in either the utility transmitter or the receiver thus enabling the receiver to display to the operator and optionally store the type of utility associated with the detected signal from a particular utility transmitter within the locating system group. (Ref. FIG. 12)

Figure 13:
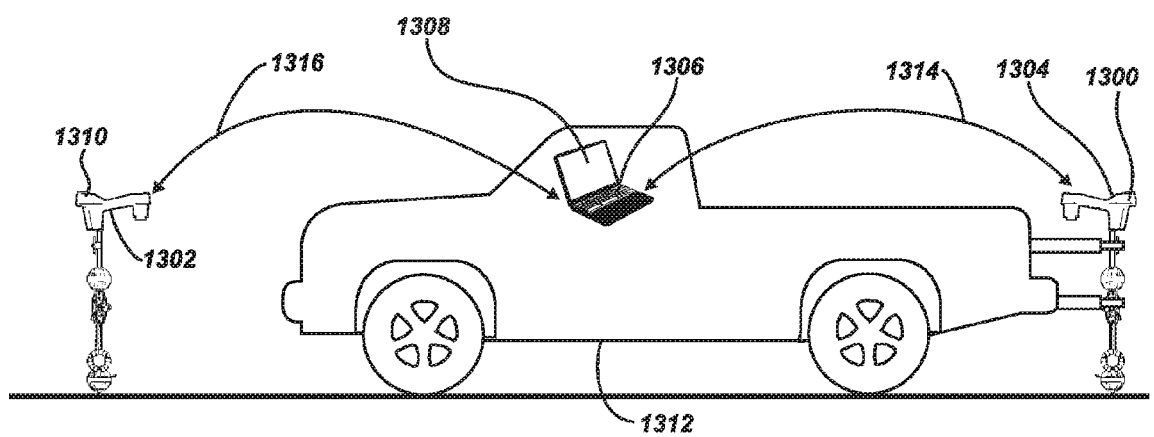
FIG. 13 illustrates a portable locating system that includes at least one receiver and one transmitter that can each communicate by wireless means such that part or all of the display of any element of the system can be displayed remotely on the display of any other element of the system, such as a remote portable computing device, for example.

According to one aspect of this invention a portable locating system that includes at least one receiver and one utility transmitter that can each communicate by wireless means whereby all or any part of the display or the information associated with the display of any locating system element can be remotely shown by any other element of the system. (Ref. FIG. 13)

Figure 14:
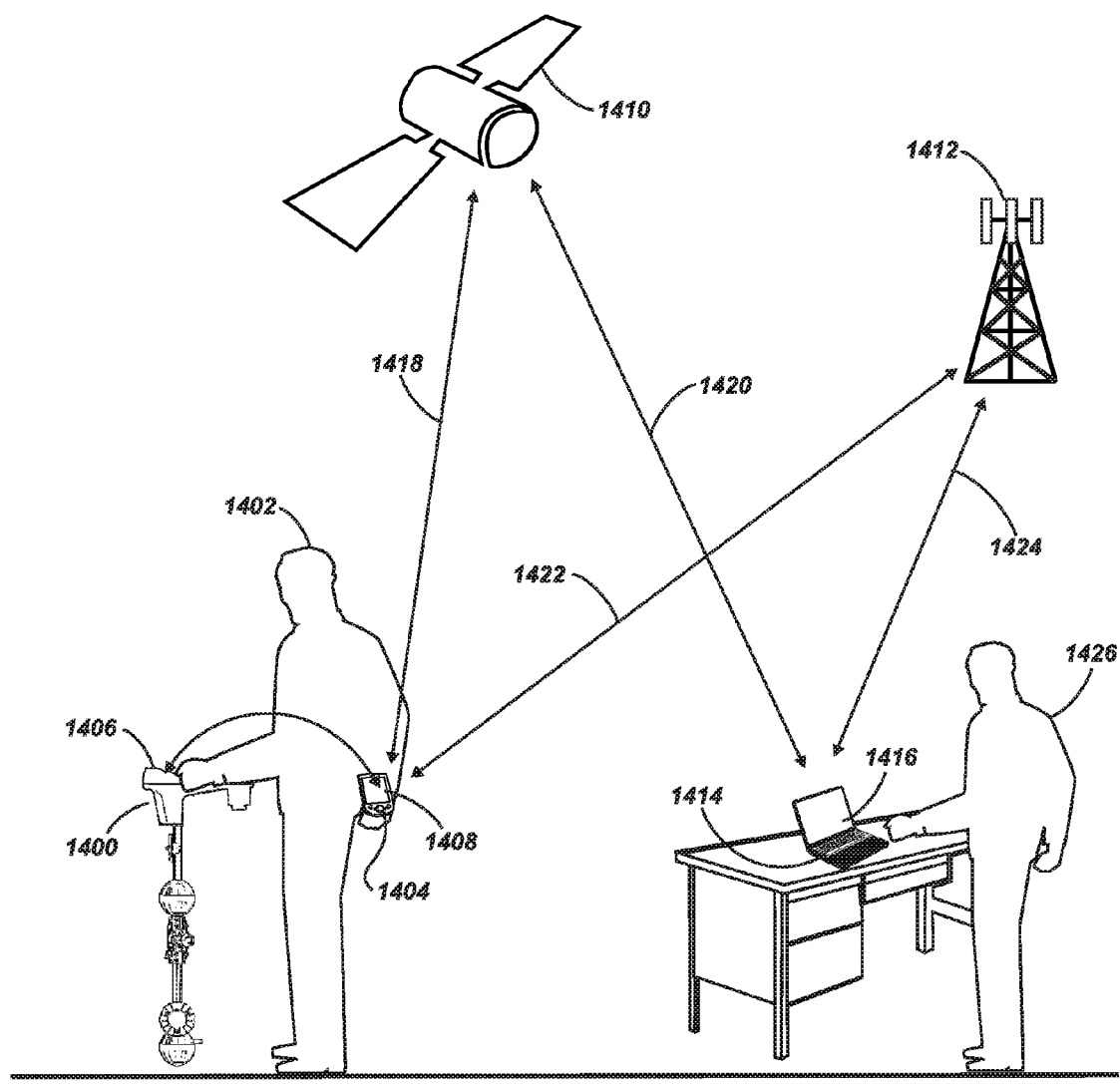
FIG. 14 illustrates a portable locating system that includes at least one receiver and one transmitter that can each communicate by wireless means, and in which a WAN-aware digital device (e.g., a cell phone or PDA) and a remote computer are members of the group acting as data display, logging, or relay devices.

According to one aspect of this invention a portable locating system that includes at least one receiver and one utility transmitter that can each communicate by wireless means whereby any remote computing means (e.g. a PDA or a computer or a Bluetooth enabled cell phone) can act as a member of this portable locating system and act as a remote display device or data relay or data logging device. (Ref. FIG. 14)

Figure 15:
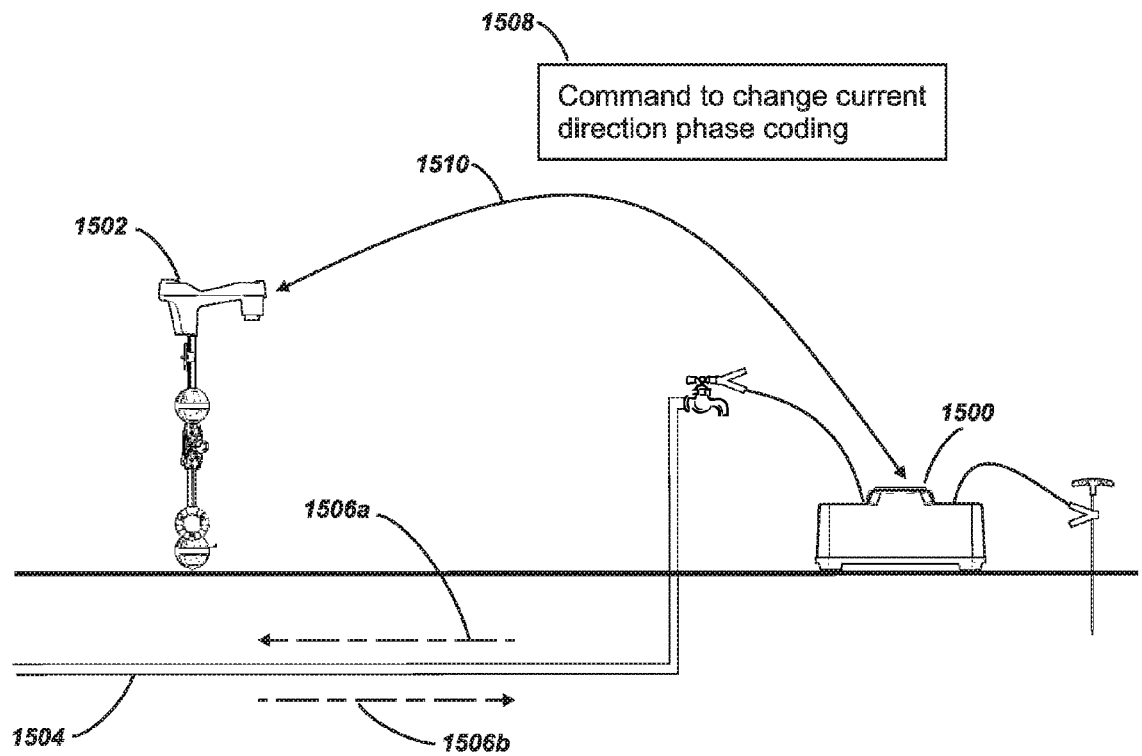
FIG. 15 illustrates a portable locating system that includes at least one receiver and one transmitter that can each communicate by wireless means, in which the receiver may send instructions to the transmitter to reverse current direction.

According to one aspect of this invention a portable locating system that includes at least one receiver and one utility transmitter that can each communicate by wireless means whereby current direction coding at a utility transmitter can be reversed by a command from a receiver. (Ref. FIG. 15)

Figure 16:
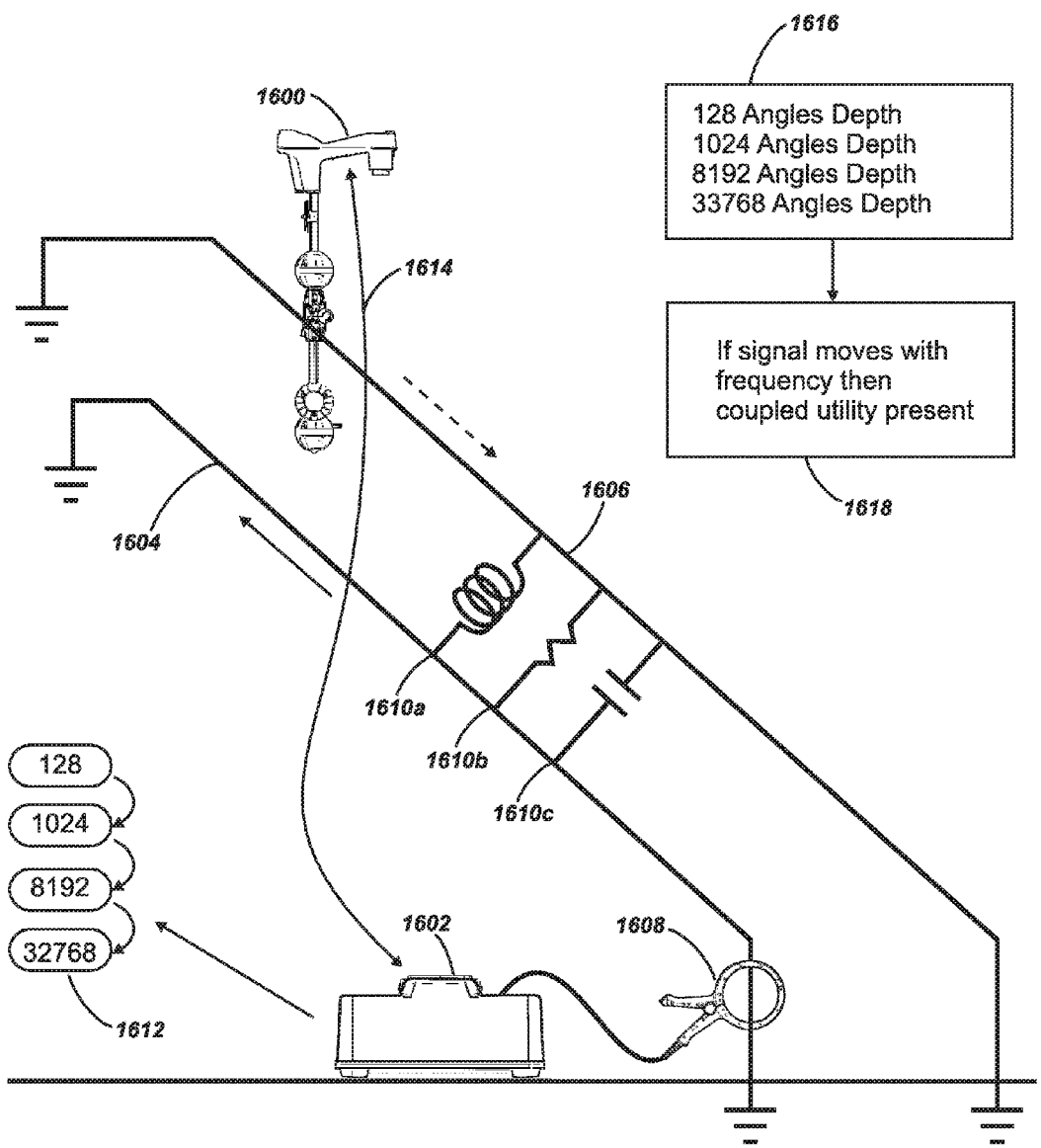
FIG. 16 illustrates a portable locating system that includes at least one receiver and one transmitter that can each communicate by wireless means, in which the data exchanged describing field angles detected at a series of frequencies, and current and voltage values at each such frequency, is used in analyzing cross-coupling between adjacent utilities or conductors.

According to one aspect of this invention a portable locating system that includes at least one receiver and one utility transmitter that can each communicate by wireless means whereby the amount of cross coupling to adjacent utilities can be determined at a receiver by commanding one or more remote utility transmitters to change to one or more different frequencies and measuring the relative change in receiver measured field angles; and optionally, to send current, voltage and impedance values with each. A coupling or distortion warning can be optionally displayed on the receiver to alert the user. By way of example, two transmitters might be commanded by the receiver to swap broadcast frequencies. (Ref. FIG. 16)

Figure 17A:
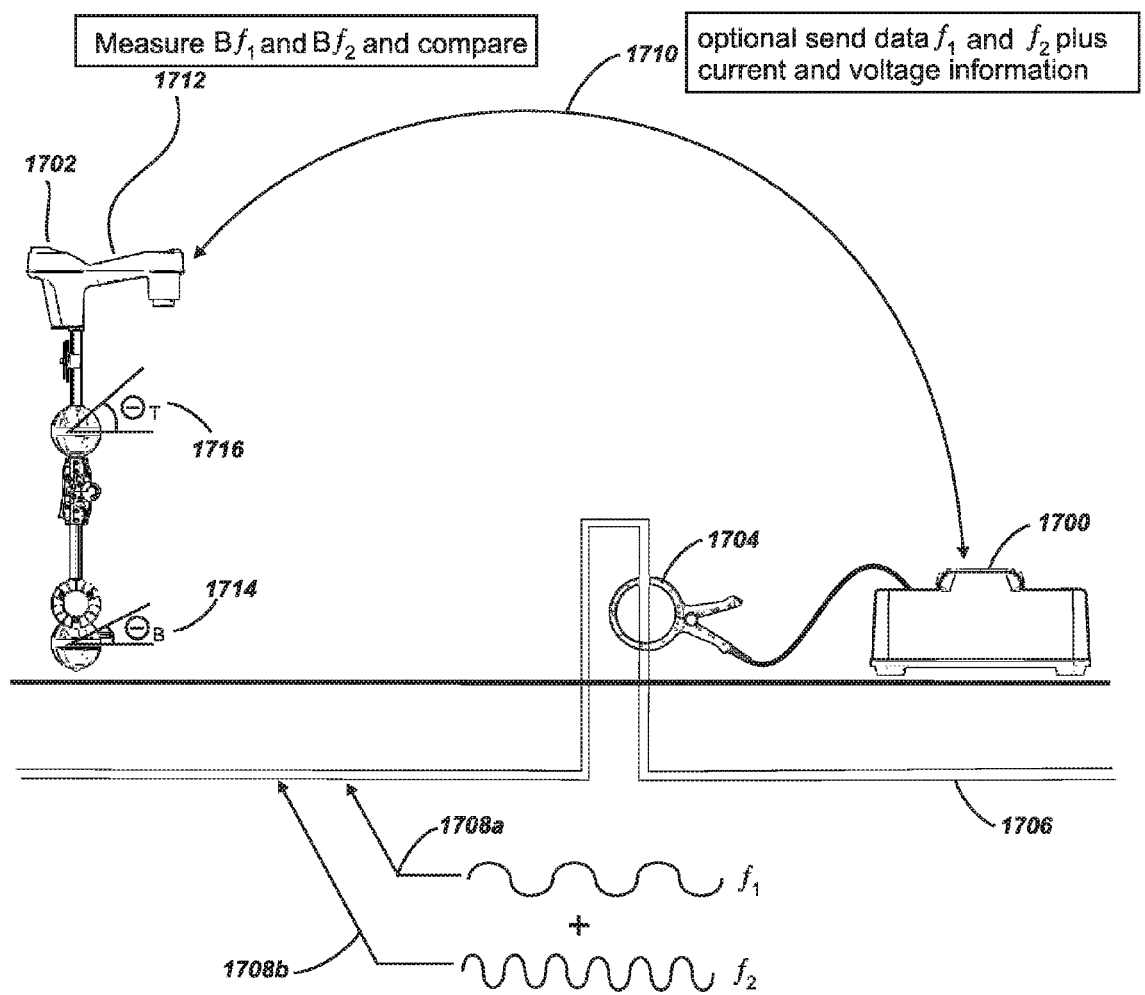
FIG. 17a illustrates a portable locating system that includes at least one receiver and one transmitter that can each communicate by wireless means, in which the amount of cross coupling to adjacent utilities is being determined at a receiver by commanding a remote transmitter to simultaneously or sequentially to transmit two or more different frequencies, and measuring the relative change in receiver measured field angles.

According to one aspect of this invention, a portable locating system that includes at least one receiver and one transmitter that can each communicate by wireless means, whereby the amount of cross coupling to adjacent utilities can be determined at a receiver by commanding a remote transmitter to simultaneously or sequentially transmit two or more different frequencies, and measuring the relative change in receiver measured field angles at one or more antenna locations. A coupling or distortion warning can optionally be displayed on the receiver to alert the user. (Ref. FIG. 17a)

Figure 17B:
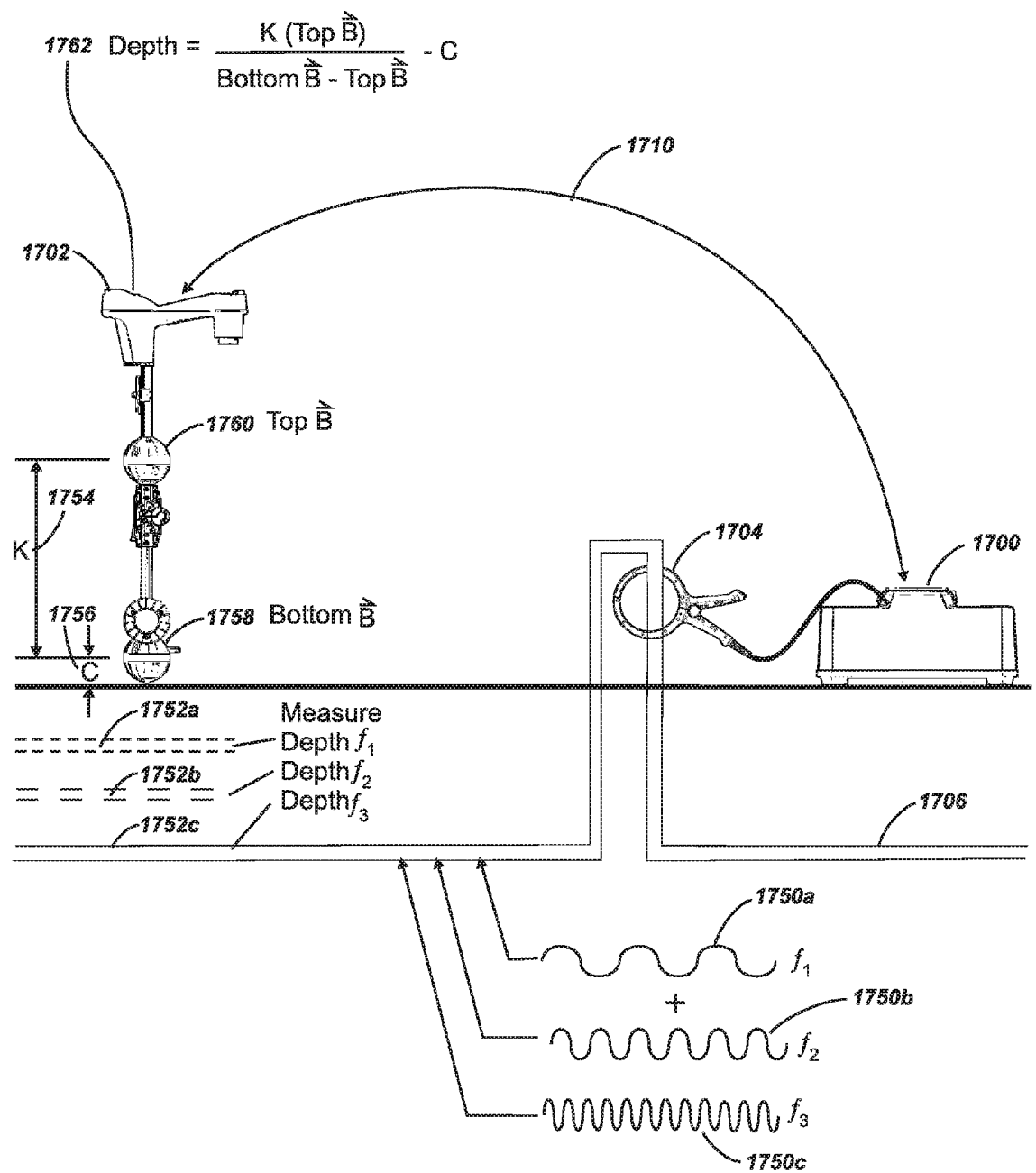
FIG. 17b illustrates a portable locating system that includes at least one receiver and one transmitter that can each communicate by wireless means in which the variation in depth measurement appearing as function of frequency, in addition to transmitted current and voltage data, is determined by commanding a remote transmitter to generate two frequencies (simultaneously or sequentially). The comparison of depth measurements at frequencies is used to improve the accuracy of depth measurement.

According to one aspect of this invention, a portable locating system that includes at least one receiver and one transmitter that can each communicate by wireless means whereby the variation in depth measurement as a function of frequency can be determined at a receiver by commanding a remote transmitter to simultaneously or sequentially to transmit two or more different frequencies and measuring the relative change in receiver measured depth. The information can be used to extrapolate the depth measurement to zero frequency to provide an improved accuracy depth measurement. If three or more frequencies are used then the measurements can be compared to a skin depth model and variations in ground return current due to local variations in soil conductivity can be ascertained. (Ref. FIG. 17b)

Figure 18:
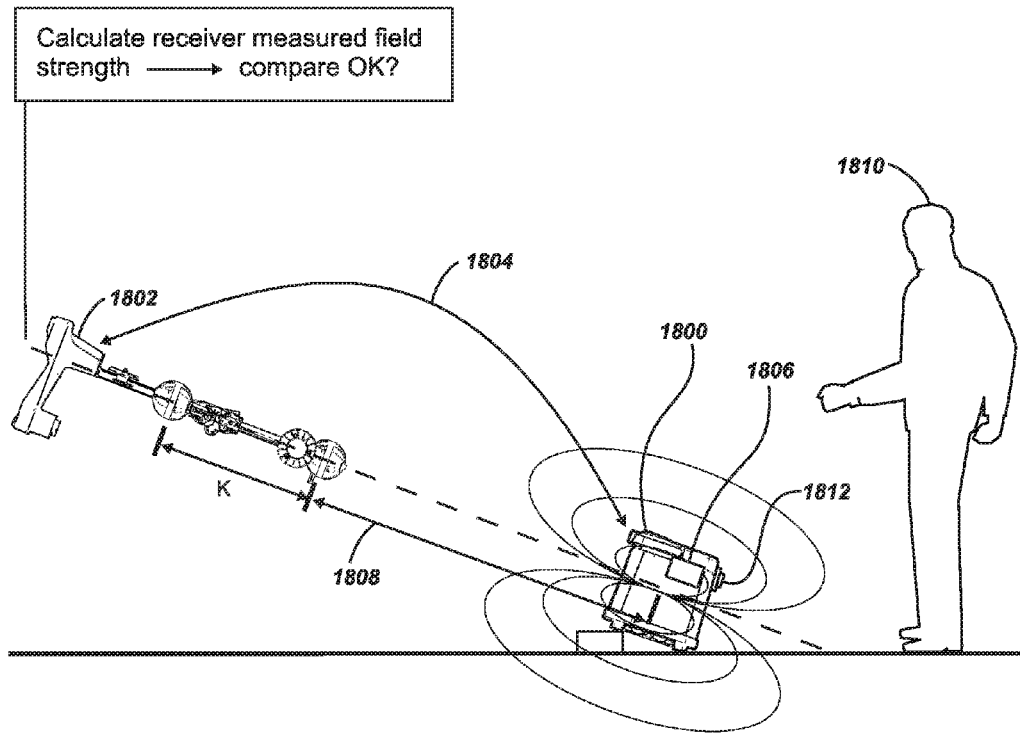
FIG. 18 illustrates a portable locating system that includes at least one receiver and one transmitter that can each communicate by wireless means, in which self diagnostic information is exchanged and communicated to the receiver for calculating reliability of results and diagnosing system failures, and which may include methods to determine functioning of various locator system elements.

According to one aspect of this invention, a portable locating system that includes at least one receiver and one transmitter that can each communicate by wireless means whereby self diagnostic information can be exchanged and communicated between system elements. (Ref. FIG. 18)

Figure 19:
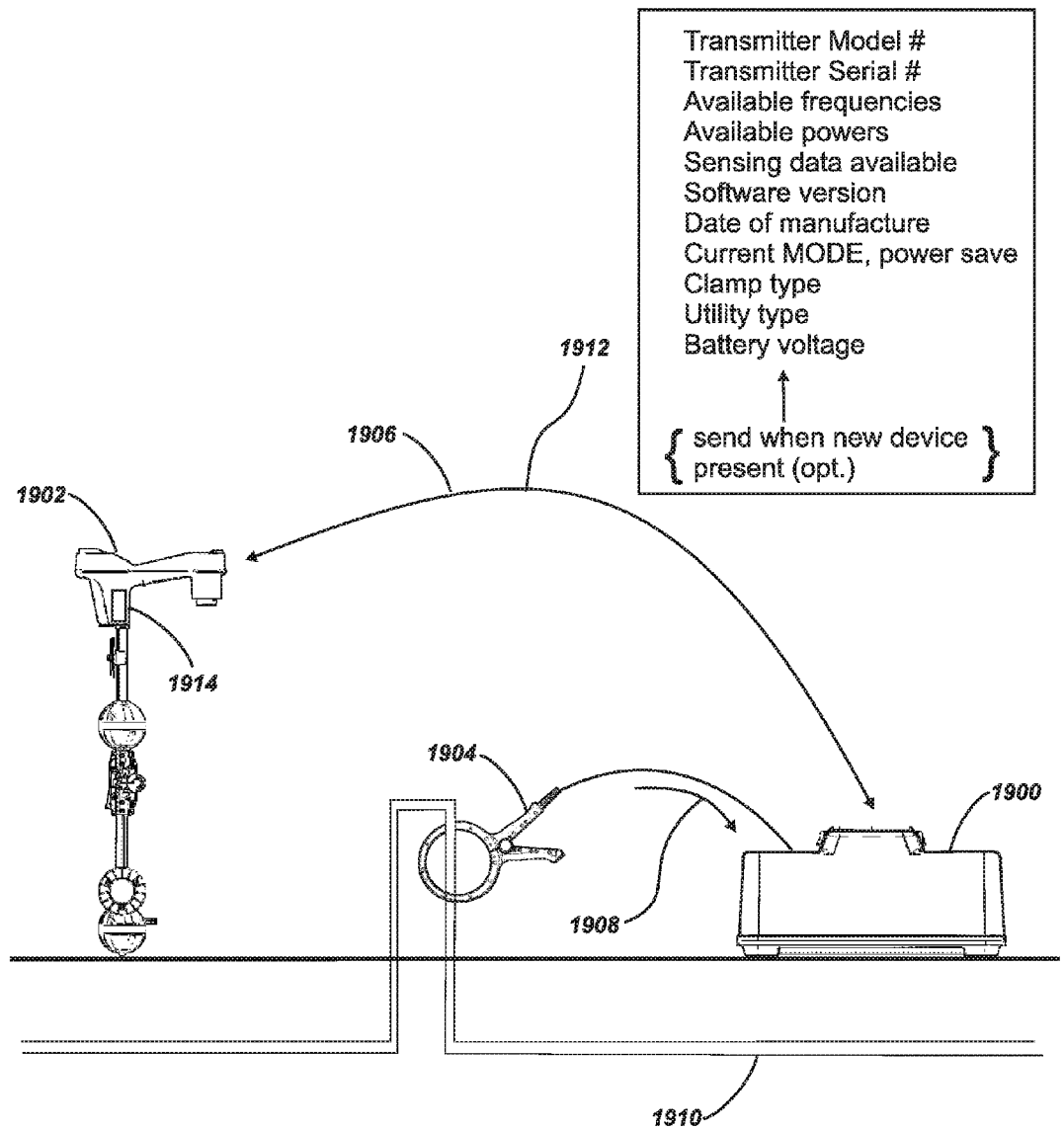
FIG. 19 illustrates a portable locating system that includes at least one receiver and one transmitter that can each communicate by wireless means, in which elements of the system are recognizing a newly added element of the system, a "smart" clamp, across a wireless data link.

According to one aspect of this invention a portable locating system that includes at least one receiver and one transmitter that can each communicate by wireless means whereby newly detected system elements can identify themselves to the other elements in the system and also provide information about all of their capabilities to the rest of the system. A transmitter for example can know that it is hooked to a certain type of clamp and can communicate that information to the receiver to allow a full audit of the locating process to be stored. (Ref. FIG. 19)

Figure 20:
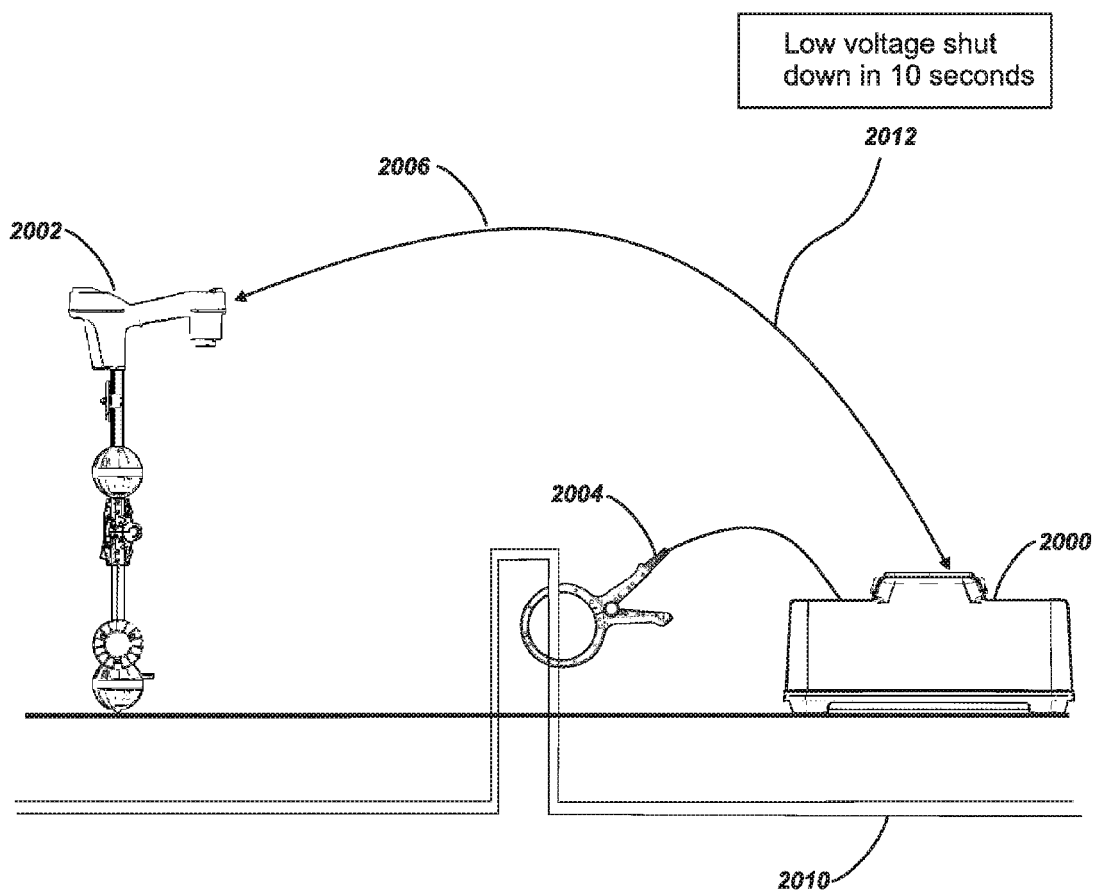
FIG. 20 illustrates a portable locating system that includes at least one receiver and one transmitter that can each communicate by wireless means, in which a transmitter experiencing low battery condition is informing other elements of the system group of an imminent resultant shutdown.

According to one aspect of this invention a portable locating system that includes at least one receiver and one transmitter that can each communicate by wireless means whereby a transmitter or other system member notifies other system elements that its batteries are nearly exhausted and warns of an impending shutdown. (Ref. FIG. 20)

Figure 21:
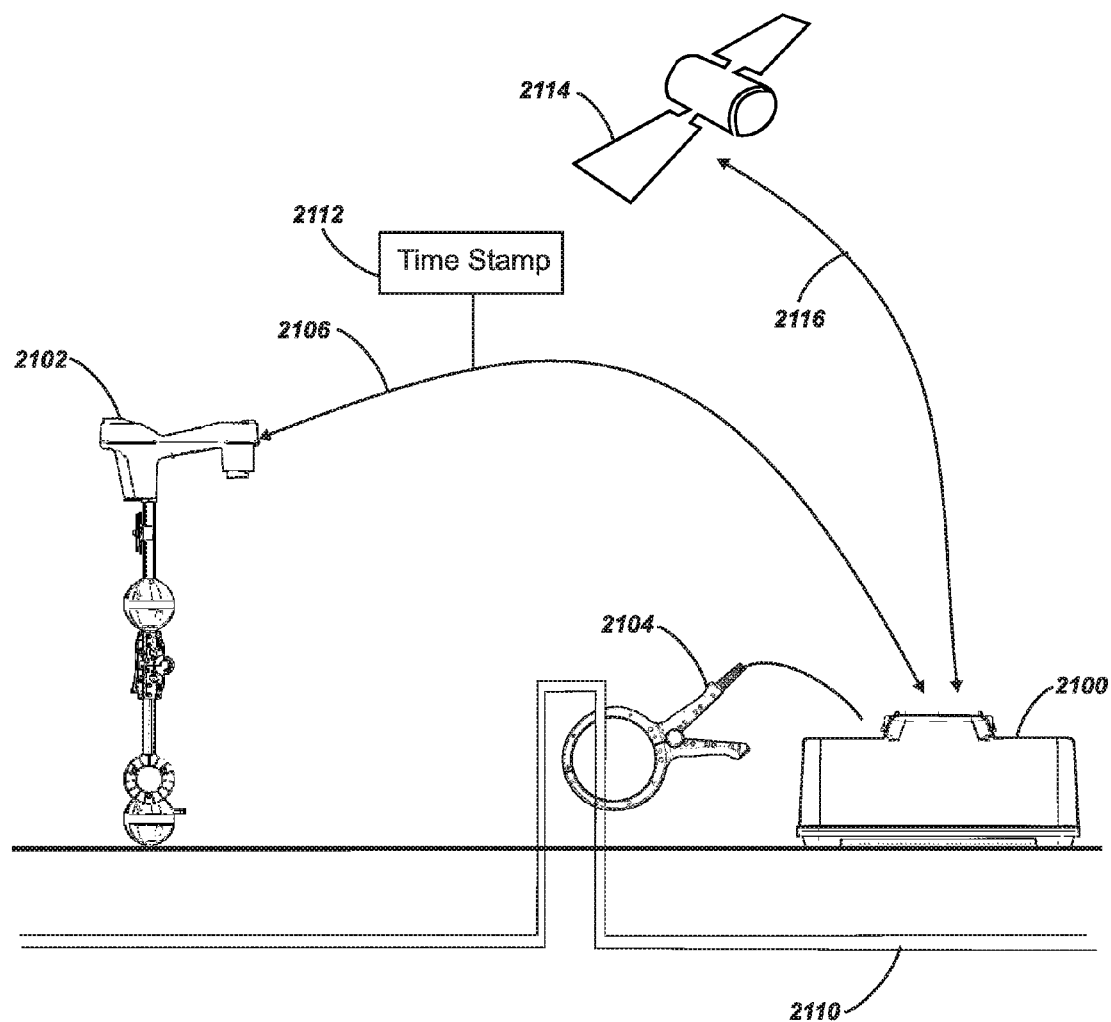
FIG. 21 illustrates a portable locating system that includes at least one receiver and one transmitter that can each communicate by wireless means in which all clocks of the system elements are being synchronized, in this case using an optional GPS satellite time signal.

According to one aspect of this invention, a portable locating system that includes at least one receiver and one transmitter that can each communicate by wireless means whereby all clocks, including real time clocks present in system elements can be synchronized in time. Any one communicating system element can serve as a master clock. Any one communicating system element with available external clock such as GPS time can serve to synchronize system clocks to an external time reference. (Ref. FIG. 21)

Figure 22:
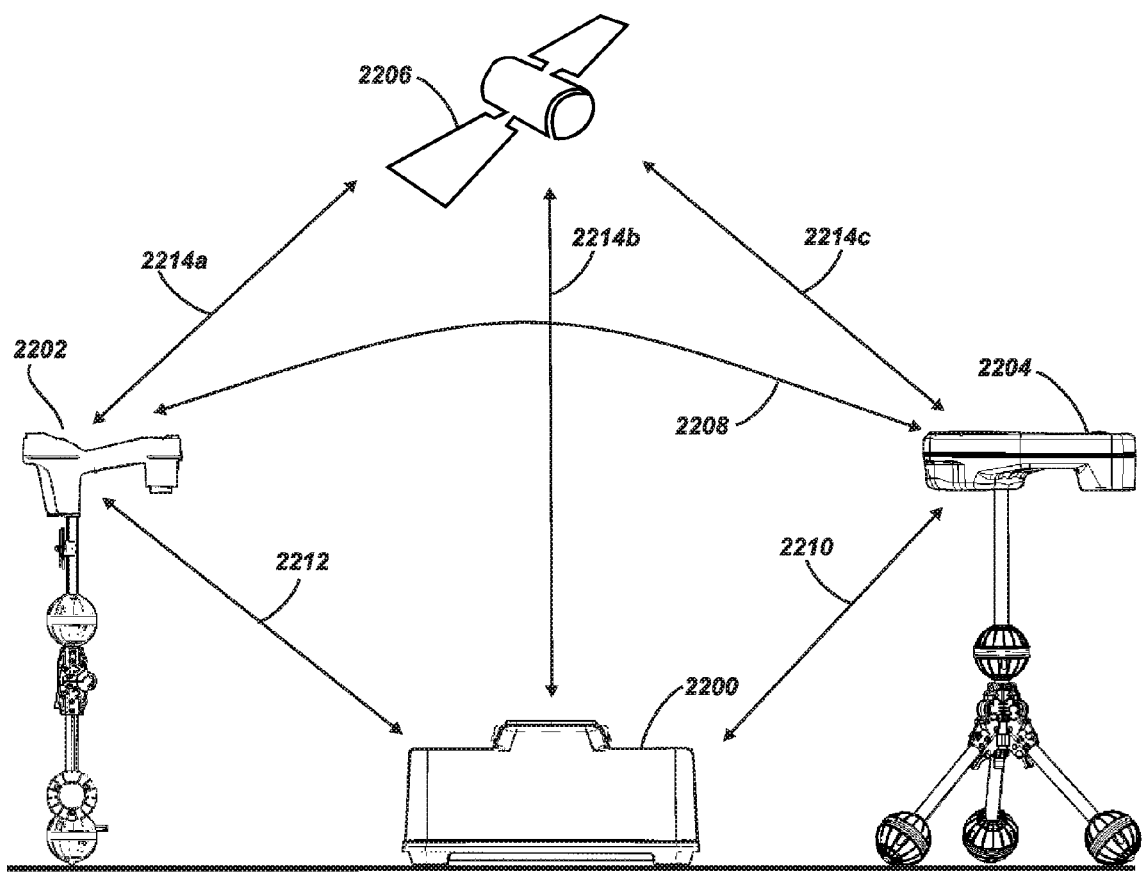
FIG. 22 illustrates a portable locating system that includes at least one receiver and one transmitter that can each communicate by wireless means, in which system elements are equipped with GPS receiver, and in which DGPS corrections are exchanged between system elements in order to improve relative position accuracy. Units may similarly be equipped with Inertial Navigation modules to provide location and movement data independent of or in addition to GPS information.

According to one aspect of this invention a portable locating system that includes at least one receiver and one transmitter that can each communicate by wireless means whereby any system member may have a GPS receiver allowing DGPS corrections to be made, exchanged and or stored between system elements and the relative position accuracy improved. In addition, any unit may be equipped with an Inertial Navigation module to provide location or movement data independent of or supplementary to GPS information. (Ref. FIG. 22)

Figure 23:
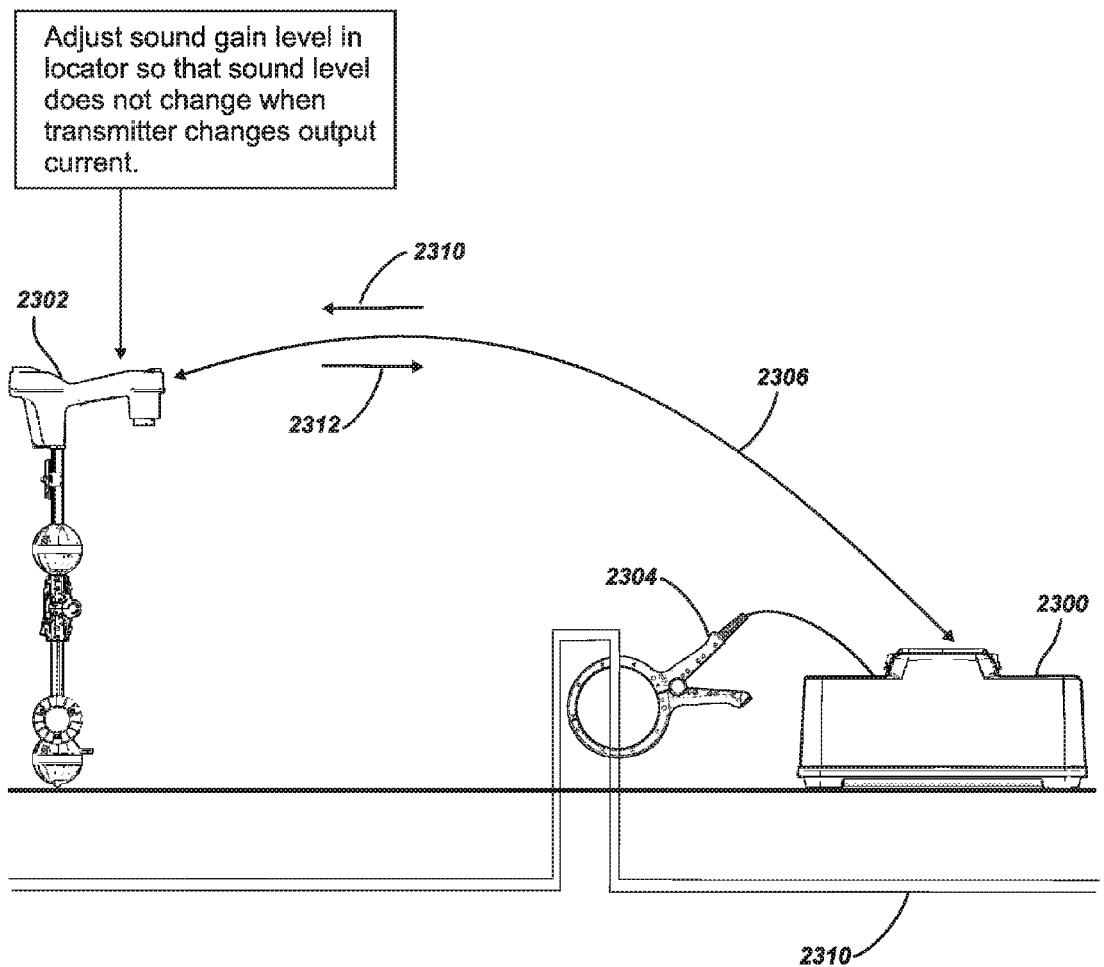
FIG. 23 illustrates a portable locating system that includes at least one receiver and one transmitter that can each communicate by wireless means, in which a receiver controls a transmitter to increase or reduce transmitted current in order to maintain signal strength at the receiver. The receiver is also modulating sound gain levels at the receiver so that they do not change when transmitter output current changes, thus making the process transparent to the operator.

According to one aspect of this invention a portable locating system that includes at least one receiver and one transmitter that can each communicate by wireless means whereby the receiver commands a transmitter to only source the amount of current needed for a strong and stable signal thereby conserving available battery energy. Operator intervention is not required and this process may be transparent to the operator. Additional to this aspect is the automatic adjustment of the sound gain level, such that changes in output current do not cause changes in sound level (Ref. FIG. 23)

Figure 24:
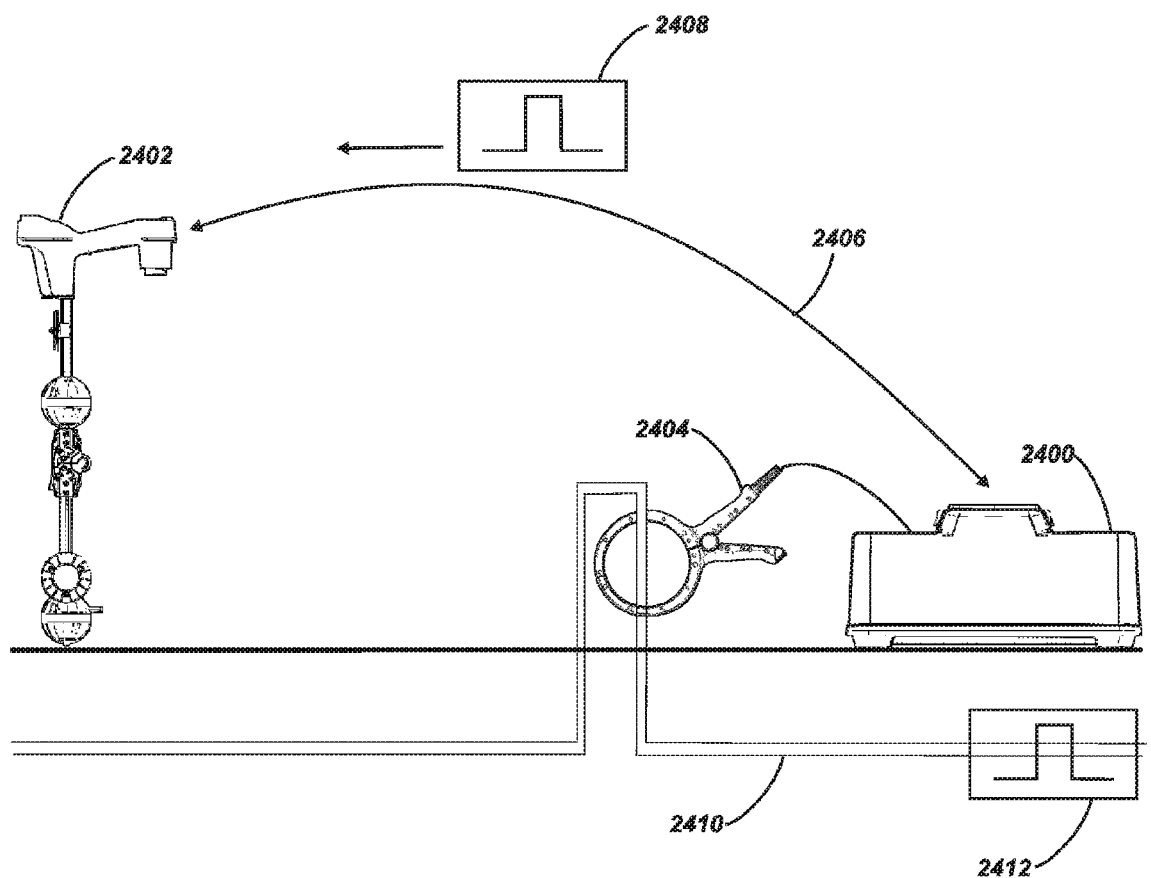
FIG. 24 illustrates a portable locating system that includes at least one receiver and one transmitter that can each communicate by wireless means, in which a phase reference timing signal is communicated by the transmitter to the receiver. The transmitter may optionally include a time-stamp in the transmission. The transmitter may also send the corresponding phase signal on the utility itself.

According to one aspect of this invention a portable locating system that includes at least one receiver and one transmitter that can each communicate by wireless means whereby a phase reference timing signal is sent from the transmitter to the receiver for the purposes of determining relative phase of the transmitted signal at the receiver. (Ref. FIG. 24)

Figure 25:
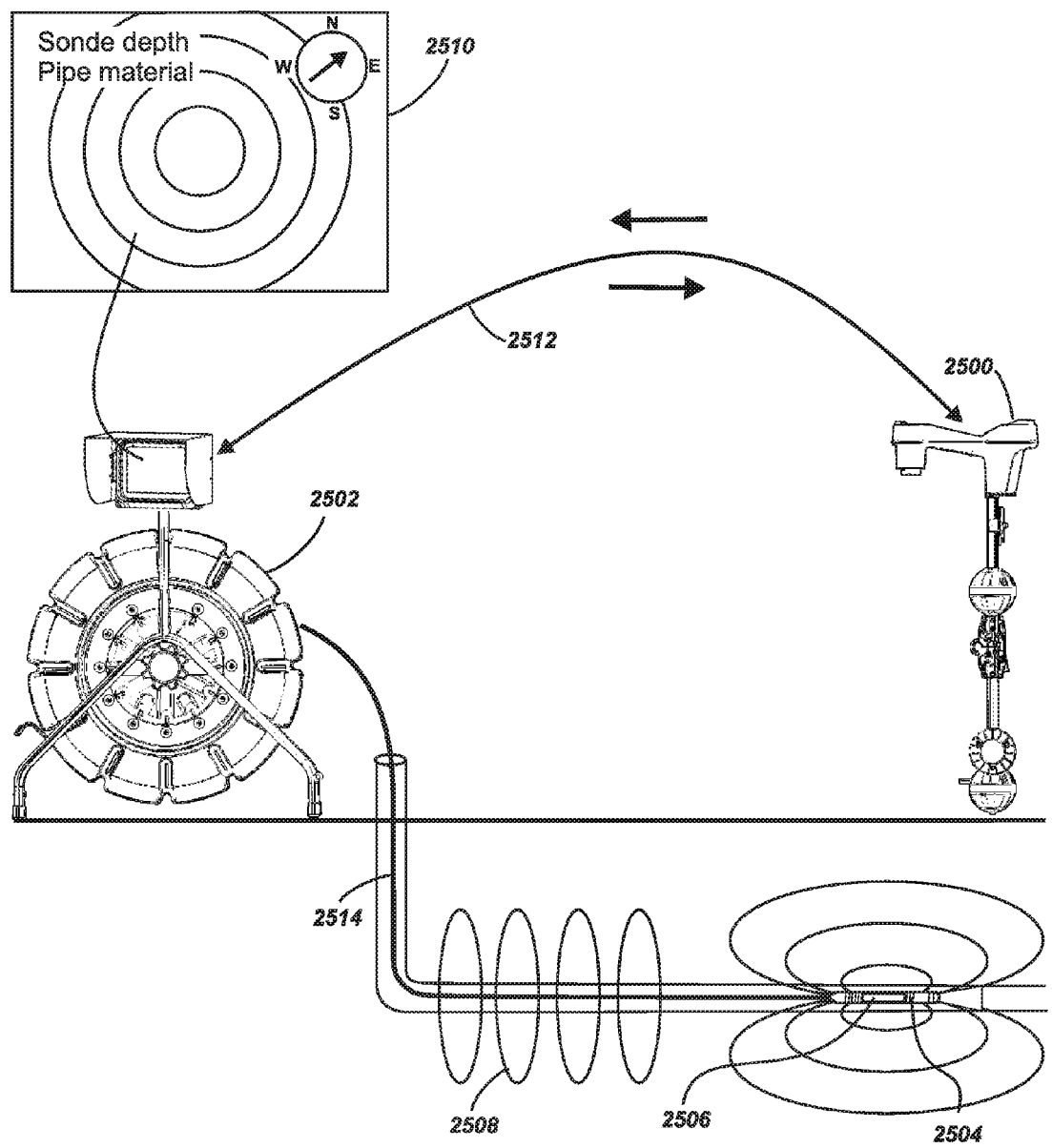
FIG. 25 illustrates a portable locating system that includes at least one receiver and one transmitter that can each communicate by wireless means, integrated with a pipe inspection camera system using a sonde to generate a detectable signal. Data items being communicated including sonde depth, signal strength, cable footage count, compass angle, sonde power status, camera tilt and sonde angles, and control signals to turn the transmitter on or off.

According to one aspect of this invention a portable locating system that includes at least one receiver and one transmitter that can each communicate by wireless means and used in conjunction with a pipe inspection camera system that was similarly enabled. The camera system sends the locator the pushcable count and the receiver sends the camera system the measured Sonde signal strength and/or line depth. Optionally if the camera system was equipped to determine the signal strength of its Sonde, then the Sonde signal strength information can be sent to the receiver and the combined pipe-ground signal attenuation characteristics can be determined. As the locator is walked along the pipe as the sonde is pushed, the depth of the pipe can be displayed and recorded on the video. If a transmitter can be turned off and on, this function could also be controlled from the locator, avoiding the problem of needed to return to the camera controller to turn on the transmitter. Optionally, if the locator is equipped with a compass, the orientation of the pipe relative to true or magnetic north can be recorded on the video. Additionally, if the locator was navigated the route and depth of the pipe can be mapped. (Ref. FIG. 25)

Figure 26:
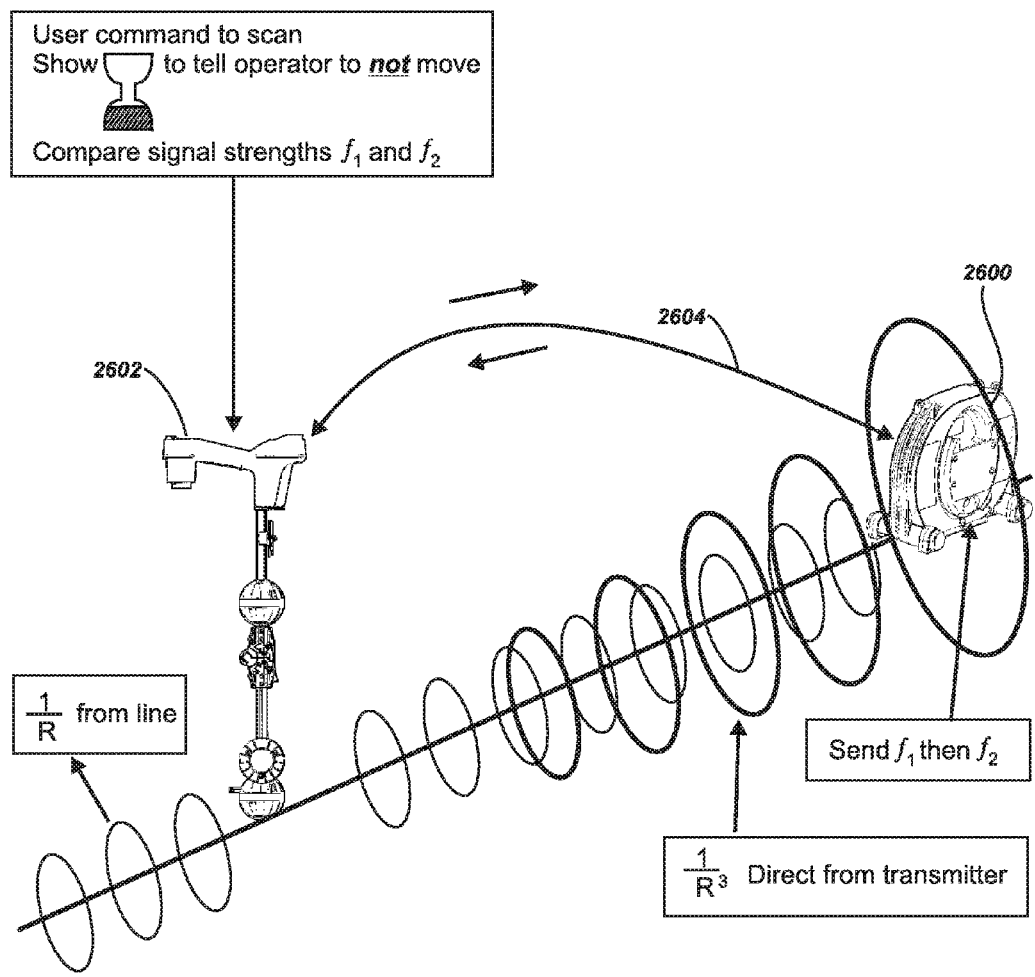
FIG. 26 illustrates a portable locating system that includes at least one receiver and one transmitter that can each communicate by wireless means, in which a multiple-frequency capable inductive transmitter is being remotely controlled by a distant receiver, and information from the line and the transmitter are compared in order to determine the degree of any air coupling between transmitter and receiver. By compensating for or correcting signal strength caused by air coupling, the system allows an operator to perform locating tasks closer to the transmitter.

According to one aspect of this invention a portable locating system that includes at least one receiver and one transmitter that can each communicate by wireless means whereby a multi-frequency utility induction transmitter can be remotely controlled and switched between two frequencies. The degree of air coupling can be determined be comparing how the received signals change as a function of frequency. The air coupling can be accurately determined and can be subtracted from the received signal data and the degree of air coupling can thereby be reduced. This allows the operator to locate hidden utilities closer to an inductive dipole source. One or more transmitter source magnetic field strengths can be measured internally at the transmitter and transmitted by wireless means to one or more receivers. (Ref. FIG. 26)

Figure 27:
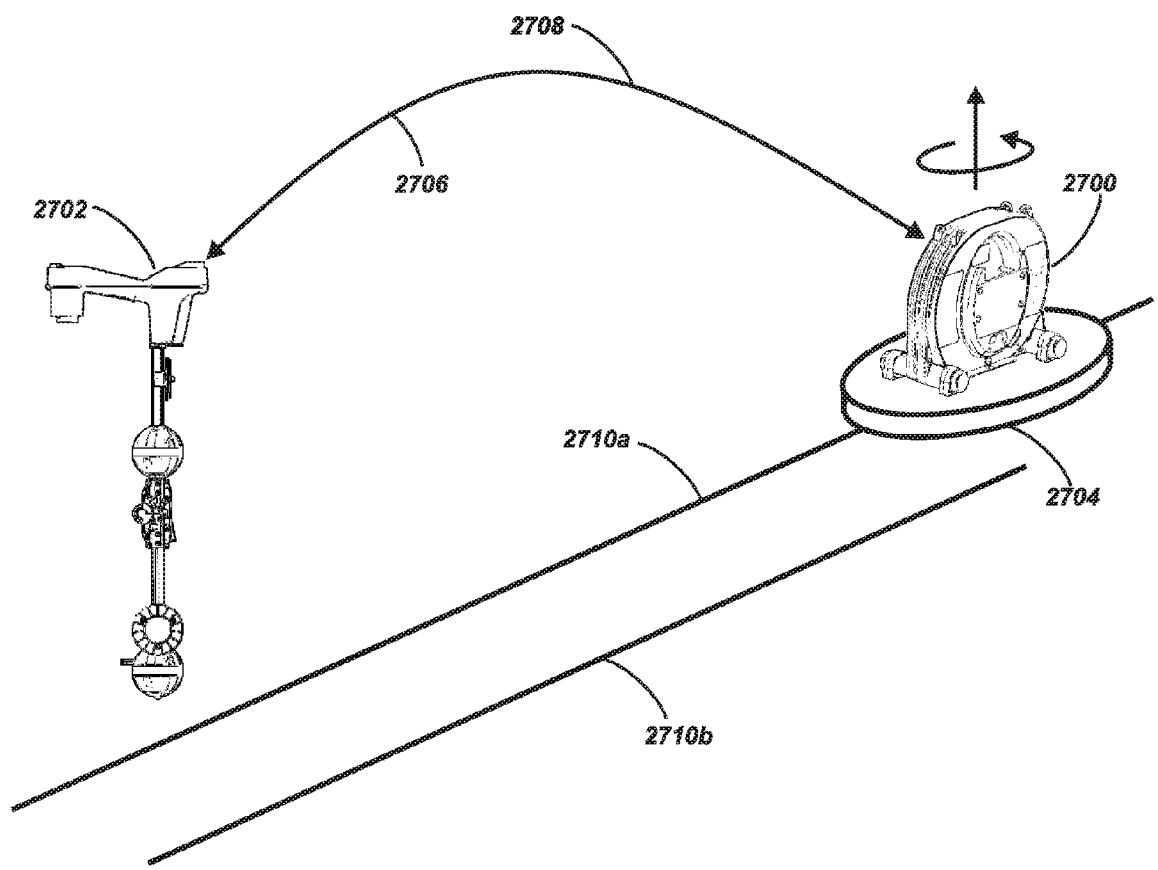
FIG. 27 illustrates a portable locating system that includes at least one receiver and one transmitter that can each communicate by wireless means wherein a rotating and/or tilting (not shown) mechanism is incorporated into the transmitter and its angle and degree of tilt and rotation controlled from the receiver, thus enabling signals from separate utilities to be individually nulled, and the utilities in a complex situation to be individually located.

According to one aspect of this invention a portable locating system that includes at least one receiver and one transmitter that can each communicate by wireless means whereby a rotating or tilting means remotely controlled from the receiver by said wireless means is placed under or integrated into an inducing transmitter. The inducing transmitter is rotated and/or tilted until the signal on a target line is minimized or nulled, allowing adjacent nearby utility lines to be separately located. (Ref. FIG. 27)

Figure 28:
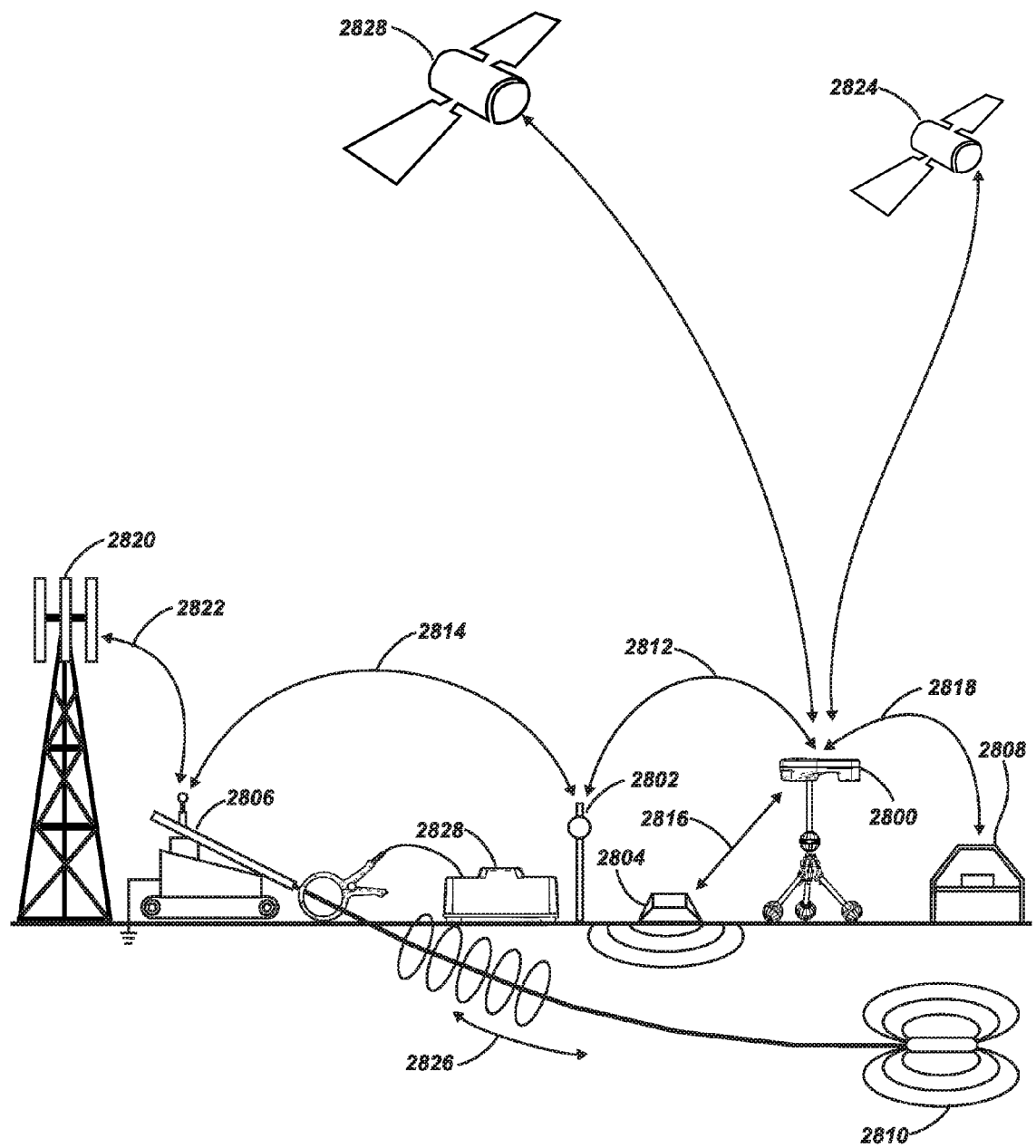
FIG. 28 illustrates a portable locating system that includes at least one receiver and one transmitter that can each communicate by wireless means in which the group network is extended to include a variety of other devices used in location and detection tasks, including a geophone, an A-frame fault detector, and a sonde of the type used in Horizontal Directional Drilling (HDD) applications. The extended network incorporates information from GPS and/or Iridium satellites and includes, as well, a cell-based WAN link or satellite uplink such as Iridium, and a wireline link to the HDD machine. The network is extended by a data-relay node device. Additionally, any device or node in the network may include an Inertial Navigation module to provide supplementary location or movement data to the network.

According to one aspect of this invention a portable locating system that includes at least one receiver and one transmitter that can each communicate by wireless means whereby a locating system where transmitters are not limited to EM devices (conducted, coupled or induced), but could also include acoustic receivers or transmitters, or other types of transmissions as might be used in utility location and leak detection, directional drilling, or other related tasks. These would be able to connect to this same network, and would likewise periodically transmit their status. According to one aspect of the present invention, a portable display and communication device is used at least in part, as the display and user interface system for a man portable pipe and cable locating system. According to one aspect of the present invention, a portable display and communication device is used at least in part, as the display and user interface system for a video pipe inspection system. (Ref. FIG. 28)

Figure 29:
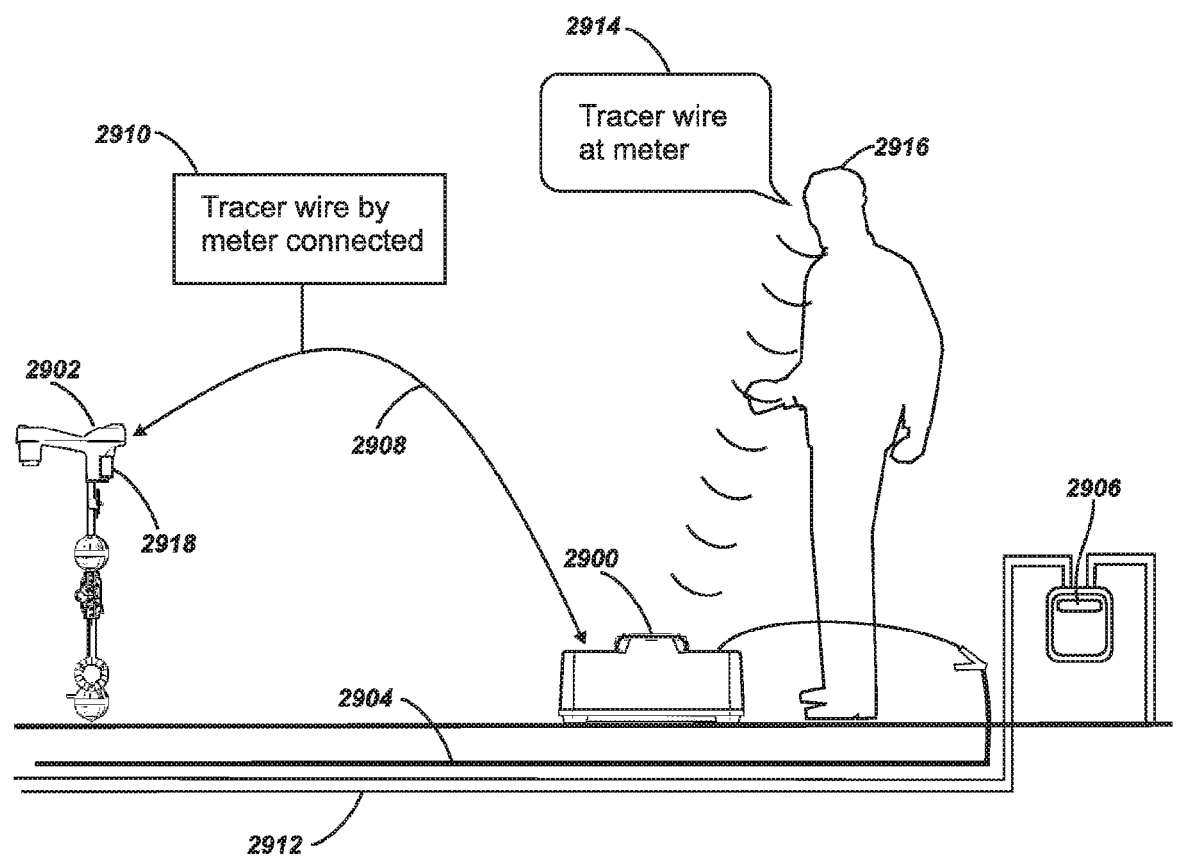
FIG. 29 illustrates a portable locating system that includes at least one receiver and one transmitter that can each communicate by wireless means in which the operator uses the data-link between a transmitter and a receiver to send information to the receiver describing the nature of the connection made in connecting the transmitter to the utility. (In this example, the transmitter is connected by means of a tracer wire installed along the exterior of a non-conducting gas-line).

According to one aspect of this invention a portable locating system that includes at least one receiver and one transmitter that can each communicate by wireless means whereby when the operator connects a transmitter to a utility the operator can communicate the type of the connection point (e.g. pipe, tracer wire, transformer, valve, meter etc.) to which the connection is made to the user interface in either the transmitter or the receiver thus enabling the receiver to display to the operator and optionally store the type of utility connection point associated with the detected signal from a particular transmitter within the locating system group. The communication from the operator to the user interface of either device can be made by any known means including but not limited to keypad, touch screen or voice input (Ref. FIG. 29)

According to one aspect of this invention a portable locating system that includes at least one receiver and one transmitter that can each communicate by wireless means whereby a locating system where devices other than locators and transmitters can be networked, including stand alone GPS receivers, acoustic or laser range finding devices, mapping beacons, or computers which could allow monitoring and/or recording of the locate and optionally allowing transmission of the location data in real time or post process to other computers via internet or other network. (Ref FIG. 30)

According to one aspect of this invention a portable locating system that includes at least one receiver and one transmitter that can each communicate by wireless means whereby a locating system where the proximity of a transmitter to a locator can be roughly determined by Receive Signal Strength Indication or other means, to allow for special behavior—such as (for instance) having an acoustic pinger active on only the nearest transmitter, so that a user could more easily identify its location, or using that proximity to indicate a special icon on the user interface of the locator. (Ref FIG. 31)

Figure 32:
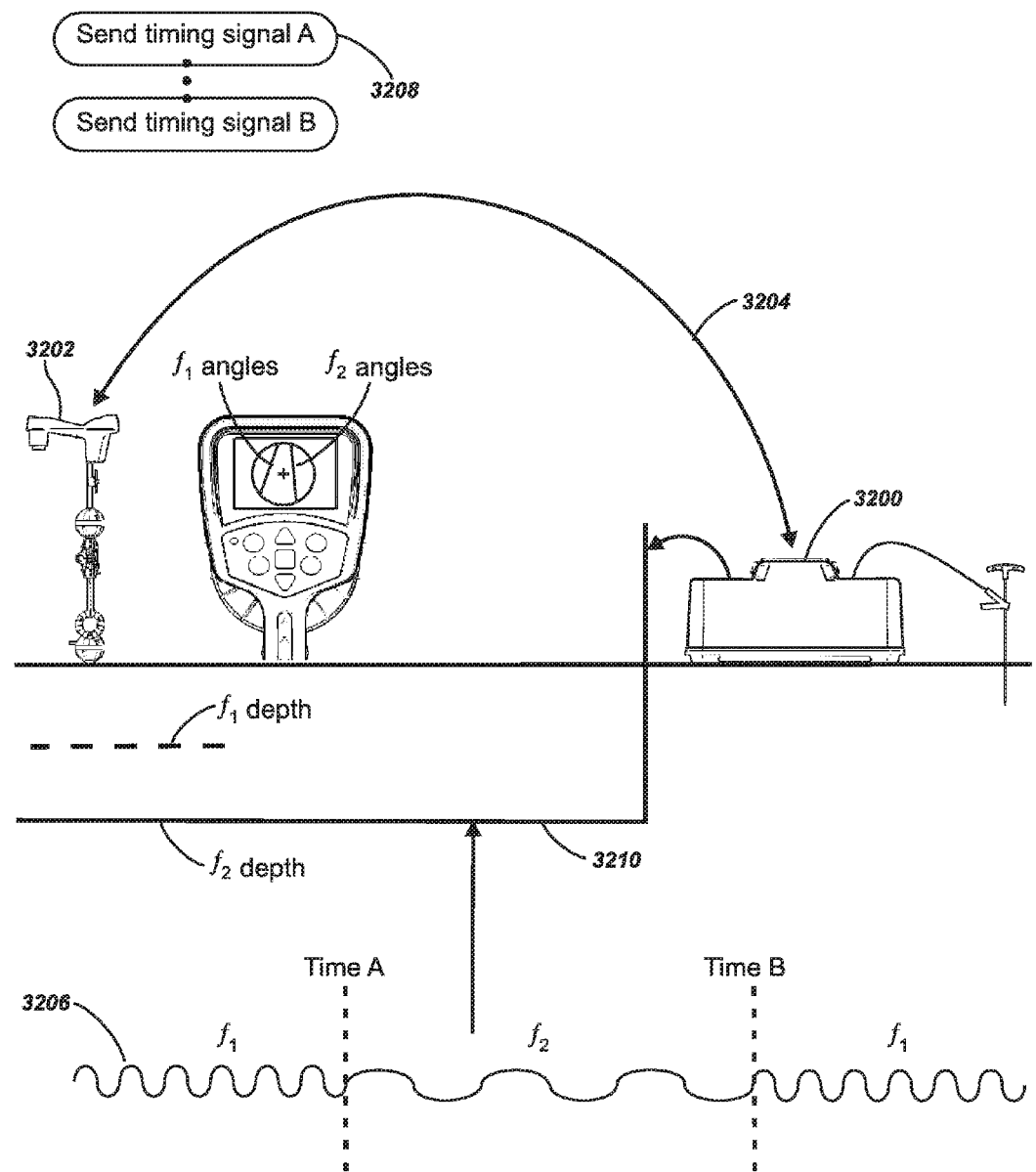
FIG. 32 illustrates a portable locating system that includes at least one receiver and one transmitter that can each communicate by wireless means in which the transmitter sends timing signals for two frequencies wirelessly, such that the presence of coupled utilities can be readily detected by comparison of the apparent target location detected at each of the multiplexed and time-signaled frequency transmissions. Similarly, a change in apparent depth between the time-multiplexed frequency signals can be used as a basis for depth correction.

According to one aspect of this invention, a portable locating system that includes at least one receiver and one transmitter that can each communicate by wireless means whereby a transmitter can time multiplex its output between two or more frequencies and the timing signals can be sent wirelessly to maintain synchronization between the two devices. In particular, using narrow band short time constant (or FIR) filters in front of a correlation based receiving channel the output of a transmitter might be rapidly switched between two different output modes and the receiver would be relatively insensitive to phase shifts. If the apparent position of a utility changes appreciably at different frequencies then other coupled utilities are present. If the depth moved vertically between the different frequencies, then a depth correction may be required. (Ref. FIG. 32)

Figure 33:
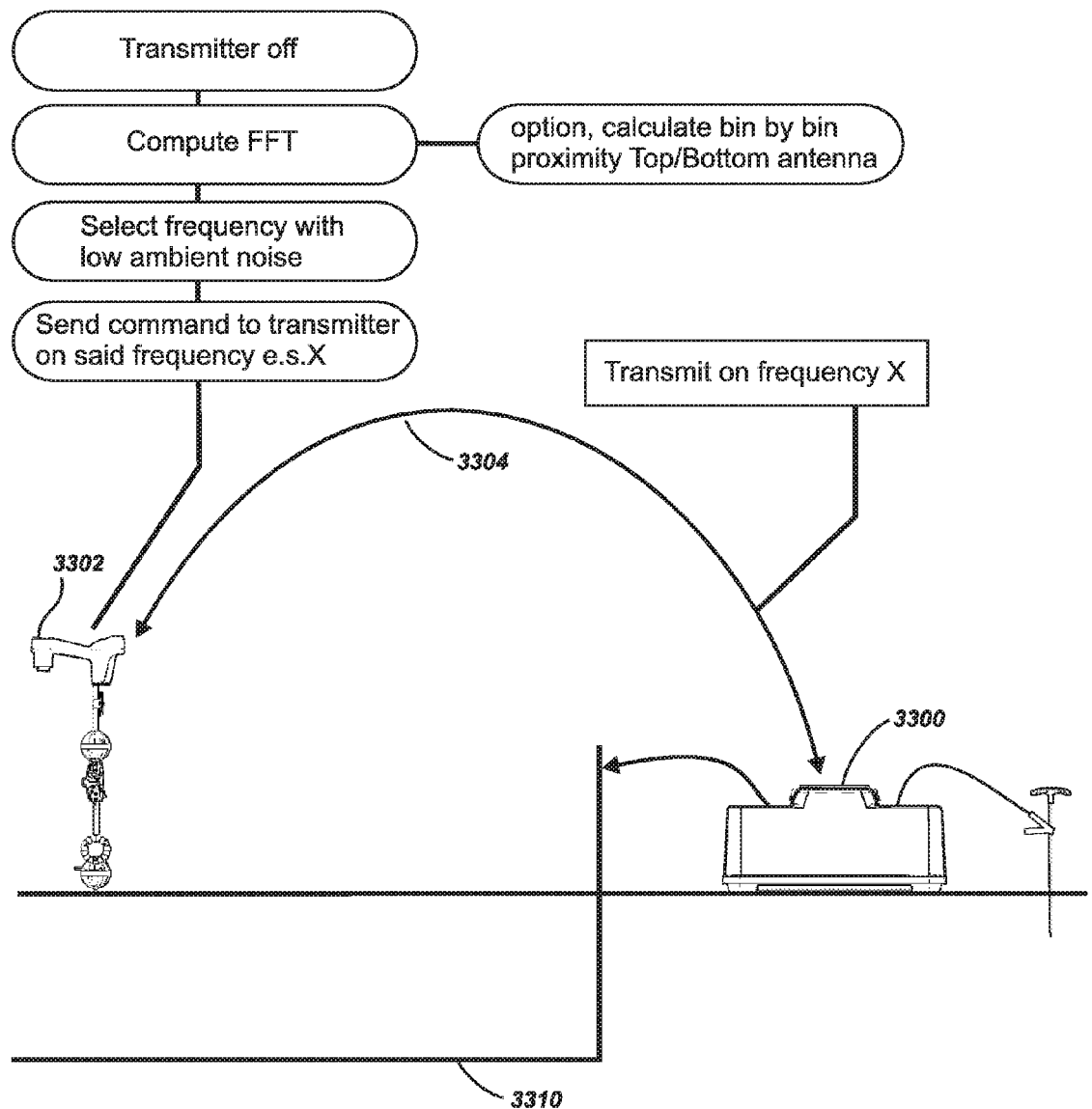
FIG. 33 illustrates a portable locating system that includes at least one receiver and one transmitter that can each communicate by wireless means in which the locator/receiver performs sampling of the ambient electromagnetic frequency domain, using FFT or other methods, in order to identify frequencies which will produce improved signal to noise ratio in the locating process; the calculated optimum frequency is then set on the transmitter by means of a wireless control link between receiver/locator and transmitter.

According to one aspect of this invention a portable locating system that includes at least one receiver and one transmitter that can each communicate by wireless means whereby the ambient electromagnetic environment can be sampled in the frequency domain by an FFT or other methods known in the art. This information can be used to identify frequencies that will provide improved signal to noise and the transmitter can be commanded to transmit at one or more of these identified frequencies. (Ref. FIG. 33)

Figure 34:
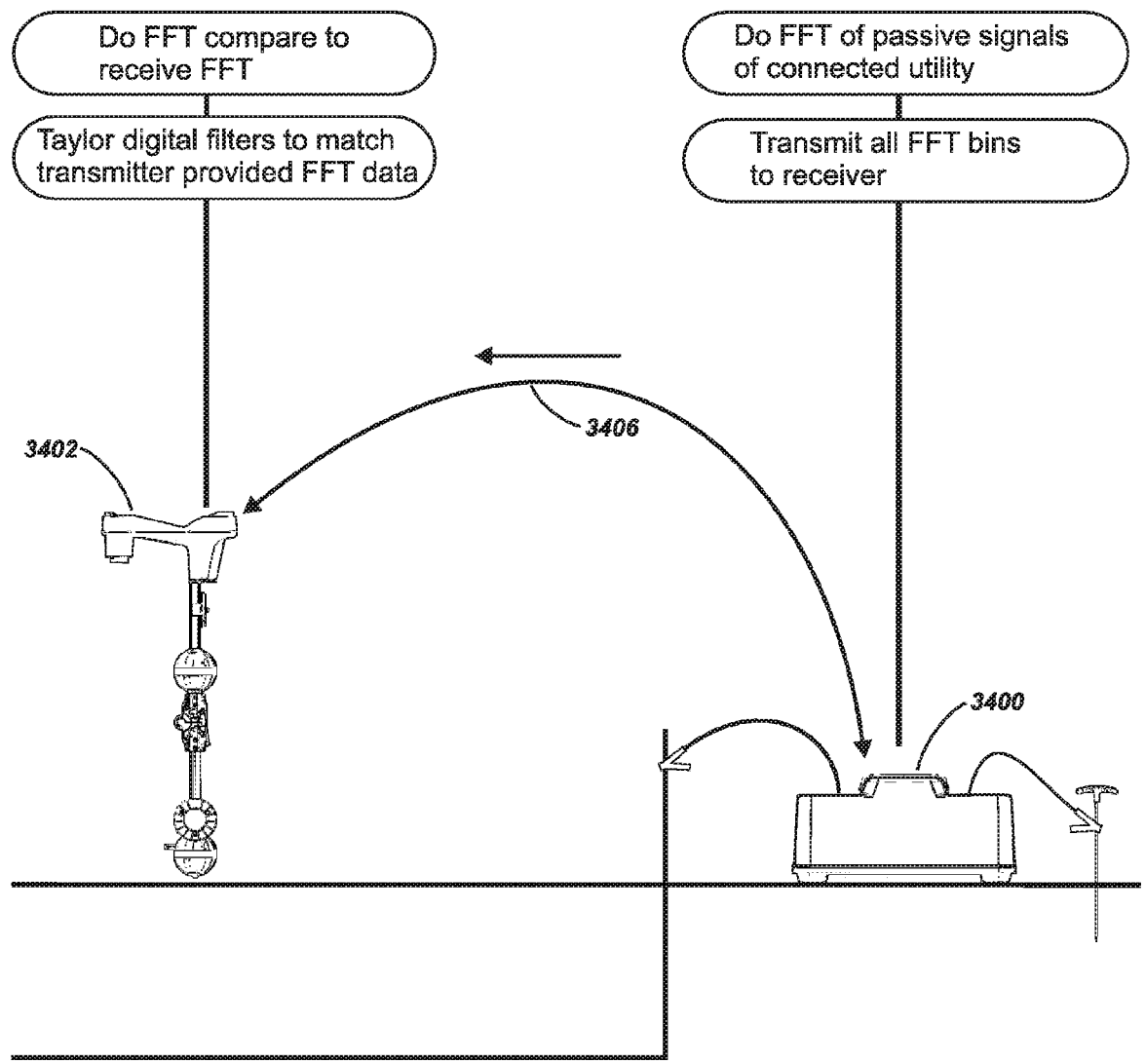
FIG. 34 illustrates a portable locating system that includes at least one receiver and one transmitter that can each communicate by wireless means in which a distant transmitter monitors the amplitudes of various signal peaks and harmonics and transmits computed FFT "frequency bins" to the receiver, which in turn compares and tunes its digital filters against the profile of the transmitter-provided FFT data to optimize the signal-to-noise ratio in the locating process. The use of the monitored information as a "fingerprint" of the connected utility can then enable a receiver to confirm that it has detected the same utility or a different one. Analog-Digital Converter (ADC) information can be similarly transmitted instead of FFT frequency bin data; transmission can be via ZigBee, Bluetooth, a 6LoWPAN sensor network design, or other means.

According to one aspect of this invention a portable locating system that includes at least one receiver and one transmitter that can each communicate by wireless means whereby the amplitudes of various signal peaks or harmonics can be monitored in real time by a receiver at a remote location to serve as a "fingerprint" of a given utility. This information can then be transmitted to another receiver which can determine if it is locating the same utility. Alternately, if adequate bandwidth is available a copy of the signal can be transmitted and cross-correlated in the second receiver. ADC data can be transmitted via ZigBee, Bluetooth or other means. Alternately, FFT frequency bin data can be transmitted. (Ref. FIG. 34)

Figure 35:
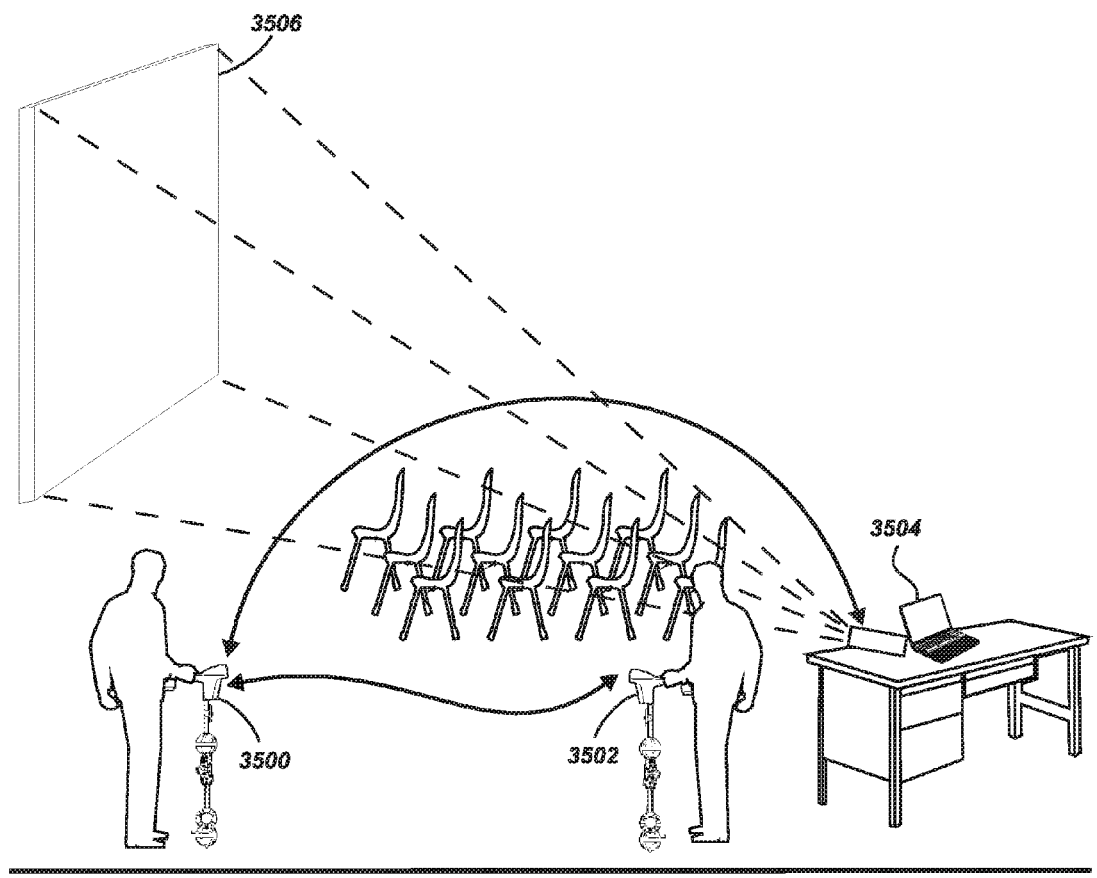
FIG. 35 illustrates a portable locating system in which a remote locator display is relayed wirelessly to a separate projection device, displaying locator events for classroom training in near-real time, while optionally also controlling the "slaved" display on a student receiver/locator.

According to one aspect of this invention a portable locating system that includes at least one receiver and one transmitter that can each communicate by wireless means whereby a remote locator display is enabled on a separate device; for example, in displaying locator events for classroom training in real time or near-real time. (Ref. FIG. 35)

Figure 36:
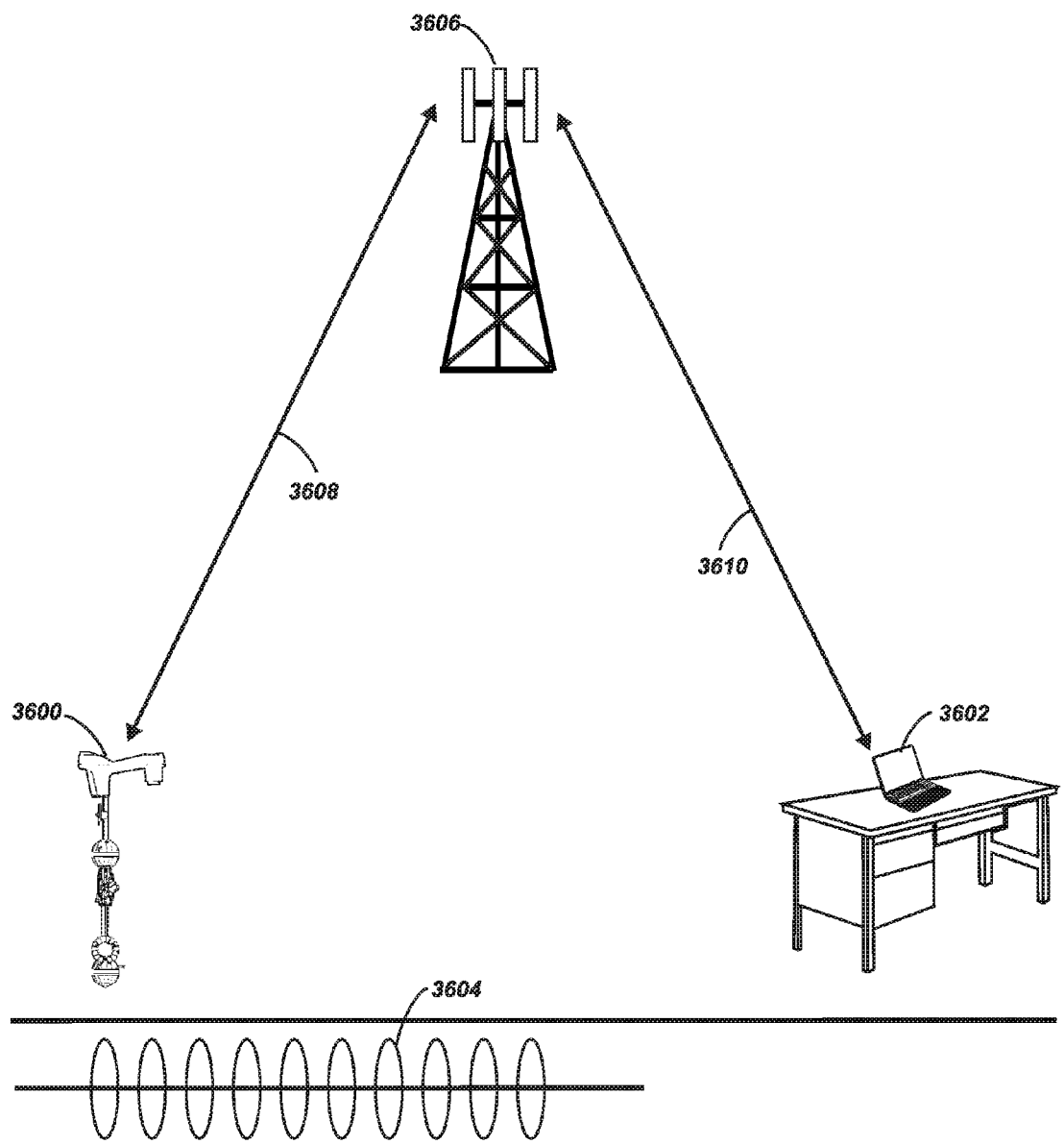
FIG. 36 illustrates a portable locating system in which a remote receiver/locator display is sent as data via a wireless link and then displayed on a remote device such as a supervisor's portable computer or a training system. If the sending unit is doing passive locating, no transmitter is required.

According to one aspect of this invention a portable locating system that includes at least one receiver that can each communicate by wireless means and a remote locator display is enabled on a separate device, such as a remote computer used in training or supervision of locator activity. During passive locating, no transmitter is required. (Ref. FIG. 36)

Figure 37:
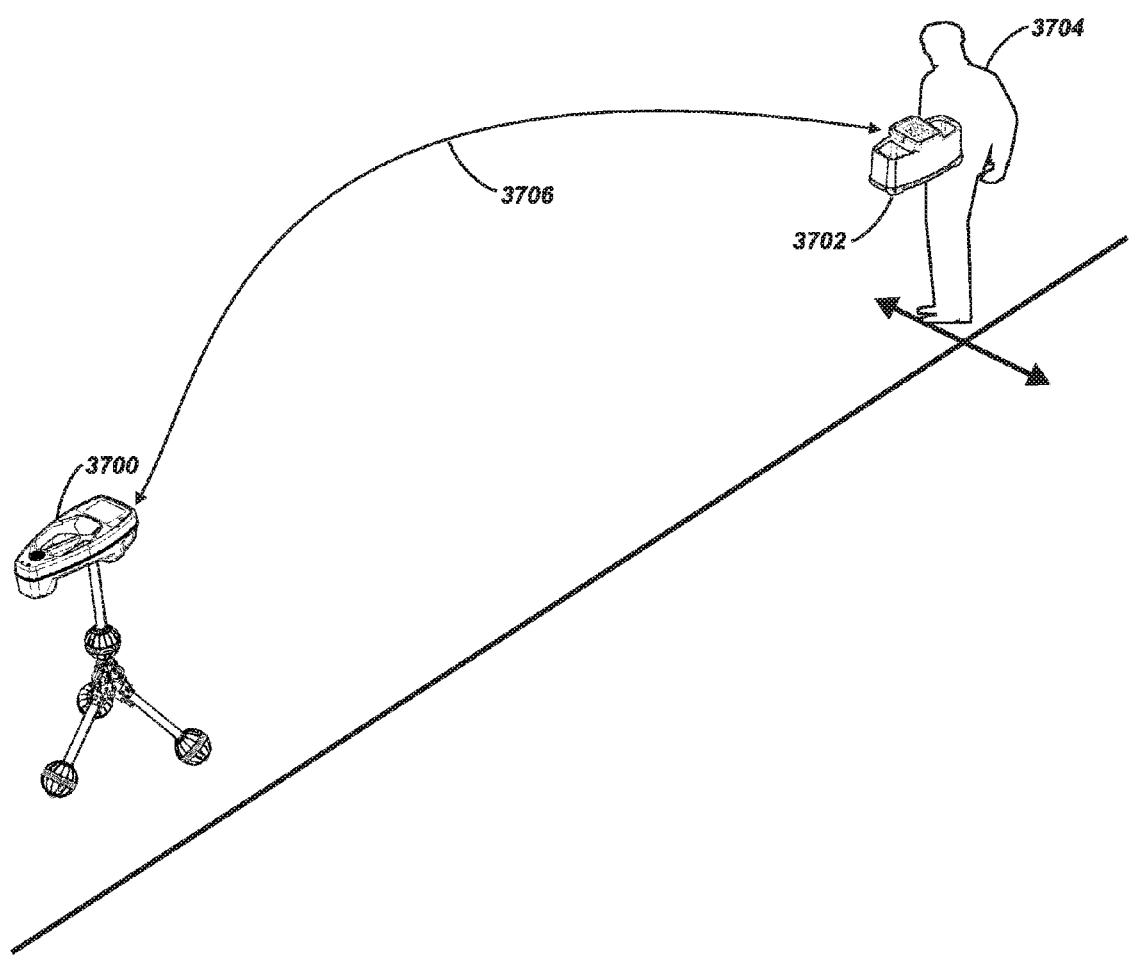
FIG. 37 illustrates a portable locating system that includes at least one receiver and one transmitter that can each communicate by wireless means, in which the transmitter includes a user interface such as a display or speaker, and receives signal strength information from the receiver/locator; the operator is moving the transmitter to determine the point at which a maximum signal or a null signal is received.

According to one aspect of this invention a portable locating system that includes at least one receiver and one transmitter that can each communicate by wireless means whereby a user interface, perhaps a speaker, was present in a Q-ring, then a receiver could be placed over a known line and transmit an indication of its received signal to a remotely located Q-ring being manipulated by an operator to either maximize or null an induced signal as desired. This can be done with a single operator. (Ref. FIG. 37)

Figure 38:
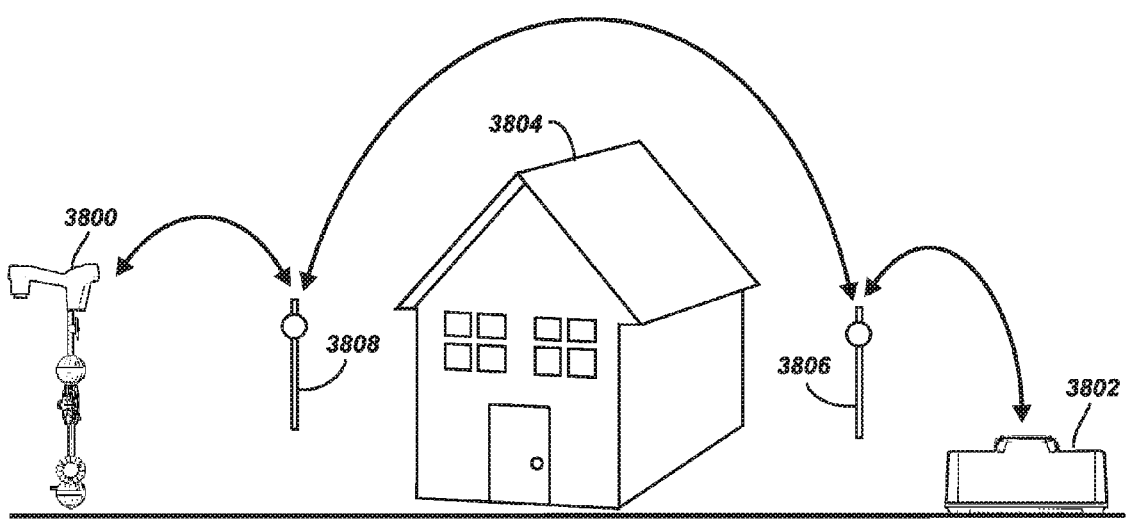
FIG. 38 illustrates a portable locating system that includes at least one receiver and one transmitter that can each communicate by wireless means, and which include two instances of node devices used solely as repeaters in order to extend the mesh network's range or extend it around a signal-barrier such as a building.

According to one aspect of this invention, a portable locating system that includes at least one receiver and one transmitter that can each communicate by wireless means whereby the mesh network of devices in the group may be extended in range by the use of a node device whose sole purpose is extending the range mesh network. For example, a node device might be used to enable a mesh network to communicate around an obstacle which would otherwise prevent network connection from being reliably established such as a metallic shed (Ref. FIG. 38).

Figure 39:
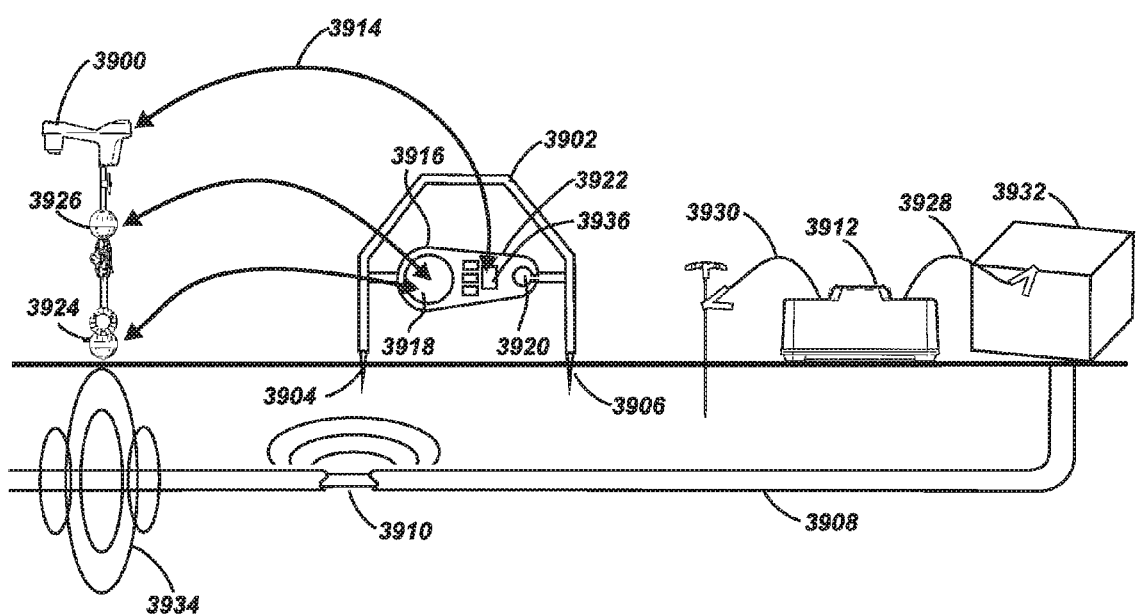
FIG. 39 a portable locating system that includes at least one receiver and one transmitter that can each communicate by wireless means, and including a frequency-shifting re-transmitter used in conjunction with an A-Frame application and device to which the re-transmitter is docked, used in isolating a line fault in a buried utility.

According to one aspect of this invention, a portable locating system that includes at least one receiver and one frequency shifting signal retransmitter that can each communicate by wireless means. (Ref. FIG. 39)

According to one aspect of this invention a fault finding portable locating system that includes at least one receiver and one frequency shifting retransmitter that can each communicate by wireless means whereby the frequency shifting retransmitter is mounted onto a structure with two or more ground contacting probes measuring time varying voltage potentials in the ground. A circuit means in the frequency shifting retransmitter amplifies and frequency shifts and then retransmit said time varying voltage potentials via an antenna coil. The receiver detects said retransmitted signals and determines a signal that relates to the time varying voltage potentials in the ground. (Ref. FIG. 39)

Figure 40:
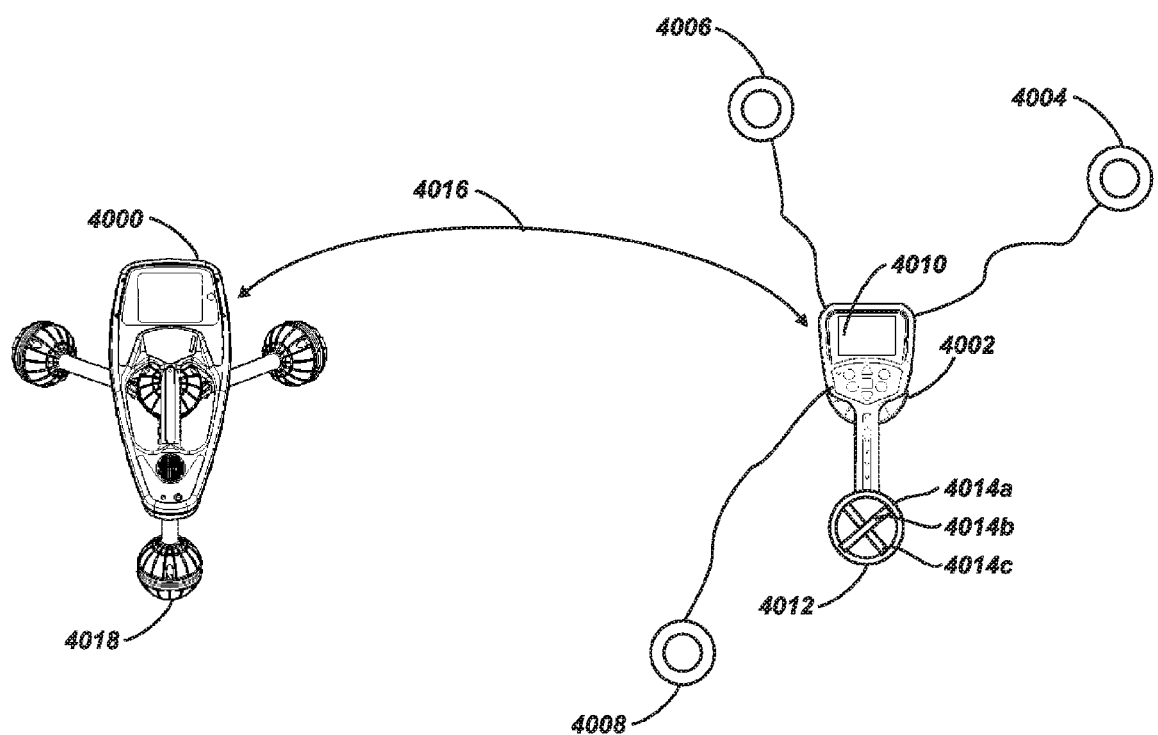
FIG. 40 illustrates a portable locating system including a three-channel spatial re-transmitter used in conjunction with three geophones and a tripod, four-antenna node receiver, that can each communicate by wireless means, and coordinated via wireless links for application in acoustic tomography imaging, or in isolating and locating leaks in a piping system.

According to one aspect of this invention, a portable locating system that includes at least one receiver and one spatially distinct multi-channel signal retransmitter that can each communicate by wireless means. Up to three distinct signals can be transmitted from collocated orthogonal coil antennas and these signals can be separated into distinct channels at the receiver. A rotation matrix can be applied to the incoming data to optimize alignment of each orthogonal transmitted signal into a receiving coordinate system where each axis is nominally aligned with the transmitted signals. Reference tones can be optionally broadcast on each channel to facilitate the coordinate alignment process. Channel to channel cross-correlation can also be minimized, in order to maximize channel separation. (Ref. FIG. 40)

According to one aspect of the present invention, a long-range radio link may join at least one member in each of at least two shorter-range mesh networks, which themselves use a mesh network-capable communication protocol such as ZigBee-enabled or 6LoWPAN network links. Thus, multiple meshes may be joined over longer distances by using a long-range link integrated into one or more members of individual mesh networks, effectively using them as subnets. The long-range link may be established using a cell-phone link or other long range wireless, RF, microwave, fiber-optic, or wired communication means, with mesh-enabled devices at either end of the link serving to join the local mesh networks. (Ref FIG. 41)

Figure 42:
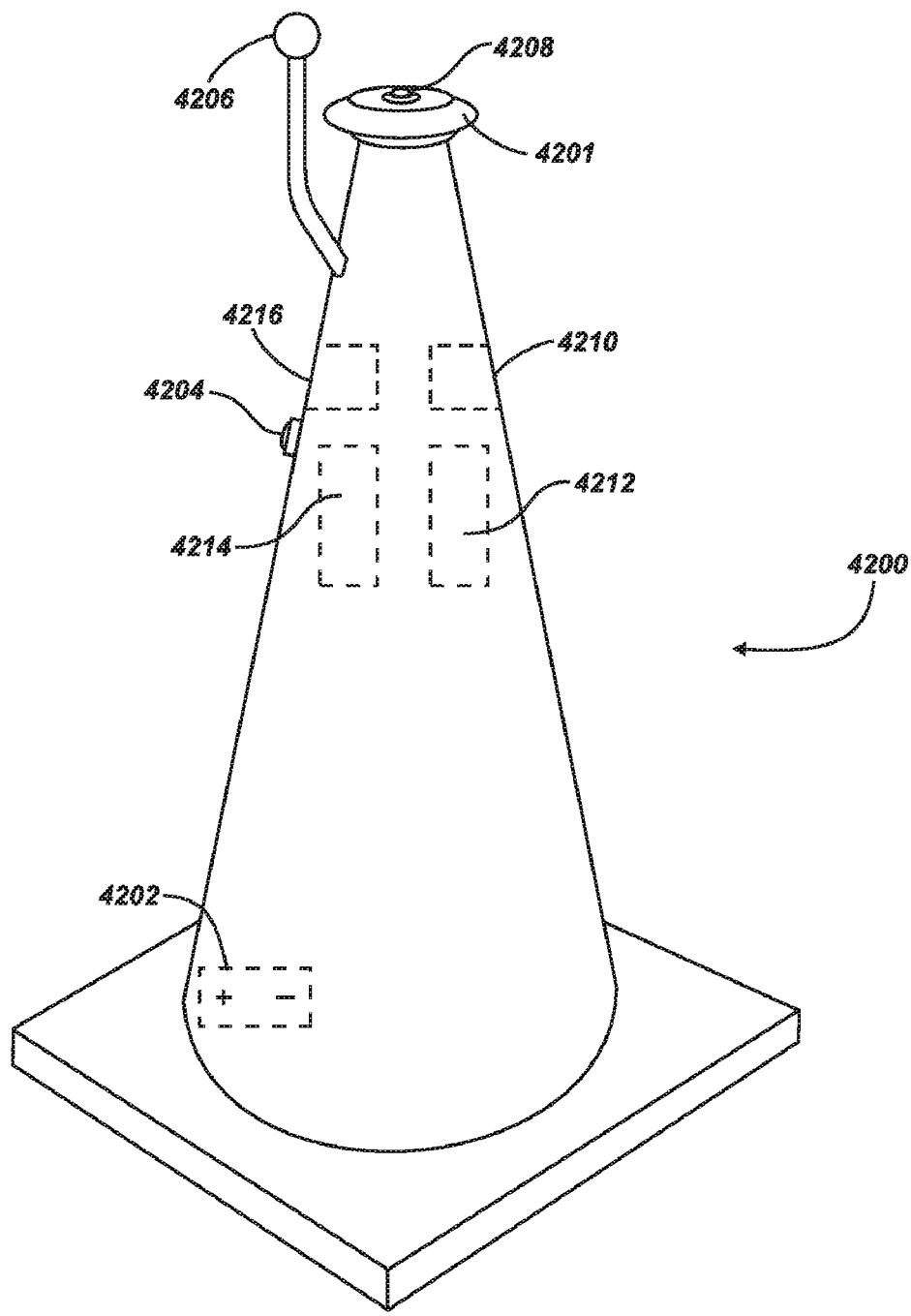
FIG. 42 provides a detailed view of a Locating Ranging Cone, similar to an ordinary "traffic cone" and equipped with locational and networking devices such as a "time of flight" ranging transceiver, a GPS receiver, a GPS or magnetic compass, or a supplementary radio antenna, as required for particular applications.

According to one aspect of this invention, a network of locating-related devices may include a ranging and locating beacon, a portable object in which ranging transceivers, such as those utilizing "time of flight" computation to compute distances between network nodes, may be mounted, and which may incorporate in their structure other sensors such as a GPS receiver, GPS or magnetic compass, a magnetic dipole beacon or other device for use in generating locational information. (Ref. FIG. 42.)

Figure 43:
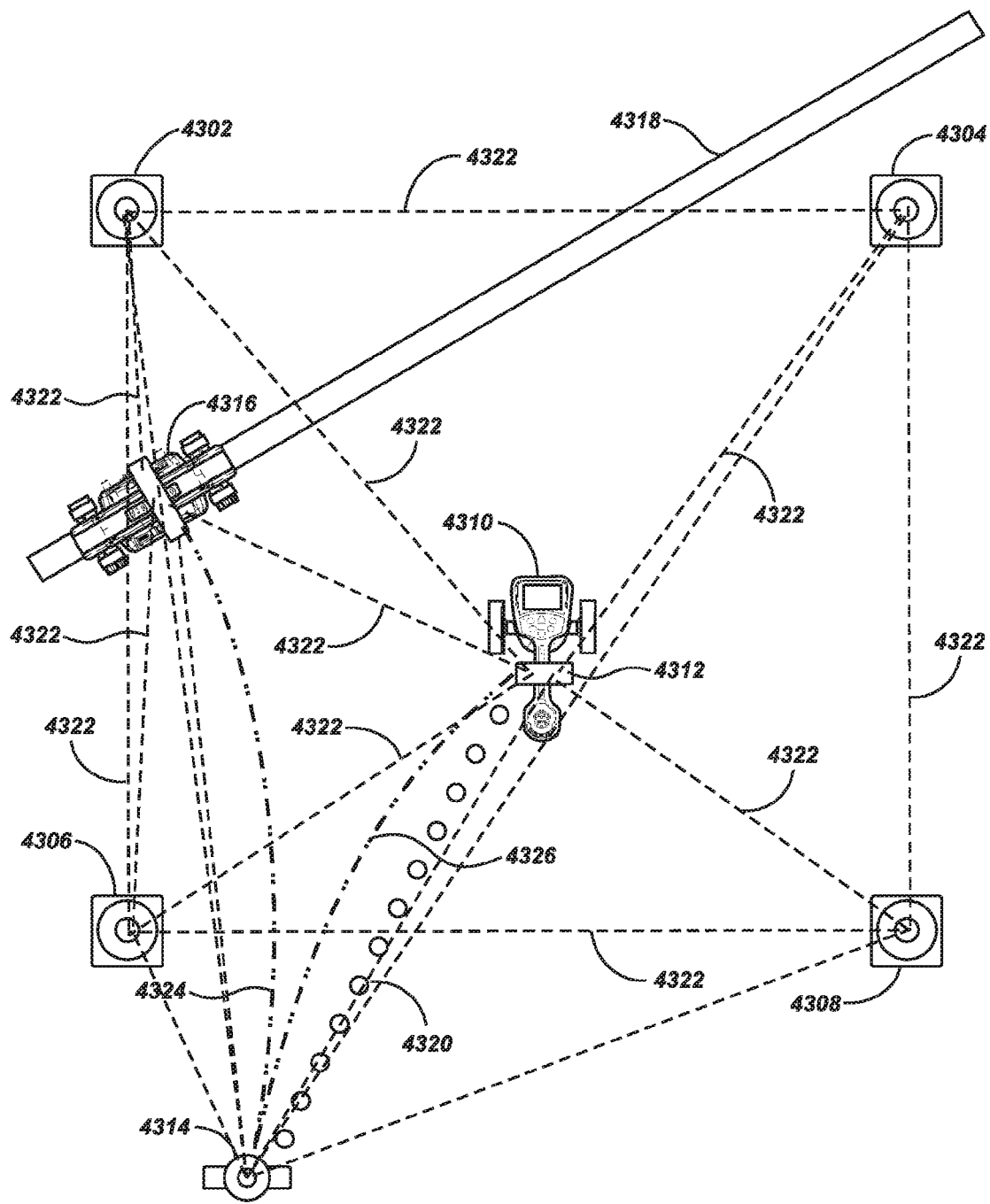
FIG. 43 illustrates a ranging/locating area defined by the use of multiple Ranging Cones in which information on ranges to various nodes within the area and other data is constantly being exchanged between the radio transceivers across the locating group.

According to one aspect of this invention, a series of such beacons may be deployed to create a locating ranging area, using (for example) "time-of-flight" wireless ranging to establish ranges to the several corners of the area as defined by such beacons, with a similar ranging transceiver being mounted on a mobile locator whose position is constantly being similarly computed. (Ref. FIG. 43)

Figure 44:
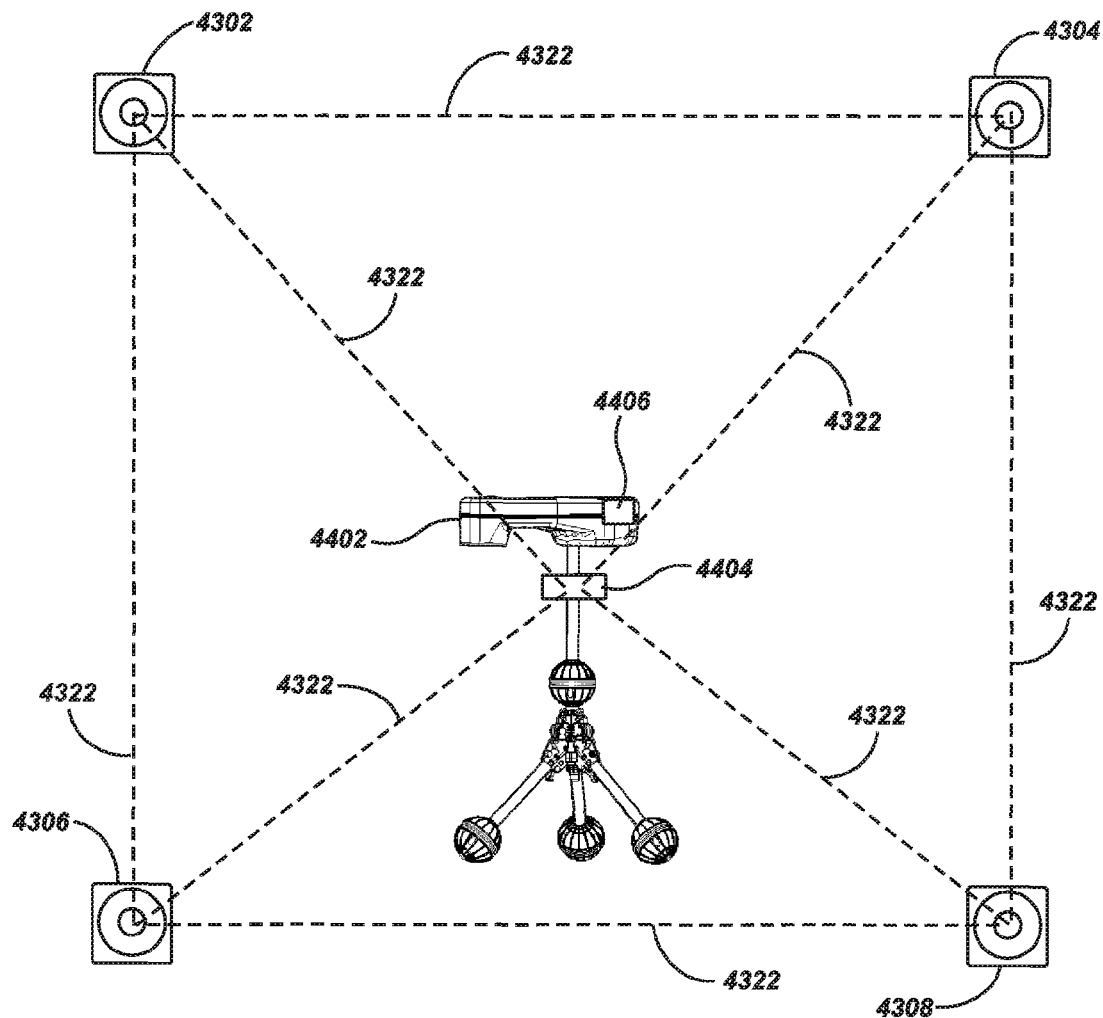
FIG. 44 illustrates a similar group in which the precision of locational information is augmented by use of an Inertial Navigation System (INS) module whose information is integrated with ranging data for more precise locational measurement.
Figure 45:
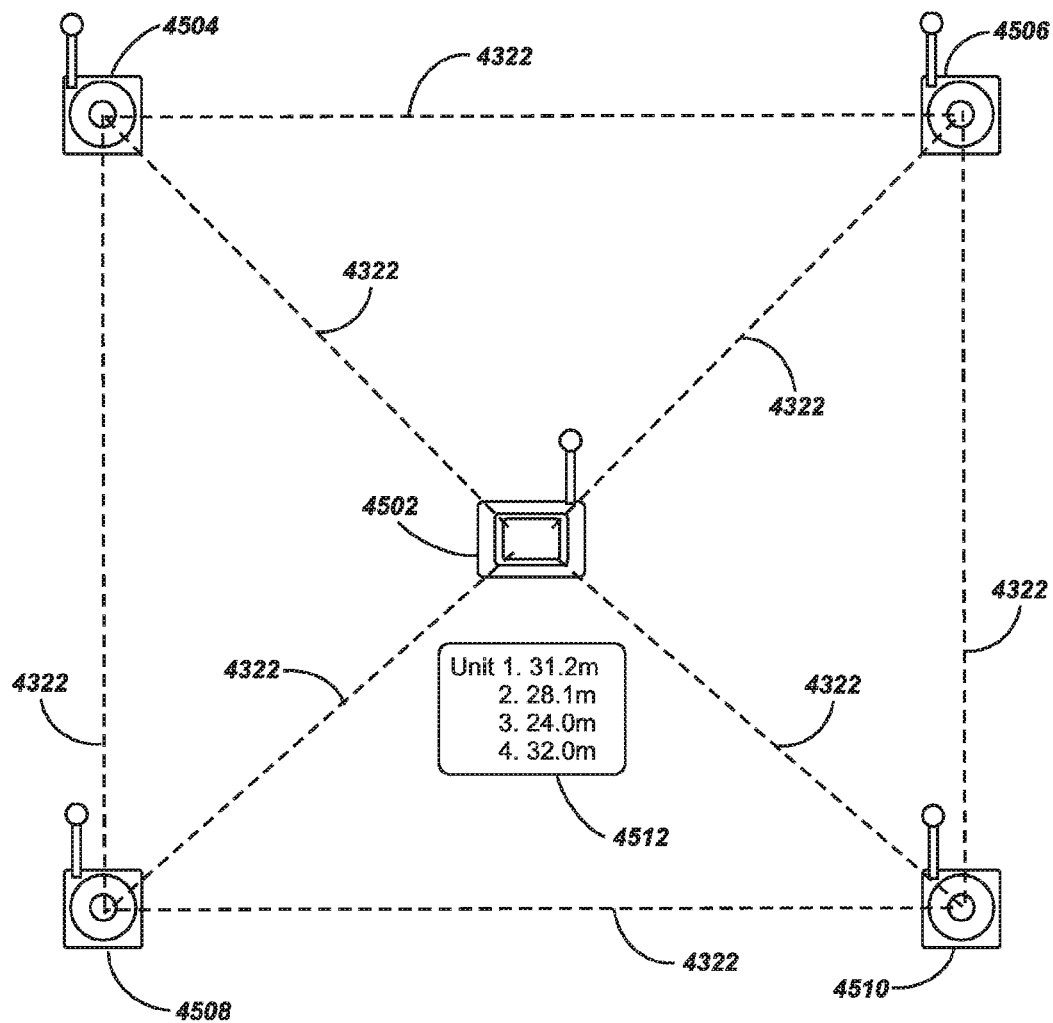
FIG. 45 illustrates a general "time-of-flight" ranging system in which ranges among the various nodes are computed, which data could be integrated into a typical locating group operation.

According to one aspect of this invention, any node in a locating group or network may be equipped with an inertial navigation system (INS) module. In this configuration, the INS may be used to provide refined displacement measurements from which to enhance the precision of a "time-of-flight" ranging system described above. (Ref. FIG. 44.) In general, any devices acting as nodes in such a group may be equipped with transceivers used in "time-of-flight" ranging calculations. (Ref. FIG. 45). Point-to-point time of flight positioning using an array of at least two fixed transceivers and one mobile transceiver operates independently of other kinds of communication among devices and independent of mesh network participation or non-participation.

Figure 46:
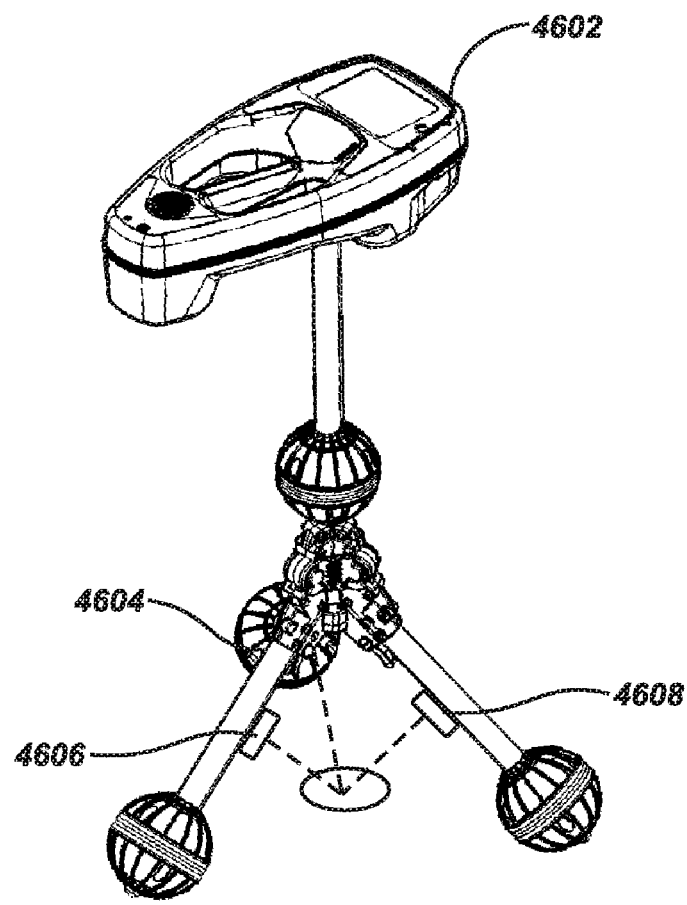
FIG. 46 illustrates a tripod locating receiver which uses ground-tracking sonar sensor devices mounted on the locator's legs in an exemplary configuration showing the use of Doppler measurement in refining locational information.
Figure 47:
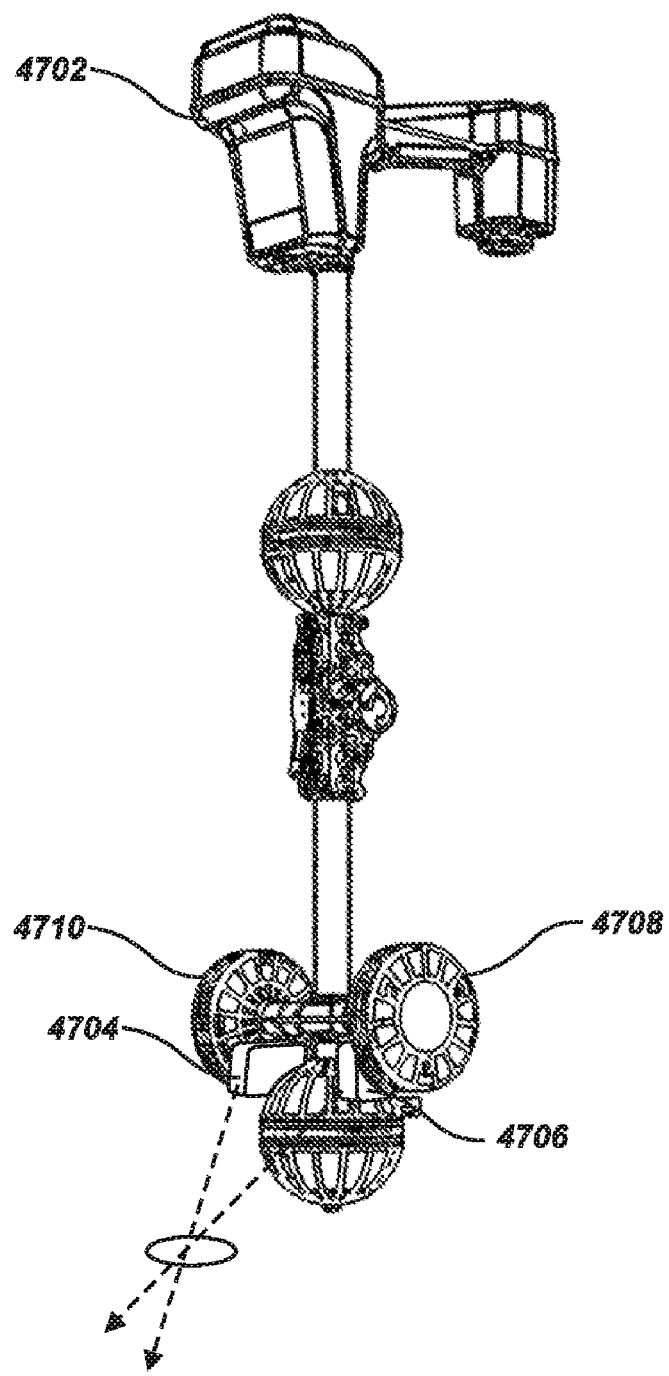
FIG. 47 illustrates a one-legged locator receiver of more traditional form with Doppler transducers similarly mounted inside each of the gradient coil antennas on either side of the locator shaft.
Figure 48:
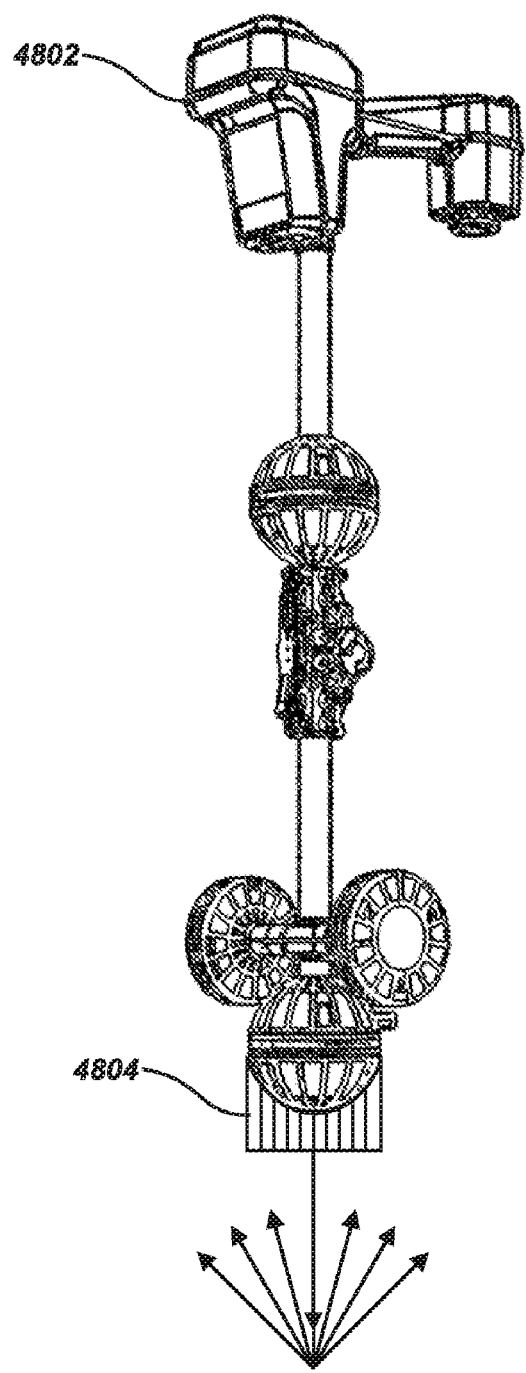
FIG. 48 illustrates a locator equipped with a type of sonar transducer array known as a correlation sonar array, which provides even finer displacement measurement of movement over the ground, such as by a locator receiver in use.

According to one aspect of the present invention, locational information on moving devices may be provided by Doppler transducers known as ground-tracking sensors; for example, a locator may have such sensors mounted on its legs or its shaft to provide precision displacement information as it moves over the ground. (Ref. FIGS. 46 and 47). In another aspect of the present invention, a locator or other moving device may be equipped with a Doppler array known as a correlation sonar array to measure fine displacement and compensate for drift in other locational devices in the network. (Ref. FIG. 48).

According to one aspect of this invention, a pair of temperature calibrated oscillators is used in a transmitter receiver pair to improve the relative time accuracy allowing the absolute phase of the transmitter's output to be known by the receiver. A relative accuracy of 1 millisecond per day can be thusly achieved. A known positional relationship, phase encoding, a wireless link or other means can be used to synchronize these clocks.

According to one aspect of this invention absolute phase information is transmitted from the transmitter to the receiver by a wireless link which allows the receiver to determine if the received signal from a buried utility is in phase or out of phase with the signal transmitted by the line transmitter.

According to one aspect of this invention, while the mobile unit is stationary for some period of time, three orthogonal low drift gyroscopes are used to determine true north due to the rotation of the earth. High performance fiber optic ring gyros can be used to establish true north within approximately 5 minutes of elapsed time in a stationary position. The precision can be obtained to within one one hundredth of a degree. If an accurate vertical reference is available, the mobile unit does not need to be held stationary in order to establish a true north heading.

According to one aspect of this invention, Maximum Likelihood Estimators (MLE) and Maximum Entropy Method (MEM) to this filing are used to provide a precise location for the utility in the presence of noise. This is a statistical process. MLE can suck up the navigation sensor information and the antenna information and provide the best estimate of the location of the utility without explicitly having a Kalman filter. Optionally a Weiner filter can be used.

Figure 49:
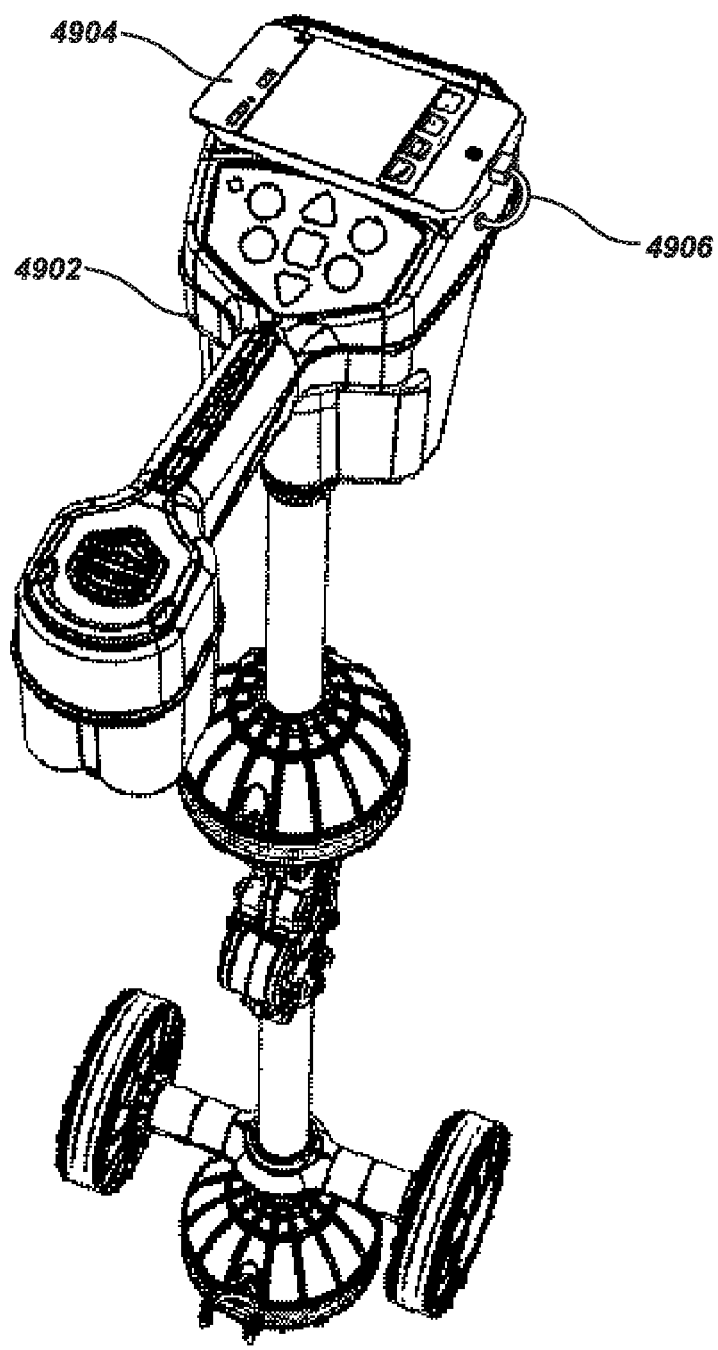
FIG. 49 illustrates an example of locating receiver equipped with a portable display and communication device attached to it by means of a cable interface providing power and data; such a device is similar to a PDA or advanced cellular phone, for example, providing display, storage, and connectivity for data transmission by wireless means.

According to one aspect of the present invention, a portable display and communication device is used at least in part, as the display and user interface system for a man portable pipe and cable locating system. According to one aspect of the present invention, a portable display and communication device is used at least in part, as the display and user interface system for a video pipe inspection system. (Ref. FIG. 49, 50).

For the purposes of navigating or providing positional information, the specific configuration of a MESH network is not absolutely necessary to the operation of networked locating groups. A mesh network is a particular type of network where data can be passed from node to node, perhaps via several different paths. Other networking methods and topologies may be used as suitable to the devices in the group.

Systems Elements

In accordance with an embodiment of our invention, a transmitter for inductively or directly applying a tracing signal to a hidden utility is provided with a wireless link that periodically broadcasts its current status which might include, for example:
- Transmit Frequency
- Transmit Current and Voltage
- Connection Complex Impedance
- Available Frequencies
- Model and Serial Number
- Remaining Battery Capacity
- Attached Accessories in Use
- Real Time Clock
- GPS Position
- Relative Time of Fight Position radio, light or acoustic
- Inertial Navigation Unit locational or movement data
- Attitude and Orientation
- Temperature
- Clocking or Timing Pulses
- Transmission Codes
- Modulation technique
- Available Modulation techniques
- Device status such as "Active" or "Powering off" or "sleeping"

In accordance with an embodiment of the present invention, a receiver is provided with a wireless link that periodically broadcasts its current status which might include, for example:
- Active Receiving Frequencies
- Electromagnetic Vector Information
- Available Frequencies
- Model and Serial Number
- Remaining Battery Capacity
- Attached Accessories in Use
- GPS Position
- Inertial Navigation Unit locational or movement data
- Attitude and Orientation
- Inertial Status
- Temperature
- Height above the Ground
- Modulation technique
- Available Modulation techniques
- Device status such as "Active" or "Powering off" or "sleeping"
- Relative Time of Flight Position, radio, light or acoustic Devices quipped with said transmitters and receivers used in the locating industry, including, for example, frequency transmitters, locator/receivers, geophones, fault-locating devices, GPS Base Stations, network node relay devices, etc. capable by reason of being so equipped of forming mesh networks in which the network elements identify, transmit information to, and receive information from each other in a dynamic, self-maintaining configuration defined in each instance by the devices involved and their requirements. An instance of a set of such devices is referred to herein as a portable locating system. Such a group may include "time of flight" ranging transceivers enabling the group devices to measure their relative distances to each other, sonar displacement measuring devices using Doppler calculations, or other methods of determining their relative locations or their geographical locations.

FIG. 1 illustrates a portable locating system comprising a man portable receiver/locator (100) linked by wireless mesh connection (112) to a transmitter (102) which is inductively transmitting a signal into a buried conductor (in this case a water pipe (108). The inductive transmitter (102) is connected through another wireless link (114) to second transmitter (104) which is directly connected through a cable (116) and clamp (118) to an accessible hydrant (106) leading to the buried pipe (108). The directly connected transmitter is also connected to a ground stake (110) via a second cable (120). Information regarding the sensed impedance of the buried connector and the frequency used by the direct-connect transmitter (104) is relayed to the inductive transmitter (102) through a wireless link (114), while receiver information is relayed to both transmitters (102, 104) from the receiver/locator (100) in the mesh network via wireless links (112, 114).

FIG. 2 illustrates an extended mesh network in which information is shared through wireless links (220, 222, 224, 226, 228, 230, 232, 234) among a receiver/locator (200), an A-frame fault detection device (214), a remote geophone (216), a transmitter (202), a DGPS Base Station (204), a second transmitter (206), a second, tripod, locator/receiver (212), a third transmitter (208) and a more distant fourth transmitter (210). In FIG. 2, the various transmitters (202, 206, 208, 210) may be used purely as mesh network nodes for the sending and receipt of information. Depending on the circumstances of the locate task, they may be individually turned on or off as transmitters by remote signal from an operator using one of the locators (200, 212). The operator may include the desired frequency and power level of transmission in his command message.

As in other illustrations, each mesh-network-aware device in FIG. 2 can send and receive information, act as a network router, and provide data defining its own identity, state, and attributes relating to its own functions. For example, the A-frame fault detection unit would provide, in its broadcast information, data describing its sensor responses; the DGPS unit would provide, in its broadcast information, data describing corrected time and location signals, and so on. Although each device may receive and relay any data in the mesh network cluster, it would otherwise ignore data items which were not of interest to it by reason of its application-layer programming. Thus, for example, while a transmitter would publish the frequency at which it was transmitting (if on), that information would not be subscribed to by a DGPS Base unit, being of no interest; but it would be subscribed to by a locator receiver in order to enable it to set itself to the appropriate frequency. In its operation as a node, any device may relay any data whether it uses that data in its own application layer responses or not.

FIG. 3 illustrates a single locator/receiver (300) linked via a wireless connection (306) to a distant transmitter (304) to which it is sending a data stream (308) which includes a "Power Off" control signal. The locator (300) is linked as well via a second wireless connection (310) to a second distant transmitter (302) in the other direction, to which it is sending a separate data stream (312) including a "Power Off" control signal.

FIG. 4 illustrates a portable locating system comprising one receiver/locator (400) connected via a wireless link (410) to a directly-connected transmitter (402), and via a second wireless link (406) to a second transmitter (404). In FIG. 4, the first transmitter (402) is publishing information (412) including its model number, serial number, present current output (100 mA), signal voltage (22V), present battery voltage (10.6V) and operating frequency or frequencies (here, 8192 Hz and 1027 Hz). It is also publishing (412) its current status with regard to connection (Direct Connect=ON), its GPS location and its local temperature. The receiver/locator is publishing information (408) including its model and serial number, the current sensor measurements on three signal channels, the values of three axes from an internal compass (i, j, and k) and the instrument's own orientation or tilt (q, r, and s). In addition the locator (400) is relaying to the second transmitter (404) an addressed control string instructing it to set its frequency to 32,768 Hz, and set its mode to "Inductive Output=On." The nodes in the group may also contain Inertial Navigation modules to provide locational information.

FIG. 5 illustrates a portable locating system comprising one receiver/locator (500) and one transmitter (502); the transmitter is connected via direct connection (512) to the accessible section of an underground cable (506). In FIG. 5, the transmitter (508) is publishing data (510) which includes frequencies which it has tested, the details of its current state, and the impedance (z) and phase (+20) of the line (508). It is also publishing a control string instructing the locator (500) to use a frequency of 8,192 Hz. Alternate connection by means of an inductive clamp (504) is also illustrated.

FIG. 6 illustrates a portable locating system comprising one receiver/locator (600) and one transmitter (602); the transmitter (602) is connected to a water line (608) at an above-ground point by means of a direct-connect cable (610), and is grounded by means of a grounding stake (614) to which it is connected by a similar direct-connect cable (612). FIG. 6 portrays the logical sequence which occurs when the transmitter tests impedance measurement at several frequencies (606a), selects the optimal frequency (606b), optimizes its output by adjusting output impedance (606c), and transmits (publishes) its resultant status (606d). Information (618) published by the transmitter (602) includes its identity, active frequency setting, impedance value, current level and voltage (618). The figure illustrates that the impedance measured in testing in order to calculate the optimal frequency may have capacitative (620), resistive (622), or inductive (624) components.

FIG. 7 illustrates the logic of a portable locating system comprising one transmitter and one receiver in dynamically determining optimum frequency. Signal Quality is evaluated by the receiver/locator; a control data stream is sent to the transmitter, instructing the transmitter to change frequency. The resultant circuit is compared at the locator/receiver with the signal quality of the earlier circuit. This process is repeated until the best available (optimum) circuit is established.

Figure 8A:
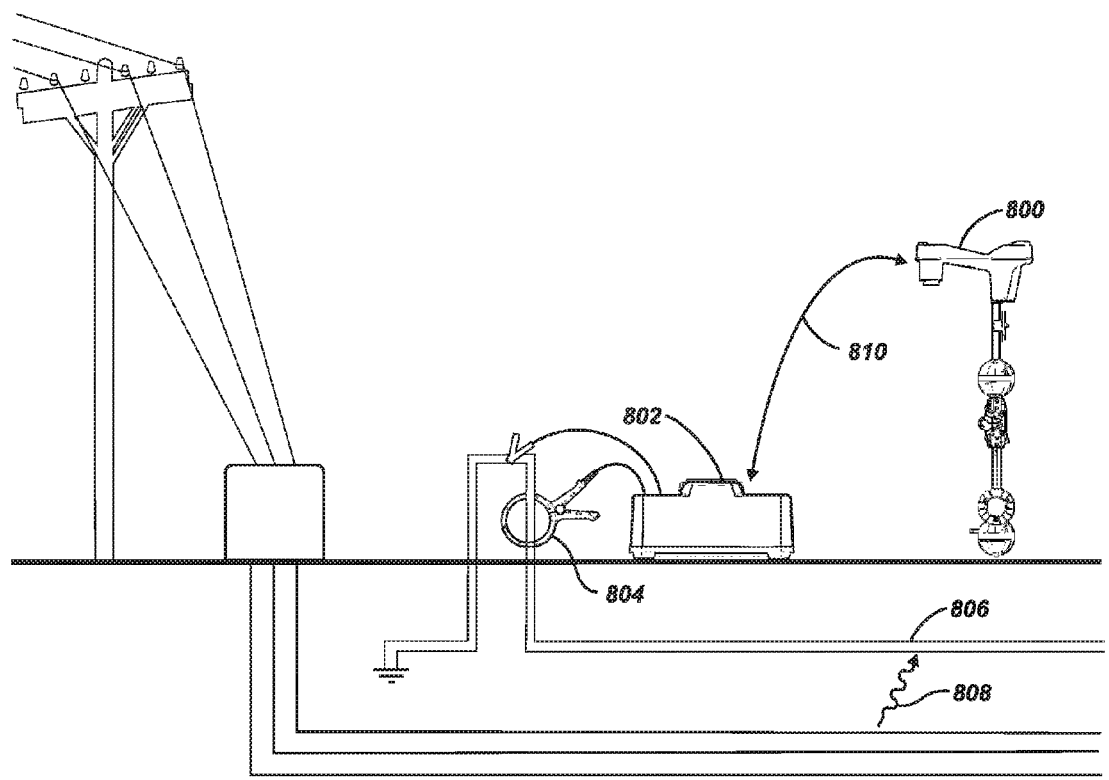
FIG. 8A illustrates a portable locating system comprising a locator/receiver (800) which is linked by wireless connection (810) to a transmitter (802) which is connected by inductive clamp (804) to an accessible portion of an underground electrical cable (806), in a typical interference situation.
Figure 8B:
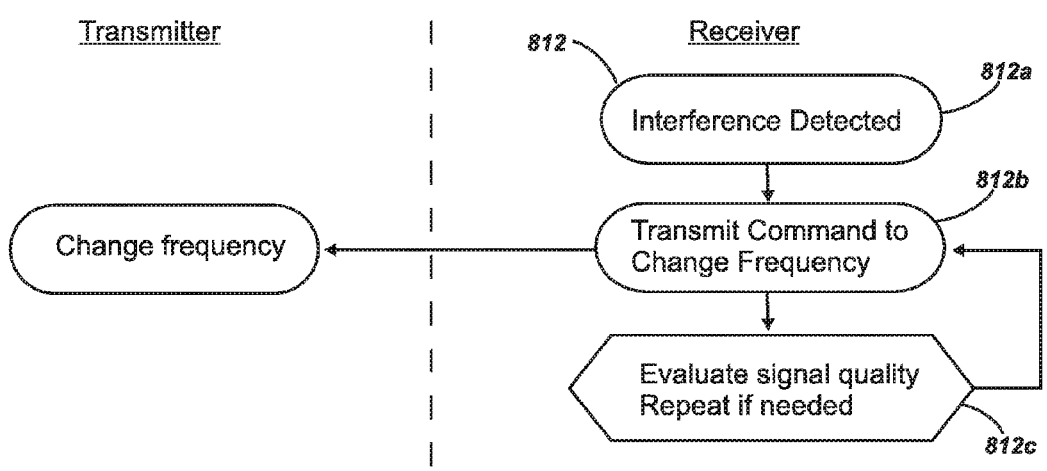
FIG. 8B illustrates the procedural logic of the system group of FIG. 8A.

FIG. 8A illustrates a portable locating system comprising a locator/receiver (800) which is linked by wireless connection (810) to a transmitter (802), which is connected by inductive clamp (804) to an accessible portion of an underground electrical cable (806). FIG. 8A illustrates a typical situation which would involve interference between the conductor of interest (806) and distortion or cross-talk (808) from nearby power lines. FIG. 8B illustrates the procedural logic (812) by which, in the present invention, the receiver (800) detects interference (812a), transmits a command (812b) to change frequency to the transmitter (802) and evaluates the resultant signal quality (812c), repeating as needed to achieve the optimal available circuit and improving the circuit's signal-to-noise ratio.

FIG. 9 illustrates a portable locating system comprising a locator/receiver (900) in use by an operator (904), with a wireless connection (906) to a distant transmitter (902). In FIG. 9, the operator in response to the data displayed on the locator (900) inputs a frequency change command to shift receiver frequency to 8,192 Hz. A control data stream (910) is sent by the receiver/locator to the transmitter to change frequency to the same frequency as that to which the locator is changing.

Figure 10:
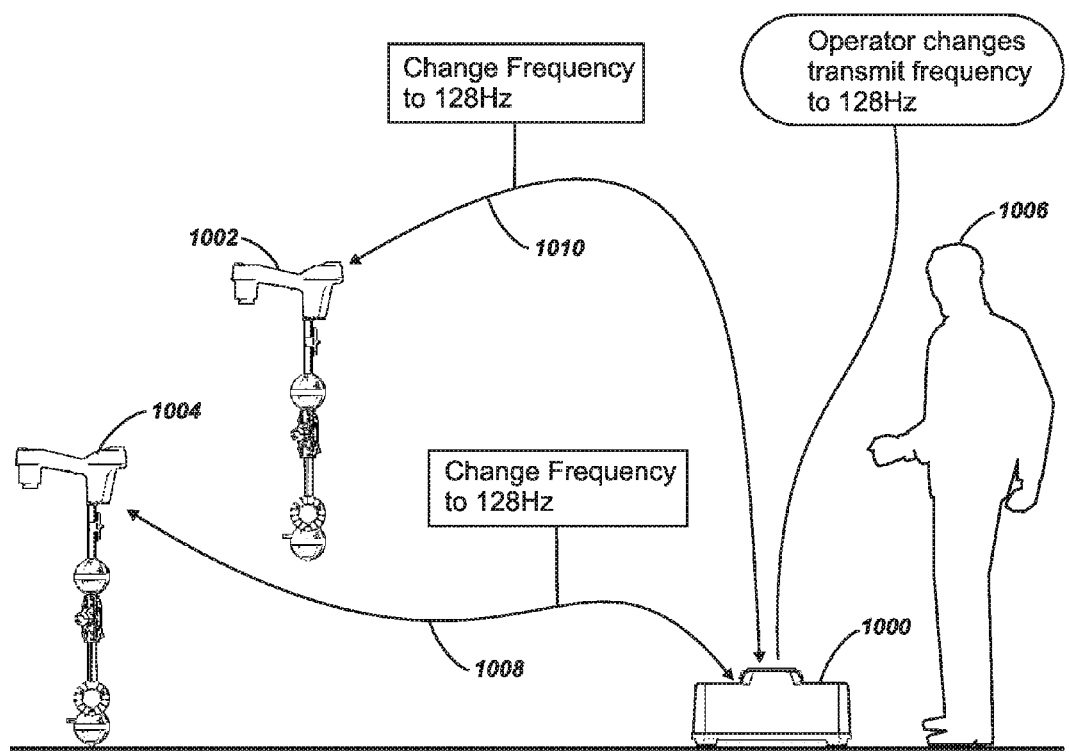
FIG. 10 illustrates a portable locating system comprising a transmitter (1000) in use by an operator (1006) which is connected by wireless links (1008, 1010) to two distant receiver/locators (1002, 1004).

FIG. 10 illustrates a portable locating system comprising a transmitter (1000) in use by an operator (1006) which is connected by wireless links (1008, 1010) to two distant receiver/locators (1002, 1004). In FIG. 10, the operator inputs a frequency change at the transmitter (1000) to 128 Hz. The transmitter then sends control data streams (1008, 1010) to each of the receiver/locators instructing them to change frequency to 128 Hz.

FIG. 11 illustrates a portable locating system including a receiver/locator (1100) whose display (1106) is illustrated in a separate blowup image, and connected by wireless link (1108) to a transmitter (1102) which is connected to an accessible portion of a water line (1104) by direct connection. In FIG. 11, the transmitter (1102) is publishing information (1112) defining its current output (128.5 mA). The receiver/locator (1100) is subscribing to this data and showing a computed value on its display (1106) reflecting the ratio as a percentage between its measured current and the total current sourced by the transmitter. FIG. 11 also illustrates the logic of the process in registering the measured current (1110a), comparing it to a value of the transmitter's published current value (1110b) and determining the resultant ratio as a percentage (1110c) which is then shown on the display (1106).

FIG. 12 illustrates a portable locating system including a receiver/locator (1220) with an integrated LCD display (1224) and a means of data storage (1228) internal to the receiver/locator (1220), the whole being connected via a wireless data link (1222) to a transmitter (1200) with an integrated display (1216). The transmitter is connected to a ground stake (1210) by means of one of its cables (1212) while the other cable (1204) is directly connected by means of a clip (1206) to the accessible portion of a water utility (1202). In FIG. 12, the transmitter is equipped with a key pad (1218) by means of which the operator may enter data indicating the type of utility to which the transmitter is connected; the entered data is communicated to the receiver (1220) by means of the data link (1222) and displayed (1226) on the LCD display (1224). The utility-type data may also be stored at the receiver's data storage device (1228) and associated with signal strength or other information received by the receiver/locator (1220).

FIG. 13 illustrates a portable locating system comprising one or more receivers/locators (one shown—1300) mounted on an example vehicle (1312) which carries an electronic device serving as a remote display (1308). A wireless data link (1314) connects the mounted receiver/locator with the remote display device (1308). A second wireless data link (1316) connects a second remote receiver/locator (1302) with the remote display device (1308). By entering commands on the display device keypad (1306) the display can be set to display the local display (1310) data from the remote receiver/locator, or the local display (1304) data from the vehicle-mounted receiver locator (1300), or both. In FIG. 13, the remote receiver/locator could be ordered by an operator to display the data from the local display on the mounted unit (1304) equally well, and the operator at the display unit (1308) could use the data link (1314) to the mounted receiver/locator (1304) to set it to display the display data (1310) from the remote receiver (1302), should he so decide.

FIG. 14 illustrates a portable locating system comprising a receiver/locator (1400) being controlled by an operator (1402) who is equipped with a WAN-linked digital device (PDA) (1404) with its own data display (1408). The PDA could equally well be an appropriately designed Bluetooth-enabled cell phone. The PDA (1404) is linked via wireless connection (1418) to a satellite (1410) and by another wireless connection (1422) to a cell-phone tower (1412). An additional system element is a remote computer (1414) which also has wireless connection (1424) to the cell tower (1412) via an integrated modem, or a separate connection to the same satellite relay (1410). In FIG. 14, the remote computer (1414)

can act as a remote display (1416) of data generated at the receiver/locator (1400). Instructions entered on remote computer (1414) can be transmitted via wireless data links and displayed on the PDA Display (1408) or on the Locator Display (1406) so that a remote operator (1426) can convey instructions to the local operator (1402).

FIG. 15 illustrates a portable locating system comprising a transmitter (1500) directly connected to a water utility line (1504) and communicating to a distant receiver/locator (1502) via a wireless link (1510). In FIG. 15, the receiver/locator is sending a command instruction (1508) to reverse the current code direction of current being placed on the utility conductor (1504) from direction code 1 (1506*a*) to direction code 2 (1506*b*).

FIG. 16 illustrates a portable locating system comprising a receiver/locator (1600) which is communicating via a wireless data link (1614) to a transmitter (1602) which is coupled by means of an inductive clamp (1608) to a primary utility line (1604). In FIG. 16, the primary conductor (1604) on which the transmitter is placing current is coupled to a secondary utility line (1606) by reason of proximity. The two conductors are coupled by an element of induction (1610*a*), an element of resistance (1610*b*) and an element of capacitance (1610*c*) between them. In FIG. 16, the locator/receiver (1600) commands the transmitter (1602) via the wireless data link (1614) to change to a number of frequencies in sequence (1612)—128 Hz, 1024 Hz, 8192 Hz, and 32768 Hz. The receiver/locator then performs an analysis (1616) of the antenna field angles and depth data detected for each frequency used by the transmitter (1602) in order to determine the degree of cross coupling being encountered. At the operator's option, a "distortion warning" (e.g., 1618) may be displayed indicating that coupling is occurring may be displayed at the receiver/locator (1600) user interface. If two or more transmitters are in use (not shown), different frequencies may be transmitted on different utilities or conductors.

FIG. 17*a* illustrates a portable system group comprising a transmitter (1700) capable of emitting multiple frequencies, connected via an inductive clamp (1704) to a utility conductor (1706), and connected via wireless link (1710) to a distant receiver/locator (1702). In FIG. 17*a*, the command is sent to the transmitter (1700) to transmit two or more different frequencies (1708*a* and 1708*b*). Transmitter (1700) publishes frequency, current, voltage and impedance data. The receiver can then determine the amount of cross coupling to some adjacent utility by measuring the measured field angles of detection for the frequencies and comparing them. A distortion warning could then be displayed (as shown in FIG. 16).

FIG. 17*b* illustrates a portable system group comprising a transmitter (1700) capable of emitting multiple frequencies, connected via an inductive clamp (1704) to a utility conductor (1706), and connected via wireless link (1710) to a distant receiver/locator (1702). In FIG. 17*b*, the receiver/locator (1702) has issued a command to the transmitter (1700) to transmit three frequencies, either simultaneously or sequentially (1750*a*, 1750*b*, and 1750*c*). For each frequency transmitted by the transmitter (1700), a depth calculation is performed by the receiver/locator where:

K=the distance between the upper antenna (1760) and the lower antenna (1758) of the locator/receiver (1754) and
C=the distance from ground level to the center of the lower antenna (1756) and
Top B=signal value at the upper antenna (1760) and
Bottom B=signal value at the lower antenna (1758) and $$\text{Depth} = K(\text{Top } B)/(\text{Bottom } B - \text{Top } B) - C$$

This calculation yields a separate value for the depth at each frequency (1752*a*, 1752*b*, 1752*c*). The relative change in depth calculation result can be used to provide improved accuracy in measured depth.

FIG. 18 illustrates a portable locating system that includes at least one receiver (1802) and one transmitter (1800) connected via a wireless data link (1804); the transmitter (1800) and receiver (1802) are separated, in FIG. 18, by a receiver-measured distance (1808). A button (1812) pressed on the transmitter (1800) by the operator (1810) commands the transmitter to send data representing the measured field strength at the transmitter (as measured by current in the coil or by an integrated field strength sensor (1806). The transmitter (1800) also sends any data representing known failure conditions discovered at test during initialization of the transmitter. The receiver compares the received field strength measurement with its own detection of field strength, taking into account the measured (1808) distance between the two devices, as a diagnostic assessment.

FIG. 19 illustrates a portable locating system comprising a transmitter (1900) which is connected by a "smart" inductive clamp (1904) to a utility conductor, and is connected via wireless data link (1906) to a receiver/locator (1902). The receiver is equipped with a data storage device such as a removable card or memory unit (1914). In FIG. 19, the transmitter (1900) has detected a new device added to the network in the form of the clamp (1904). The clamp device sends its own identification (1908) to the transmitter. The transmitter, in response to the detection of a new device, transmits to the receiver/locator a data set (1912) including its own identification, model and serial number, available frequency and power values, its software version, manufacture data, any sensor data available, its current mode setting, the clamp ID and type, the kind of utility to which it is connected, and its own battery level, as examples. It thus becomes possible for any device in the mesh network to know what other devices are in the network.

FIG. 20 illustrates a portable locating system comprising a transmitter (2000) connected to a utility line (2010) by means of an inductive clamp (2004), and connected via wireless data link (2006) to a receiver/locator (2002). In FIG. 20, the transmitter has encountered a low-battery condition and is sending a status message (2012) to the other elements in the network (in this case, the receiver/locator) informing them that the transmitter will shut down in ten seconds. Other status conditions could equally be transmitted among system elements as appropriate for each element.

FIG. 21 illustrates a portable locating system comprising a transmitter (2100) connected to a utility line (2110) by means of an inductive clamp (2104), and connected via wireless data link (2106) to a receiver/locator (2102). In FIG. 21, The transmitter (2100) is also capable via an integrated GPS receiver of receiving GPS time-tag information from a GPS satellite (2114). The transmitter, on receipt of GPS time information, executes a "set clock" routine and also transmits a time stamp message (2112) over the data link (2106). On receipt of the synchronizing message, the receiver/locator (2102) likewise performs a "set clock" routine. In similar wise, any element which is in communication with an external clock, such as a GPS time signal, can serve to synchronize time throughout the system group.

FIG. 22 illustrates a portable locating system comprising a transmitter (2200) which communicates to a receiver locator (2202) via wireless link (2212) and to a second receiver/locator (2204) via a second wireless link (2210). The second receiver/locator (2204) also links wirelessly (2208) directly to the first locator/receiver (2202). A GPS satellite (2206)

transmits location information which can be received by any of the three devices via wireless links (2214a, 2214b, 2214c). Location information can thus be received by any device and exchanged with any other device in the group, providing increased positional accuracy. In addition to GPS location, any node in the wireless network may also include an inertial navigation module enabling it to track and report location independent of, or as a verification of, GPS locational data.

FIG. 23 illustrates a portable locating system that includes at least one receiver and one transmitter that can each communicate by wireless means, in which the receiver (2302) commands a transmitter (2300) to only source the amount of current needed for a strong and stable signal thereby conserving available battery energy. The transmitter (2300) is linked to the locator/receiver (2302) by wireless link (2306) on which it sends the current values, and on which it receives the instruction message (2312). The transmitter then adjusts output current injected onto the target utility (2310) via an inductive clamp (2304). The locator/receiver (2302) can be set to automatically adjust its sound gain level such that the sound does not change with variations in output current. Thus, the system group can maintain a target signal level at the receiver/locator (2302) in a series of adjustments that are transparent to the operator.

FIG. 24 illustrates a portable locating system comprising a locator/receiver (2402) with a wireless link (2406) to a transmitter (2400) which is connected via an inductive clamp (2404) to a utility conductor (2410). In FIG. 24, a phase timing signal (2408) is sent from the transmitter (2400) to the locator/receiver (2402); optionally, a corresponding phase timing signal (2412) could be send from the transmitter (2400) by injecting it onto the utility conductor (2410). Based on this signal, relative phase of the transmitted signal can be determined at the locator/receiver (2400) and use in improving the precision of the locate results.

FIG. 25 illustrates a portable locating system comprising a locator/receiver (2500) used in conjunction with a pipe inspection camera system (2502) which includes an integrated sonde (2506) which is built in to the camera head (2504), moved through the pipe by means of a push-cable (2514). See pending U.S. Patent Application Ser. No. 60/864,104, filed Nov. 2, 2006, entitled "Pipe Mapping System" of Mark S. Olsson et al., the entire disclosure of which is hereby incorporated by reference. The sonde emits a dipole field. In addition to the sonde's field, a tracing frequency (e.g., 32768 Hz) can be injected into the cable connected to the camera, which can then be used by the locator/receiver (2500) to detect the path of the camera head. A wireless link (2512) connects the locator/receiver (2500) with the pipe inspection control unit (2502) and data items are exchanged between the two units. The locator/receiver (2500) sends detected sonde depth, detected signal strength at each antenna, commands to turn the transmitter on or off, and "over sonde" messages to the pipe inspection control unit (2502). The pipe inspection control unit (2502) may send pushcable count, sonde power status, camera tilt angle and sonde angle information to the locator/receiver (2500). In addition to the direct video from the camera head (2504) key information (e.g., depth of pipe) can be displayed on the user interface (2510) display; if the locator/receiver (2500) is equipped with an integrated compass unit, the orientation of the pipe relative to true or magnetic North can also be displayed and recorded on the video. The route of the locator/receiver (2500) along the trace signal (2508) can be captured and mapped.

FIG. 26 illustrates a portable locating system in which a multi-frequency capable inductive transmitter (2600) and a receiver/locator (2602) are connected by a wireless link (2604). See pending U.S. Patent Application Ser. No. 60/871,268, filed Dec. 21, 2006, entitled "High-Q Self Tuning Location Transmitter" of Ray Merewether et al., the entire disclosure of which is hereby incorporated by reference. In FIG. 26 the receiver/locator (2602) sends a command signal to the transmitter (2600) to transmit on frequency 1 (f1), and then on frequency 2 (f2), Transmitter (2600), on a routine schedule, optionally publishes signal strength data and current level data. In FIG. 26, a display message can be shown on the locator/receiver (2602) instructing the operator not to move the instrument while the ordered frequencies are being applied. By comparing the change of the received signals as a function of frequency, the locator/receiver (2602) can then calculate the degree of air-coupling, based on the difference between the rate of signal degradation through air ($1/R^3$) compared to the rate of signal degradation on a conductor (~$1/R$). By compensating for air coupling, it becomes possible for the locator/receiver (2602) to locate hidden utilities closer to an inductive dipole source. Magnetic field strengths can be measured at the transmitter and communicated to n locator/receivers in the system group.

FIG. 27 illustrates an aspect of the invention in which a portable locating system includes at least one receiver (2702) and one transmitter (2700), that can each communicate by wireless means (2706), in which a rotating or tilting means (2704) is integrated into, or combined with, an inducing transmitter (2700). In FIG. 27, a "rotate" command may be sent from the receiver/locator (2702) to the rotating element (2704) which causes the inductive transmitter (2700) to change its angle relative to a target line (2710a). In application, this ability would be used to bring about a null response from the target line (2710a) by adjusting the angle of the emitted field to the conductor, allowing an adjacent nearby utility line (2710b) to be separately identified and located.

FIG. 28 illustrates a portable locating system that includes at least one receiver and one transmitter that can each communicate by wireless means, in which the system group network is extended to include a variety of other devices used in location and detection tasks. In FIG. 28, network relay is accomplished via a WAN Link (2822) from a cell tower (2820), a separate data relay node device (2802), a GPS satellite (2828) and an Iridium satellite (2824). The devices which are networked in the group include a geophone (2804), an A-frame fault detector (2808), and a sonde (2810) of the type used in Horizontal Directional Drilling (HDD) applications; the sonde is physically connected to a drill string operated from a HDD machine with an integrated controller and display (2806). The HDD drill string is optionally energized by a separate transmitter (2828). An optional power and data link (2826) wire line may be incorporated with the HDD drill string. A distant receiver/locator (2818) with integrated GPS and mapping capabilities is used to track the HDD Sonde. The receiver/locator is connected by wireless links (2812, 2816, 2818) to the data relay node (2802), the acoustic geophone (2804) and the A-frame fault locator (2808), respectively. The data relay node (2802) also maintains a wireless link (2814) with the HDD machine (2806). Each linked device in the extended group may publish its status and other key data, and any device in the extended group may subscribe to appropriate information published by other devices. An Inertial Navigation module (INS) may be included in any unit as a means of tracking its location independent of GPS signals.

FIG. 29 illustrates a portable locating system that includes at least one receiver (2902) and one transmitter (2900) that can each communicate by wireless means in which an operator (2916) publishes via wireless data link (2908) from a transmitter (2900) data describing the type of connection point to which the connection is made (e.g., tracer wire, transformer, valve, meter). In FIG. 29, the transmitter is connected to a buried utility (2912) via a tracer wire leading to the gas meter (2906) such as is typically installed on non-conductive piping for this purpose. The operator can communicate the type of connection point via the user interface of the transmitter (2900) or the user interface of the locator/receiver (2902) where the data can optionally be stored to memory card or other data storage device (2918). The communication from the operator to the user interface of either device can be made by any known means including but not limited to keypad, touch screen or voice input.

Figure 30:
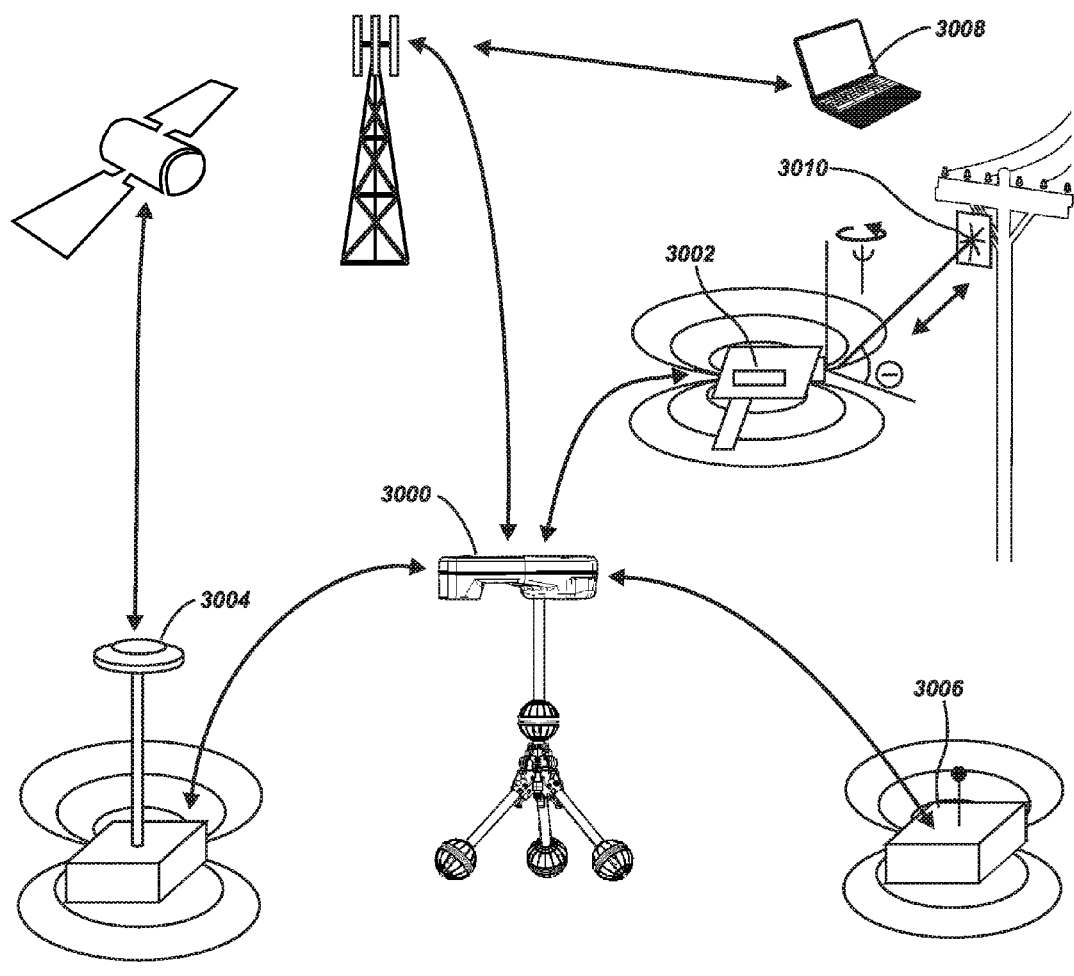
FIG. 30 illustrates a portable locating system that includes at least one receiver and one transmitter that can each communicate by wireless means in which system elements include devices other than locators and transmitters, including a laser range finder, a GPS signal beacon, and a cell-based WAN link. Information is integrated at a mapping locator in this example.
Figure 31:
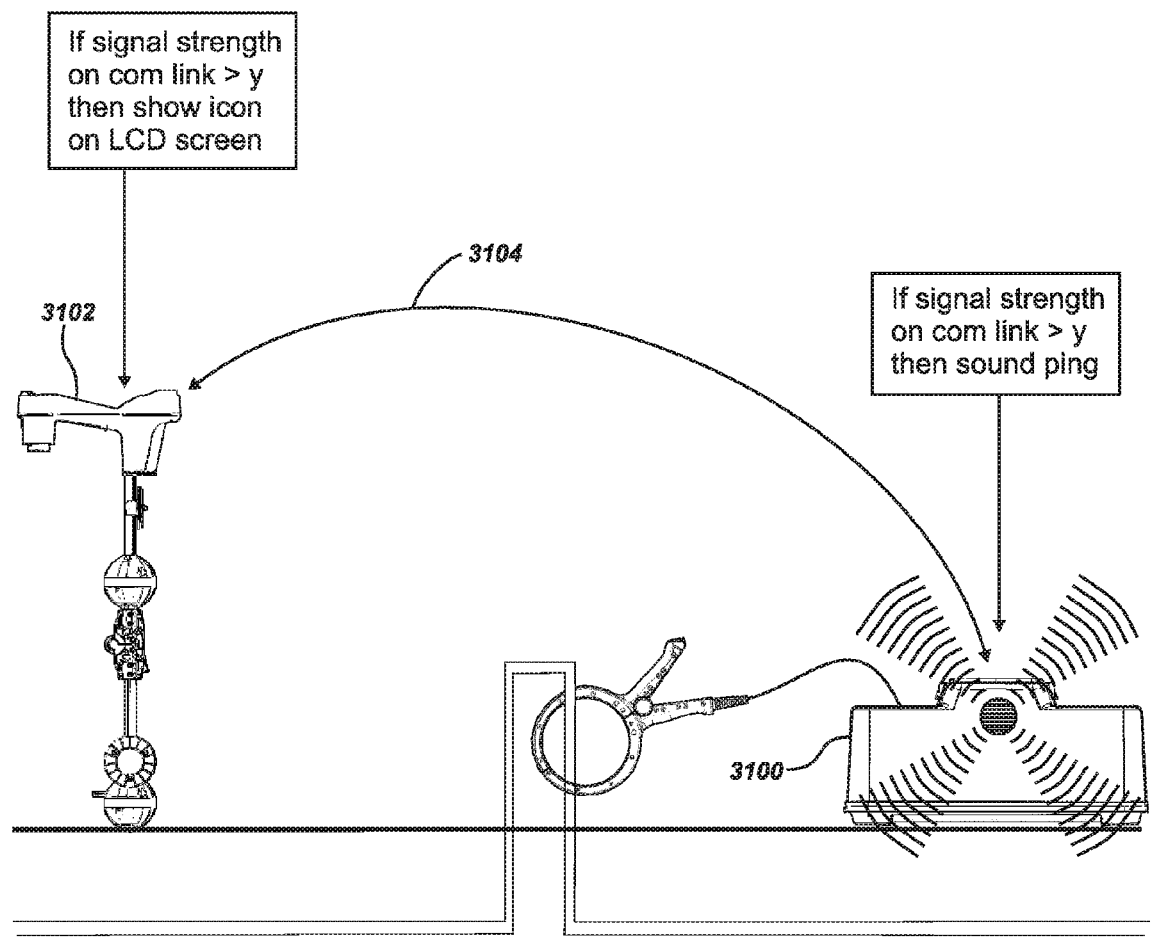
FIG. 31 illustrates a portable locating system that includes at least one receiver and one transmitter that can each communicate by wireless means in which a ZigBee or similar wireless link connects the locator/receiver to the transmitter, and informs the transmitter of the received signal strength, enabling the transmitter to emit a ping sound if it is the transmitter closest to the receiver in the mesh; the proximity of the receiver to the transmitter being determined by comparison of the Receive Signal Strength level.

FIG. 30 illustrates an extended portable locating system of devices including a dipole signal beacon (3006), a second dipole signal beacon equipped to receive GPS signals (3004), a receiver/locator with integrated mapping capabilities (3000), a third dipole beacon integrated with a laser range finder (3002), and a remote computer (3008). Because of the wireless links networking the mapping-enabled locator/receiver (3000) with multiple dipole beacons, GPS information and ranges produced by a laser range-finder (3002), the system group can produce integrated mapping information which is them relayed to the remote computer (3008) for post processing, integration into a larger data set, supervisory oversight, training purposes, or other uses. In FIG. 30, a laser range-finder (3002) has an integrated 3-axis compass and an integrated 3-axis tilt sensor to allow the position of point A (3010) to be determined FIG. 31 illustrates a portable locating system comprising a locator/receiver (3102) connected by a ZigBee wireless link to a transmitter (3100). In FIG. 31, the locator/receiver's ZigBee link received signal strength is used as the basis of estimation of the proximity to the transmitter (3100), and the transmitter is operating a routine by which it will emit a "ping" sound when the communicated signal strength exceeds a set value x. Similarly, in this aspect, the locator/receiver will display a particular icon representing the transmitter when the communicated signal strength exceeds some value y, thus allowing the operator to be aware of his relative proximity to a particular transmitter, or to be guided toward it by the transmitter's "ping" sounds.

FIG. 32 illustrates a portable locating system comprising a locator/receiver (3202) linked by wireless data link (3204) to a distant transmitter (3200) which is connected to a utility (3210). In FIG. 32, the transmitter in response to instructions from the locator/receiver is time-multiplexing two (or more) frequencies, here marked f1 and f2. The timing signals (3206) are sent wireless while the frequencies are transmitted on the utility conductor (3210). By using narrow band short time constant (or FIR) filters in front of a correlation based receiving channel, the output of the transmitter is rapidly switched between two different output modes, and the receiver remains relatively insensitive to phase shifts. If the apparent position of a utility changes appreciably at different frequencies, as shown on the locator/receiver display, then other coupled utilities are indicated. If the depth moved vertically, (f1 depth is different from f2 depth) between the different frequencies, then a depth correction may be required.

FIG. 33 illustrates a portable locating system comprising a transmitter (3300) which is directly connected to a utility (3310) and connected by wireless link (3304) to a locator/receiver (3302). In FIG. 33, the locator/receiver (3302) performs sampling of the ambient electromagnetic frequency domain, using FFT or other methods, in order to identify frequencies which will produce improved signal to noise ratio in the locating process; the calculated optimum frequency is then set on the transmitter by means of a wireless control link (3304) between locator/receiver (3302) and transmitter (3300).

FIG. 34 illustrates a portable locating system in which a transmitter (3400), while not actively transmitting, monitors the amplitudes of various signal peaks and harmonics and transmits across a wireless link (3406) computed FFT "frequency bins" to the locator/receiver (3402). The locator/receiver in turn compares and tunes its digital filters against the profile of the transmitter-provided FFT data to optimize the signal-to-noise ratio in the locating process. The use of the monitored information as a "fingerprint" of the connected utility can then enable a second receiver to confirm that it has detected the same utility or a different one. Analog-Digital Converter (ADC) information can be similarly transmitted instead of FFT frequency bin data; transmission can be via ZigBee, Bluetooth or other means.

FIG. 35 illustrates a locating system group comprising a primary locator/receiver (3500) from which screen display data is transmitted wirelessly to a projection device (3504) and simultaneously transmitted to a "slaved" student locator/receiver as a training method.

FIG. 36 illustrates a locator/receiver (3600) connected via cell tower to a remote computer (3602). In FIG. 36, locating events displayed on the locator/receiver are displayed as well on the remote computer (3602) for purposes such as training or supervision, and optionally may be stored and archived on the remote computer or some network to which it is connected.

FIG. 37 illustrates a portable locating system comprising a locator/receiver (3700) connected via wireless data link (3706) to a distant transmitter (3702) being managed by an operator (3704). In FIG. 37, the operator transmits an instruction to the locator (3700) via a keypad on the transmitter instructing the locator/receiver (3700) to send data describing the received signal strength at the locator back to the transmitter (3702). Based on the resultant audio output from the transmitter's speaker, or from data on an LCD display, the operator may move the transmitter (for example, to either side of the line) in order to find a maximum signal or a null signal. This aspect provides another means for an operator to enhance the accuracy of a locate procedure.

FIG. 38 illustrates a portable locating system comprising a locator/receiver (3800) linked by wireless connection to a proximate data-relay node device, or repeater. The node device is linked wirelessly to a second node device (3806) which is in turn linked wirelessly to a distant transmitter (3802). In FIG. 38, the node devices serve to extend the mesh network between the other devices, and enable the network to extend around an obstacle such as a building (3804) or simply increase the mesh network's range.

FIG. 39 illustrates the use of a frequency shifting re-transmitter. Such a frequency shifting re-transmitter is preferably wireless enabled but this is not a requirement. By way of example a cable fault finding A-Frame application is shown. In this example frequency shifting allows the receiver to separate signals (3934) radiated directly from line (3908) from those transmitted by antenna (3916). Transmitter (3912) transmits a coded signal by way of direct connection (3928) to utility (3908). Receiver (3900) can use this signal to locate the hidden utility. Fault (3910) causes voltage potentials in the ground in association with the localized fault. This time varying potential is causes a voltage between electrodes (3904, 3906). Frequency shifter (3922) mounted on A-Frame supporting structure (3902) amplifies as needed these voltages and then frequencies shifts this time varying signal by some predetermined amount using known means such as hardware analog or software digital mixers and then retransmits this frequency-shifted signal on antenna (3916). The electrical connection between electrodes (3904, 3906) is provided to frequency shifter (3922) by means of docking electrical connections (3918, 3920) respectively. Receiver (3900) can display on its user interface a corresponding signal strength value for the electrical potential measured between electrodes (3904, 3906). The A-frame can be moved from location to location and the signal variations can be used by known means to localize the fault location. Optionally the measured signal strength determined by receiver (3900) can be sent by wireless means to frequency shifter (3922) which can optionally display this information on a user interface (3936). This capability helpfully allows an operator to easily see which electrode is closest to the fault. Optionally compasses (not shown) in the receiver and in the re-transmitter provide information to allow the ground contact electrode orientation relative to that of the receiver to be determined.

FIG. 40 illustrates a plan view of one embodiment of a three channel spatial re-transmitter (4002) used in conjunction with three geophones (4004, 4006, 4008) and a tripod, four antenna node (12 channels) receiver. Each geophone may optionally include a dipole Sonde (not shown) to allow positional determination by receiver (4000). In one embodiment, each Sonde transmits a separate frequency. In another embodiment, a transmission sequence is employed and wireless link 4016 is used to communicate the time sequence to receiver (4000). The signal received by each geophone is amplified and transmitted on separate wire coil antennas (4014*a*, 4014*b*, 4014*c*). A high pass filter might be employed on each channel before transmission. Geophones in this manner can be used to isolate and determine the location of a leak in a piping system. In conjunction with external sound sources, either fixed or movable, either with or without beacon Sondes, acoustic tomography techniques can be employed for imaging purposes. We have demonstrated that the antenna structure (4018) used in the receiver, can also be used as an antenna (4012) to transmit signals at frequencies suitable for use with geophones.

Figure 41:
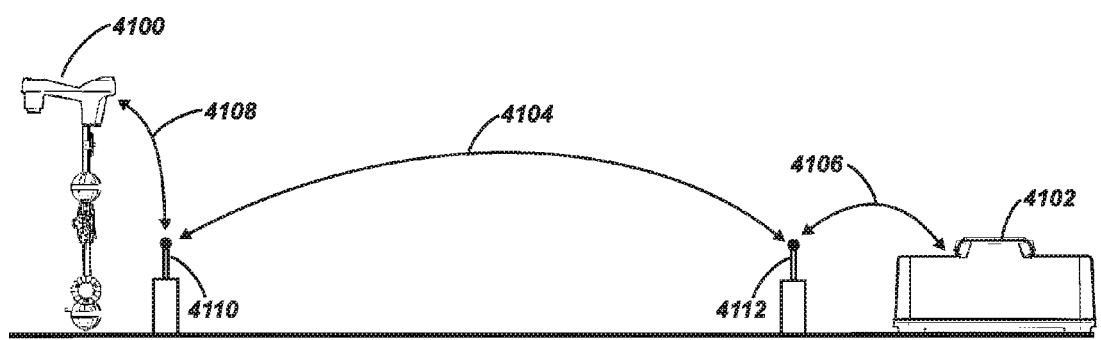
FIG. 41 illustrates two portable locating systems, in which a long-range radio frequency link is used to join the two local mesh networks, thus extending the operation of the mesh network over longer distances.

FIG. 41 illustrates two portable locating systems may be connected and their network operation extended through the introduction of an intermediary longer-range communication link. In FIG. 41, a locator/receiver (4100), operating as part of a mesh network (not shown) is linked by wireless (e.g., Zig-Bee or similar) communication link (4108) to a long-range RF relay device (4110). Device (4110) is linked by long-range wireless communication link (4104) to a similar relay device (4112) serving a distant mesh network locating system group comprising a transmitter (4102), in this example. Any data exchanged between the various devices described in the above figures may thus be likewise transmitted and received among more distant mesh-networked groups. Additionally, it will be appreciated that the long-distance link may be any wireless or physical connection (for example, RF, microwave, fiber-optic, or wired connection) as appropriate to the individual application.

FIG. 42 illustrates a detailed view of a particular device which may be employed in a locating network, known as a Locating Ranging beacon. In FIG. 42, a marker, as an example, similar in form to a common traffic cone, is equipped with devices with which to participate in a locating group. In FIG. 42, a ranging beacon 4200 is equipped with a battery pack 4202 which powers an LED power signal 4208, a time-of-flight ranging transceiver 4216, an optional GPS receiver 4214, optional GPS compass 4212, and the connections between these components. An optional magnetic compass 4210 may also be installed which may be equipped with digital data output. The beacon includes an antenna 4201 capable of receiving GPS signals, or signals from comparable systems such as Galileo, GLOSNASS, etc. An optional radio antenna 4206 is also shown capable of linking the cone to a wireless data network and/or wireless ranging system. The ranging cone device 4200 can be used to define the limits, for example, of a locating area within which a locator, transmitter and other components of a locating group are operating. In addition to or instead of GPS satellite locational information, a "pseudolite," or synthetic GPS signal may be used to provide a reference datum, A standard GPS pseudolite is a single channel (L1) GPS pseudolite designed for a standalone signal source. Alternatively a synchronized pseudolite—a pseudolite set containing synchronization SW and reference GPS receiver—may be used. This provides means to synchronize the pseudolite clock to external GPS time. The use of a cone is as example as only. The devices shown could alternatively be packaged in some other form for convenience in use. The MAXIMUM power that a pseudolite is allowed to transmit is 1 microwatt. If the cone or beacon also contains a GPS receiver, the GPS receiver can be used to generate the ephemeris information for the pseudolite to transmit. The utility locator contains a GPS receiver which is used to provide positional information of the locator relative to the pseudolites. This is another type of time-of-flight positioning system.

FIG. 43 illustrates one possible configuration in which ranging beacons can be deployed. In FIG. 43, four beacons configured as cones (4302, 4304, 4306 and 4308) are deployed to define a locating area within which a locator receiver 4310 equipped with a ranging transceiver 4312, a locating transmitter 4316, similarly equipped with a ranging transceiver, and a stationary dipole beacon 4314 (preferably also equipped with a ranging transceiver), are deployed. Dipole beacon 4314 is optional. A buried conductor such as a pipe or cable 4318 is shown. Within such a deployment, the mesh network of the locating group exchanges near real-time positional information, with the four cones 4302-4308 providing a baseline measurement against which mobile positions may be calibrated. Positional information is supplemented by the locator receiver 4310 sensing the location of the dipole beacon 4314 independently. It is advantageous if both locator 4310 and the dipole beacon 4314 are equipped with compasses allowing the relative orientation of both the dipole with a horizontal axis and the locator are known. Alternately, the dipole beacon 4314 can be oriented to a known compass orientation using a magnetic compass mounted on top. Additional advantages are offered if the dipole beacon 4314 is phase-coded providing an indication of which pole of the beacon is north-pointing, due to the additional certainty provided by the known dipole field orientation. In FIG. 43, each unit equipped with a ranging transceiver has a wireless link 4322 with each other such unit. Locator 4310 includes the capability to detect and measure the dipole field 4320 from dipole beacon 4314.

FIG. 44 illustrates the use of "time-of-flight" ranging between devices. In FIG. 44, four ranging cones 4302, 4304, 4306, 4308 define a locating area, with each cone containing a wireless time-of-flight ranging transceiver. Other devices are available on the market which would serve equally well, utilizing the IEEE 802.15.4a wireless standard or a similar specification. Range determination could also be achieved using RSSI in addition to or instead of time-of-flight measuring. In FIG. 44, each transceiver is capable of sending and receiving identifiable radio pulses which include unit ID and time tags. At least one of the units is capable of computationally deriving the distance between each pair of units based on the time of signal travel from one of the other transceivers. Using this information, a real-time log of distances and a graphic display of relative locations between units can be displayed, archived, transmitted, or relayed to a base computer for integration into some other information system such as GIS. A tripod locator receiver 4402 is equipped with its own time-of-flight ranging transceiver 4404. In addition, an Inertial Navigation System (INS) module 4406 can be optionally affixed to the locator receiver and used to provide finer-scale measurement of the locator's movement resulting in more precise representation of its location within the operating area.

FIG. 45 illustrates the operation of a five-node "time-of-flight" network is illustrated in an aerial view. Four transceivers 4504, 4506, 4508, and 4510 define the outer limits of the area of operation. Each transceiver includes an integrated circuit for receiving, timing and transmitting signals. A fifth unit 4502, known as the Tag unit, is mobile within the range of the corner units 4504, 4506, 4508, 4510. In operation, each unit transmits data signals using an established protocol such as IEEE 802.15.4a. See U.S. Pat. No. 6,404,338 B1 of Koslar granted Jun. 11, 2002, the entire disclosure of which is incorporated by reference. The transceivers typically operate in the 2.45 GHz frequency range using frequency-division multiple access (FDMA) channels. Thus, one channel might have a center frequency of 2412 MHz, another 2437 MHz, and a third channel 2462 MHz.

In FIG. 45, the Tag unit is here linked to a laptop computer display 4512, although any computational device could be used, such that the moment by moment stream of computed distances from the Tag unit 4502 to each other unit is received. The ranging information may be displayed as a text stream or integrated into a geographical display, for example, or otherwise processed as required to support mesh-network operations.

It should be noted that while the exemplary system shown uses time-of-flight calculation for determining distance measurements among transceivers, the system could alternately employ Received Signal Strength Indication (RSSI) analysis to improve mapping accuracy either alone or in combination with time-of-flight measurements.

Turning now to FIG. 46, a further method of refining positional information in a locating group which may be associated with a mesh network is shown. In FIG. 46, a tripod locator 4602 is shown in which ground-tracking sensor transducers 4604, 4606, 4608 have been affixed to the three legs of the locator receiver. In this example configuration, the three transducers can send a sonic pulse and detect and time the return signal from the ground while the locator is in motion over the ground. The Doppler variation in the sonic signals provides the basis for computing the movement and rate of movement of locator 4602 relative to the ground. This data is provided as needed to other units in the locating group. The Doppler information can be used separately from or in combination with any other navigational or mapping information such as provided by inertial navigation modules or radio-based navigation systems. Radar on laser Doppler technique can also be used.

Turning now to FIG. 47, an alternative embodiment is illustrated for refining locational information using Doppler calculations and ground-tracking sonar transducers. In FIG. 46, a single-legged locator 4702 is equipped with downward angled sonar transducers 4704, 4706 on the inner edges of the gradient coil antenna housings 4708, 4710. The transducers, like those in FIG. 46, send sonar pulses and receive returns from them while the locator is in motion producing differential Doppler effect data from which motion data can be derived.

Turning now to FIG. 48, an alternative embodiment is illustrated which employs sonar to refine positional information. In FIG. 48, a single-leg locator 4802 is equipped with a correlation sonar array 4804 affixed below the lower antenna node. This array typically comprises one transmit unit and, for example, nine receiving sensors in a single 600 kHz array. A correlation sonar array provides fine measurement of displacements with less drift than the Doppler method in FIGS. 46 and 47. It should be noted that Doppler computations are not limited to sonar frequencies; laser, radar, or sonar could be used, for example to provide Doppler information for locational precision.

Turning now to FIG. 49, an embodiment of the present invention includes a portable display and communication device 4904 which is affixed to a locator receiver 4902 in a formed receptacle for that purpose and connected by means of a cable interface 4906 or similar means. The display and communication device acts as information display and communication unit for data or voice. The display and communication device may be adapted from commercially available units such as the iPhone from Apple, Inc., or it may be custom manufactured according to application requirements.

Figure 50:
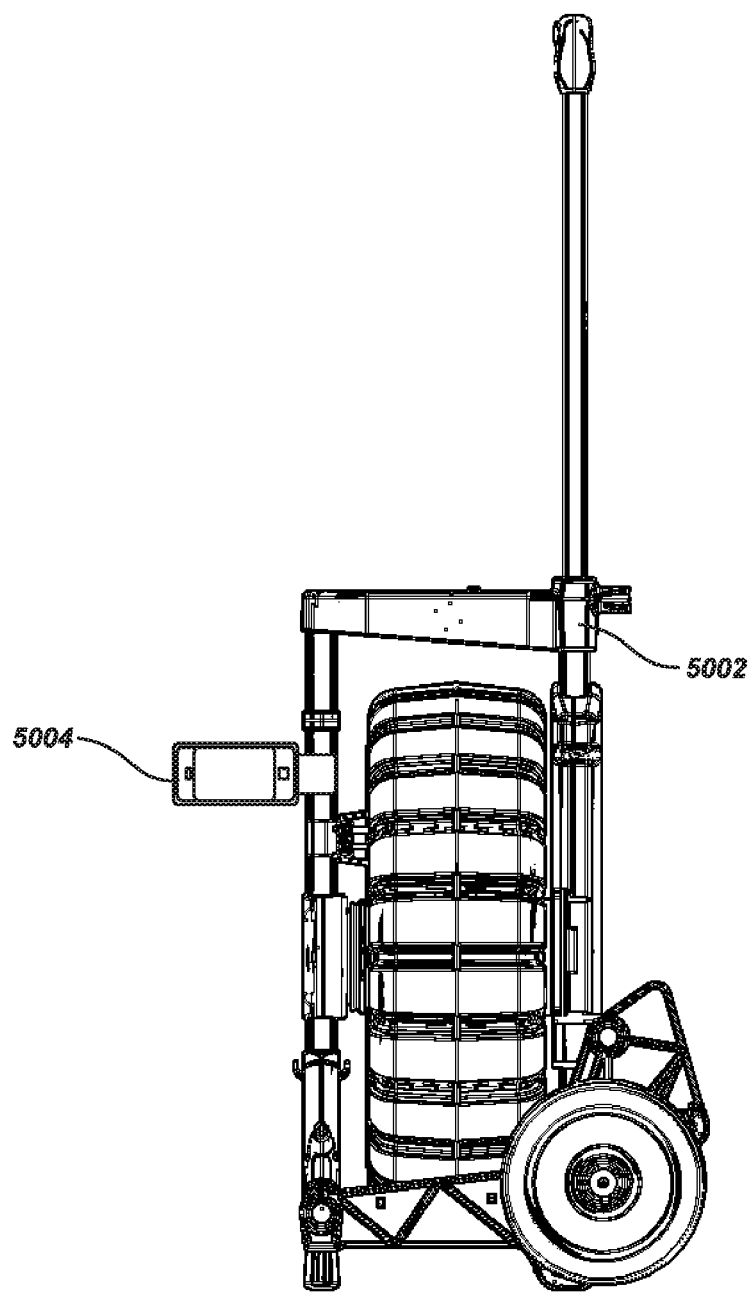
FIG. 50 illustrates a portable display and communication device used at least in part, as the display and user interface system for a video pipe inspection system. Such a pipe inspection system may be a participating unit in a mesh network locating group, or may operate independently according to need.

Turning to FIG. 50, an embodiment of the present invention includes a portable display and communication device 5004 affixed to a pipe inspection system 5002. In FIG. 50, the portable display and communication device 5004 may be connected by a built-in plug (not shown), for example; the portable display and communication device serves to display information relating to the processes of the pipe inspection system, and may serve to provide network connection and data or voice communication.

Clearly, other embodiments and modifications of this invention may occur readily to those of ordinary skill in the art in view of these teachings. For example, our invention need not employ a meshed network. Each and every radio link herein disclosed in all of the various embodiments can be usefully configured for time of flight ranging to provide a distance between two transceivers. Additional transceivers can always be provided if position information is needed. The present invention broadly includes the concept of using time of flight ranging information to provide relative positioning of a man portable pipe and cable locating device. Therefore, this invention is to be limited only by the following claims, which include all such embodiments and modifications when viewed in conjunction with the above specification and accompanying drawing.

We claim:

1. A system for locating a hidden utility, comprising:
 a man portable receiver/locator; and
 wireless communication means for establishing a meshed network with a plurality of nodes including the receiver/locator and at least one transmitter configured to inductively or directly apply a signal to the hidden utility;
 wherein the transmitter is configured to change a characteristic associated with the applied signal in response to a command received from a node of the mesh network.

2. The system of claim 1 wherein the nodes of the meshed network includes one or more nodes selected from the group consisting of an A-frame fault detection device, a conductor-identifying stethoscope, a ground penetrating radar device, and a remote geophone.

3. The system of claim 1 wherein the receiver/locator is configured to determine an amount of cross coupling associated with adjacent utilities based on a measurement of one or more field angles.

4. The system of claim 1 wherein the wireless communication means is configured to broadcast information to other nodes of the network at predetermined intervals.

5. The system of claim 1 wherein the man portable receiver/locator includes means for causing the transmitter to apply a plurality of signals at different frequencies and determining an optimum frequency for determining a location of the hidden utility.

6. The system of claim 1 wherein the man portable receiver/locator includes a plurality of ground tracking transducers and means for deriving positional information based on Doppler shifts detected by the transducers.

7. The system of claim 1 wherein the receiver locator includes means for determining a location of the hidden utility based on time-of-flight positioning between the receiver/locator, the one transmitter and at least one ranging beacon.

8. A system for locating a hidden utility, comprising:
   a man portable receiver/locator; and
   wireless communication means for establishing a meshed network with a plurality of nodes including the receiver/locator and at least one transmitter configured to inductively or directly apply a signal to the hidden utility;
   wherein the man portable receiver/locator includes means for calculating a predetermined signal quality metric and commanding the one transmitter to increase or decrease transmitted current in order to meet the predetermined signal quality metric.

9. A method of locating a hidden utility, comprising the steps of:
   providing a man portable receiver/locator;
   providing at least one transmitter configured to inductively or directly apply a signal to a hidden utility; and
   wirelessly communicating between the man portable receiver/locator and the transmitter to apply a signal to the hidden utility in a predetermined manner that optimizes the locating process, and wherein the communication is performed by treating the portable receiver/locator and the one transmitter as nodes of a meshed network.

10. The method of claim 9 wherein the meshed network includes pipe inspection camera configured to receive data indicating Sonde signal strength from the receiver/locator.

11. The method of claim 9 wherein the communication is performed according to a ZigBee protocol.

12. The method of claim 9 wherein the man portable receiver/locator causes the one transmitter to apply a plurality of signals at different frequencies and then determines an optimum frequency for determining a location of the hidden utility.

13. The method of claim 9 and further comprising the step of broadcasting information to the other nodes of the network at predetermined intervals.

14. The method of claim 9 wherein the man portable receiver/locator derives positional information based on Doppler shifts detected by a plurality of ground tracking transducers.

15. The method of claim 9 wherein the meshed network contains three or more nodes selected from the group consisting of a receiver/locator, an A-frame fault detection device, a conductor-identifying stethoscope, a ground penetrating radar device, a remote geophone, a GPS receiver, and a transmitter configured to inductively or directly applying a signal to a hidden utility.

16. The method of claim 9 wherein the man portable receiver/locator communicates with a plurality of ranging beacons deployed to define a locating area.

17. A method of locating a hidden utility, comprising the steps of:
   providing a man portable receiver/locator;
   providing at least one transmitter configured to inductively or directly apply a signal to a hidden utility; and
   wirelessly communicating between the man portable receiver/locator and the transmitter to apply a signal to the hidden utility in a predetermined manner that optimizes the locating process, and wherein the communication is performed by treating the portable receiver/locator and the one transmitter as nodes of a meshed network;
   wherein the man portable receiver/locator calculates a predetermined signal quality metric and commands the one transmitter to increase or decrease transmitted current in order to meet the predetermined signal quality metric.

18. A method of locating a hidden utility, comprising the steps of:
   providing a man portable receiver/locator;
   providing at least one;
   wirelessly communicating between the man portable receiver/locator and the transmitter;
   causing the transmitter to apply a signal to the hidden utility in a predetermined manner that optimizes the locating process; and
   determining a location of the hidden utility based on time-of-flight positioning between the receiver/locator, the one transmitter and at least one ranging beacon.

\* \* \* \* \*